US012020147B2

(12) United States Patent
Durand et al.

(10) Patent No.: US 12,020,147 B2
(45) Date of Patent: Jun. 25, 2024

(54) SYSTEM AND METHOD FOR A CONVOLUTIONAL NEURAL NETWORK FOR MULTI-LABEL CLASSIFICATION WITH PARTIAL ANNOTATIONS

(71) Applicant: ROYAL BANK OF CANADA, Toronto (CA)

(72) Inventors: Thibaut Durand, Vancouver (CA); Nazanin Mehrasa, Vancouver (CA); Gregory Mori, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 1206 days.

(21) Appl. No.: 16/685,478

(22) Filed: Nov. 15, 2019

(65) Prior Publication Data

US 2020/0160177 A1    May 21, 2020

Related U.S. Application Data

(60) Provisional application No. 62/768,639, filed on Nov. 16, 2018.

(51) Int. Cl.
*G06N 3/08*       (2023.01)
*G06F 16/901*     (2019.01)
*G06N 5/04*       (2023.01)
*G06N 20/00*      (2019.01)

(52) U.S. Cl.
CPC .......... *G06N 3/08* (2013.01); *G06F 16/9024* (2019.01); *G06N 5/04* (2013.01); *G06N 20/00* (2019.01)

(58) Field of Classification Search
CPC .......... G06N 3/08; G06N 5/04; G06N 20/00; G06N 3/045; G06N 5/01; G06F 16/9024; G06F 16/906
See application file for complete search history.

(56) References Cited

U.S. PATENT DOCUMENTS

2017/0061330 A1*  3/2017  Kurata ............... G06F 16/3344
2019/0236436 A1*  8/2019  Imber .................. G06F 7/4836

OTHER PUBLICATIONS

Banik et al. ("Multi-label Object Attribute Classification using a Convolutional Neural Network", arXiv, Nov. 10, 2018) (Year: 2018).*
Li et al. ("Situation Recognition With Graph Neural Networks", IEEE, 2017, pp. 4173-4182) (Year: 2017).*
Ma et al. ("Self-Paced Co-training", PMLR 70, 2017) (Year: 2017).*

(Continued)

*Primary Examiner* — Michael J Huntley
*Assistant Examiner* — Imad Kassim
(74) *Attorney, Agent, or Firm* — Norton Rose Fulbright Canada LLP

(57) ABSTRACT

Effectively training machine learning systems with incomplete/partial labels is a practical, technical problem that solutions described herein attempt to overcome. In particular, an approach to modify loss functions on a proportionality basis is noted in some embodiments. In other embodiments, a graph neural network is provided to help identify correlations/causations as between categories. In another set of embodiments, a prediction approach is described to, based on originally provided labels, predict labels for unlabelled training samples such that the proportion of labelled labels relative to all labels is increased.

21 Claims, 84 Drawing Sheets

(56) References Cited

OTHER PUBLICATIONS

Ling Zhang et al. ("Partial Label Learning via Feature-Aware Disambiguation", KDD'16, Aug. 13-17) (Year: 2016).*
Wu et al. ("A Highly Accurate Framework for Self-Labeled Semisupervised Classification in Industrial Applications", IEEE, 2017) ( Year: 2017).*
Baker et al. ("Initializing neural networks for hierarchical multi-label text classification", BioNLP 2017) (Year: 2017).*
Zhang et al. ("Generalized Cross Entropy Loss for Training Deep Neural Networks with Noisy Labels", 2018) (Year: 2018).*
Liu et al. ("Learning Effective Binary Descriptors via Cross Entropy", IEEE, 2017, pp. 1251-1258) (Year: 2017).*
Zhang et al. ("Disambiguation-Free Partial Label Learning", IEEE, vol. 29, No. 10, pp. 2155-2167, Oct. 1, 2017) (Year: 2017).*
C. Szegedy, S. Ioffe, V. Vanhoucke, and A. Alemi. Inceptionv4, inception-resnet and the impact of residual connections on learning. In Conference on Artificial Intelligence (AAAI), 2017. 1.
L. Tang, S. Rajan, and V. K. Narayanan. Large scale multilabel classification via metalabeler. In WWW, 2009. 5, 13.
G. Tsoumakas and I. Katakis. Multi-label classification: An overview. International Journal of Data Warehousing and Mining (IJDWM), 2007. 2.
A. Vahdat. Toward robustness against label noise in training deep discriminative neural networks. In Advances in Neural Information Processing Systems (NIPS), 2017. 1.
D. Vasisht, A. Damianou, M. Varma, and A. Kapoor. Active Learning for Sparse Bayesian Multilabel Classification. In ACM SIGKDD International Conference on Knowledge Discovery and Data Mining, 2014. 2.
Q. Wang, B. Shen, S. Wang, L. Li, and L. Si. Binary Codes Embedding for Fast Image Tagging with Incomplete Labels. In European Conference on Computer Vision (ECCV), 2014.2.
B. Wu, S. Lyu, and B. Ghanem. ML-MG: Multi-Label Learning With Missing Labels Using a Mixed Graph. In IEEE International Conference on Computer Vision (ICCV), 2015. 2, 3.
S. Xie, R. Girshick, P. Dollr, Z. Tu, and K. He. Aggregated Residual Transformations for Deep Neural Networks. In IEEE Conference on Computer Vision and Pattern Recognition (CVPR), 2017. 1.
M. Xu, R. Jin, and Z.-H. Zhou. Speedup Matrix Completion with Side Information: Application to Multi-Label Learning. In Advances in Neural Information Processing Systems (NIPS), 2013. 2.
H. Yang, J. T. Zhou, and J. Cai. Improving Multi-label Learning with Missing Labels by Structured Semantic Correlations. In European Conference on Computer Vision (ECCV), 2016. 2, 3, 14.
Y. Yang. An evaluation of statistical approaches to text categorization. 1999. 5, 12.
H.-F. Yu, P. Jain, P. Kar, and I. S. Dhillon. Large-scale Multilabel Learning with Missing Labels. In International Conference on Machine Learning (ICML), 2014. 2.
C. Zhang, S. Bengio, M. Hardt, B. Recht, and O. Vinyals. Understanding deep learning requires rethinking generalization. In International Conference on Learning Representations (ICLR), 2017. 1, 2.
R. A. Baeza-Yates and B. Ribeiro-Neto. Modern Information Retrieval. 1999. 5.
Y. Bengio, J. Louradour, R. Collobert, and J. Weston. Curriculum learning. In International Conference on Machine Learning (ICML), 2009. 2, 3, 4.
S. S. Bucak, R. Jin, and A. K. Jain. Multi-label learning with incomplete class assignments. In IEEE Conference on Computer Vision and Pattern Recognition (CVPR), 2011.2.
R. S. Cabral, F. Torre, J. P. Costeira, and A. Bernardino. Matrix Completion for Multi-label Image Classification. In Advances in Neural Information Processing Systems (NIPS), 2011.2.
A. Carlson, J. Betteridge, B. Kisiel, B. Settles, E. R. H. Jr., and T. M. Mitchell. Toward an Architecture for Never-Ending Language Learning. In Conference on Artificial Intelligence (AAAI), 2010. 3.
D. Chapelle, B. Schlkopf, and A. Zien. Semi-Supervised Learning. 2010. 2, 6.
K. Chen, A. Shrivastava, and A. Gupta. Neil: Extracting visual knowledge from web data. In IEEE International Conference on Computer Vision (ICCV), 2013. 3.
X. Chen, A. Shrivastava, and A. Gupta. Enriching visual knowledge bases via object discovery and segmentation. In IEEE Conference on Computer Vision and Pattern Recognition (CVPR), 2014. 3.
K. Cho, B. van Merrienboer, D. Bahdanau, and Y. Bengio. On the properties of neural machine translation: Encoderdecoder approaches. In Eighth Workshop on Syntax, Semantics and Structure in Statistical Translation (SSST-8), 2014. 4.
H.-M. Chu, C.-K. Yeh, and Y.-C. Frank Wang. Deep Generative Models for Weakly-Supervised Multi-Label Classification. In European Conference on Computer Vision (ECCV), 2018. 2.
T.-S. Chua, J. Tang, R. Hong, H. Li, Z. Luo, and Y. Zheng. NUS-WIDE: A Real-world Web Image Database from National University of Singapore. In ACM International Conference on Image and Video Retrieval (CIVR), 2009. 5, 12.
T. Cour, B. Sapp, and B. Taskar. Learning from Partial Labels. Journal of Machine Learning Research (JMLR), 2011. 2.
J. Deng, O. Russakovsky, J. Krause, M. S. Bernstein, A. Berg, and L. Fei-Fei. Scalable Multi-label Annotation. In Proceedings of the SIGCHI Conference on Human Factors in Computing Systems, 2014. 1, 2.
T. Durand, T. Mordan, N. Thome, and M. Cord. WILDCAT: Weakly Supervisedearning of Deep convolutional neural networks for Image Classification, Pointwise Localization and Segmentation. In IEEE Conference on Computer Vision and Pattern Recognition (CVPR), 2017. 1.
T. Durand, N. Thome, and M. Cord. Exploiting Negative Evidence for Deep Latent Structured Models. In IEEE Transactions on Pattern Analysis and Machine Intelligence (TPAMI), 2018. 5.
M. Everingham, S. M. A. Eslami, L. Van Gool, C. K. I. Williams, J. Winn, and A. Zisserman. The Pascal Visual Object Classes Challenge: A Retrospective. International Journal of Computer Vision (IJCV), 2015. 5, 12.
Y. Gong, Y. Jia, T. Leung, A. Toshev, and S. Ioffe. Deep Convolutional Ranking for Multilabel Image Annotation. In International Conference on Learning Representations (ICLR), 2014. 5, 12.
M. Gori, G. Monfardini, and F. Scarselli. A new model for learning in graph domains. In IEEE International Joint Conference on Neural Networks (IJCNN), 2005. 4.
S. Guo, W. Huang, H. Zhang, C. Zhuang, D. Dong, M. R. Scott, and D. Huang. CurriculumNet: Weakly Supervised Learning from Large-Scale Web Images. In European Conference on Computer Vision (ECCV), 2018. 3.
K. He, X. Zhang, S. Ren, and J. Sun. Deep residual learning for image recognition. In EEE Conference on Computer Vision and Pattern Recognition (CVPR), 2016. 1, 5.
S. Ioffe and C. Szegedy. Batch Normalization: Accelerating Deep Network Training by Reducing Internal Covariate Shift. In International Conference on Machine Learning (ICML), 2015. 4.
B. Zoph, V. Vasudevan, J. Shlens, and Q. V. Le. Learning transferable architectures for scalable image recognition. In IEEE Conference on Computer Vision and Pattern Recognition (CVPR), 2018. 1.
L. Jiang, D. Meng, Q. Zhao, S. Shan, and A. G. Hauptmann. Self-Paced Curriculum Learning. In Conference on Artificial Intelligence (AAAI), 2015. 3, 4.
L. Jiang, Z. Zhou, T. Leung, L.-J. Li, and L. Fei-Fei. Mentor-Net: Learning Data-Driven Curriculum for Very Deep Neural Networks on Corrupted Labels. In International Conference on Machine Learning (ICML), 2018. 3.
A. Joulin, L. van der Maaten, A. Jabri, and N. Vasilache. Learning visual features from arge weakly supervised data. In European Conference on Computer Vision (ECCV), 2016. 2.
A. Kapoor, R. Viswanathan, and P. Jain. Multilabel classification using bayesian compressed sensing. In Advances in Neural Information Processing Systems (NIPS), 2012. 2.
A. Kendall and Y. Gal. What uncertainties do we need in bayesian deep learning for computer vision? In Advances in Neural Information Processing Systems (NIPS), 2017. 5.

(56) References Cited

OTHER PUBLICATIONS

D. P. Kingma and M. Welling. Auto-Encoding Variational Bayes. In International Conference on Learning Representations (ICLR), 2014. 2.

S. Kornblith, J. Shlens, and Q. V. Le. Do Better ImageNet Models Transfer Better? 2018. 3.

A. Krizhevsky, I. Sutskever, and G. Hinton. ImageNet Classification with Deep Convolutional Neural Networks. In Advances in Neural Information Processing Systems (NIPS), 2012. 1.

M. P. Kumar, B. Packer, and D. Koller. Self-paced learning for latent variable models. In Advances in Neural Information Processing Systems (NIPS), 2010. 3, 4, 5.

L. J. Li, G.Wang, and L. Fei-Fei. OPTIMOL: automatic Online Picture collecTion via Incremental MOdel Learning. In IEEE Conference on Computer Vision and Pattern Recognition (CVPR), 2007. 3.

W. Li, L. Wang, W. Li, E. Agustsson, J. Berent, A. Gupta, R. Sukthankar, and L. Van Gool. WebVision Challenge: Visual Learning and Understanding With Web Data. In arXiv 1705.05640, 2017. 1, 6.

Y. Li, Y. Song, and J. Luo. Improving Pairwise Ranking for Multi-label Image Classification. In IEEE Conference on Computer Vision and Pattern Recognition (CVPR), 2017. 12.

T.-Y. Lin, M. Maire, S. Belongie, L. Bourdev, R. Girshick, J. Hays, P. Perona, D. Ramanan, C. L. Zitnick, and P. Dollr. Microsoft COCO: Common Objects in Context. 2014. 1,5, 12.

C. Liu, B. Zoph, J. Shlens, W. Hua, L.-J. Li, L. Fei-Fei, A. Yuille, J. Huang, and K. Murphy. Progressive Neural Architecture Search. In European Conference on Computer Vision (ECCV), 2018. 1.

D. Mahajan, R. Girshick, V. Ramanathan, K. He, M. Paluri, Y. Li, A. Bharambe, and L. van der Maaten. Exploring the Limits of Weakly Supervised Pretraining. In European Conference on Computer Vision (ECCV), 2018. 1, 2, 6.

Minmin Chen and Alice Zheng and Kilian Weinberger. Fast image tagging. In International Conference on Machine Learning (ICML), 2013. 2.

I. Mitchell, W. Cohen, E. Hruschka, P. Talukdar, J. Betteridge, A. Carlson, B. Dalvi, M. Gardner, B. Kisiel, J. Krishnamurthy, N. Lao, K. Mazaitis, T. Mohamed, N. Nakashole, E. Platanios, A. Ritter, M. Samadi, B. Settles, R.Wang, D. Wijaya, A. Gupta, X. Chen, A. Saparov, M. Greaves, and J.Welling. Never-Ending Learning. In Conference on Artificial Intelligence (AAAI), 2015. 3 +.

M. Oquab, L. Bottou, I. Laptev, and J. Sivic. Learning and Transferring Mid-Level Image Representations using Convolutional Neural Networks. In IEEE Conference on Computer Vision and Pattern Recognition (CVPR), 2014. 1, 5.

M. Oquab, L. Bottou, I. Laptev, and J. Sivic. Is Object Localization for Free?—Weakly-Supervised Learning With Convolutional Neural Networks. In IEEE Conference on Computer Vision and Pattern Recognition (CVPR), 2015. 1.

A. Paszke, S. Gross, S. Chintala, G. Chanan, E. Yang, Z. De-Vito, Z. Lin, A. Desmaison, L. Antiga, and A. Lerer. Automatic differentiation in pytorch. In Advances in Neural Information Processing Systems (NIPS), 2017. 5.

H. Pham, M. Y. Guan, B. Zoph, Q. V. Le, and J. Dean. Faster Discovery of Neural Architectures by Searching for Paths in a Large Model. In International Conference on Learning Representations (ICLR), 2018. 1.

B. Zhou, A. Khosla, A. Lapedriza, A. Oliva, and A. Torralba. Learning Deep Features for Discriminative Localization. In IEEE Conference on Computer Vision and Pattern Recognition (CVPR), 2016. 1.

O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet large scale visual recognition challenge. International Journal of Computer Vision (IJCV), 2015. 1.

F. Scarselli, M. Gori, A. C. Tsoi, M. Hagenbuchner, and G. Monfardini. The graph neural network model. IEEE Transactions on Neural Networks, 2009. 4.

P. Stock and M. Cisse. ConvNets and ImageNet Beyond Accuracy: Understanding Mistakes and Uncovering Biases. In European Conference on Computer Vision (ECCV), 2018. 1.

C. Sun, M. Paluri, R. Collobert, R. Nevatia, and L. Bourdev. ProNet: Learning to Propose Object-Specific Boxes for Cascaded Neural Networks. In IEEE Conference on Computer Vision and Pattern Recognition (CVPR), 2016. 1.

C. Sun, A. Shrivastava, S. Singh, and A. Gupta. Revisiting Unreasonable Effectiveness of Data in Deep Learning Era. In IEEE International Conference on Computer Vision (ICCV), 2017. 1, 2, 6.

Y.-Y. Sun, Y. Zhang, and Z.-H. Zhou. Multi-label Learning with Weak Label. In Conference on Artificial Intelligence (AAAI), 2010. 2.

* cited by examiner

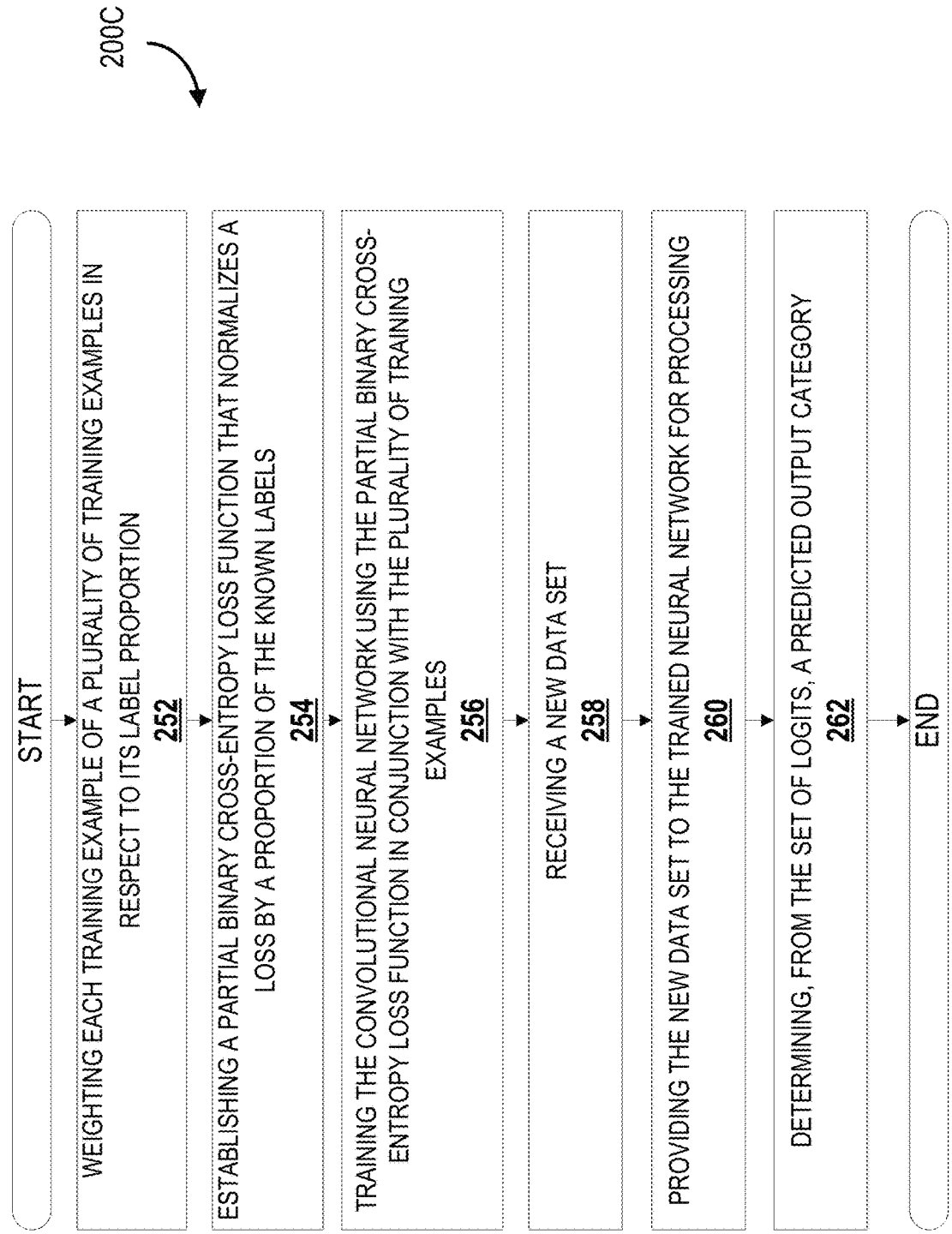

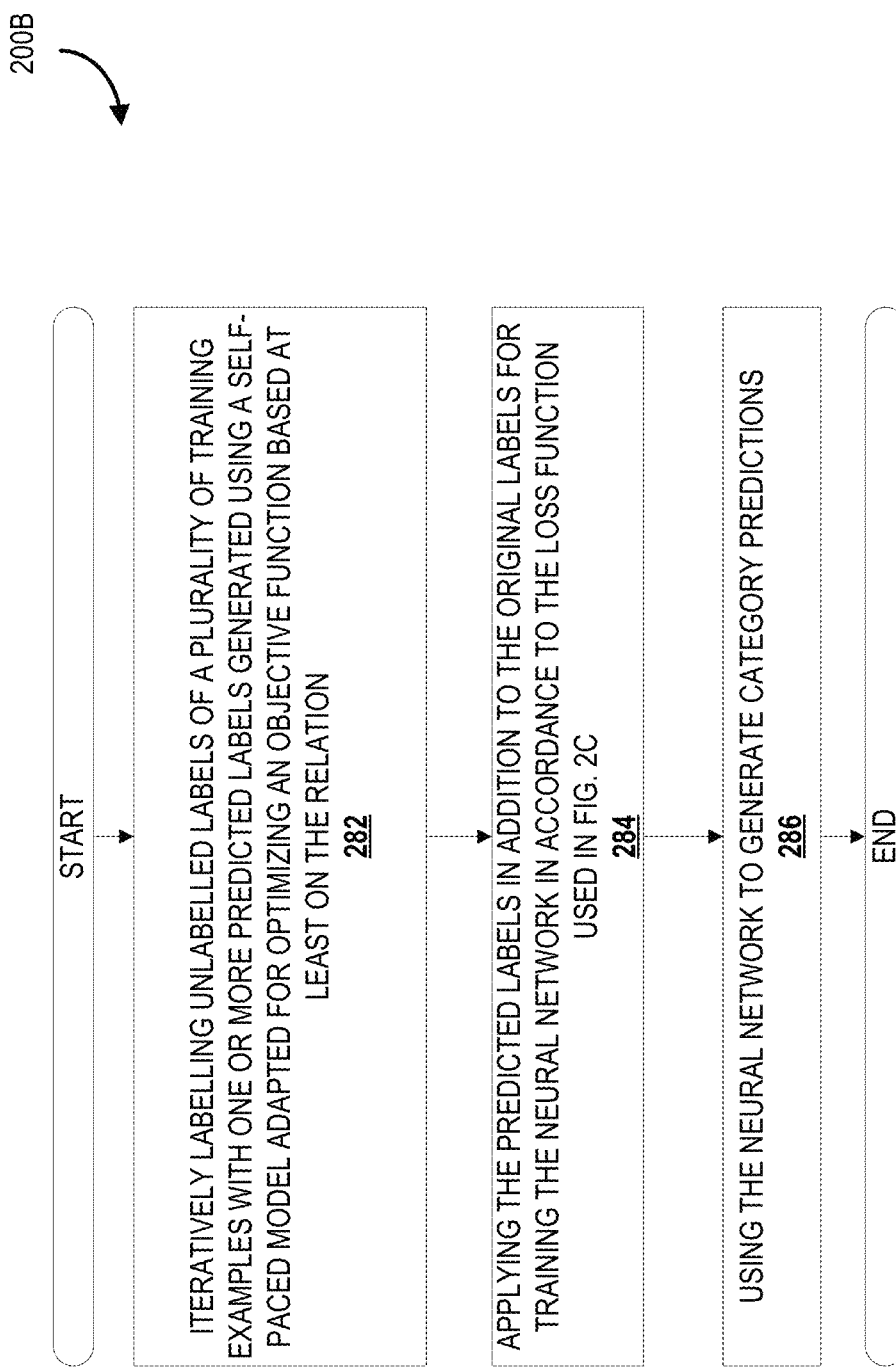

MAP 0-1 exact match

Macro-F1

Micro-F1

Per-class Precision

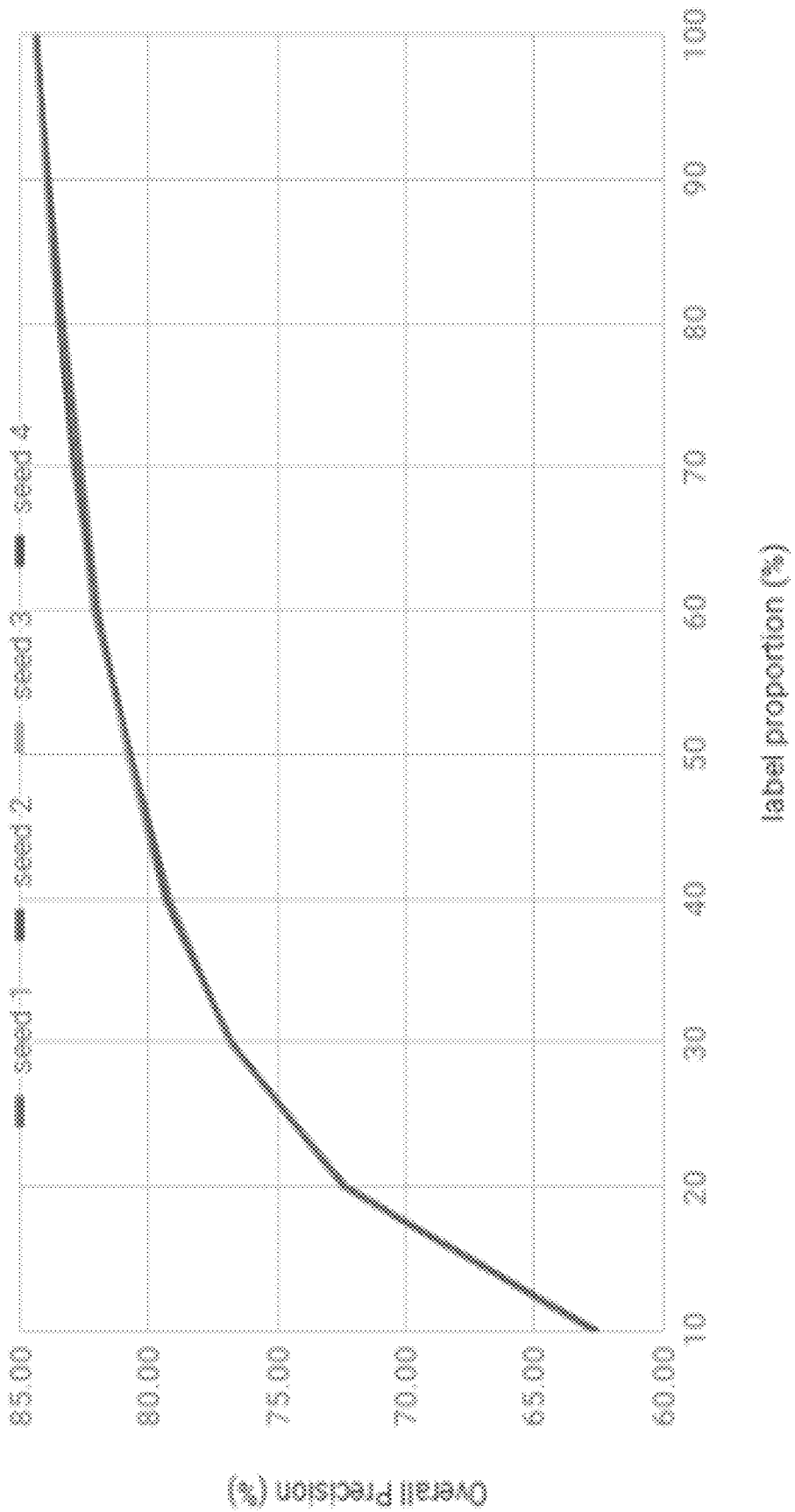
FIG. 8G Overall Precision

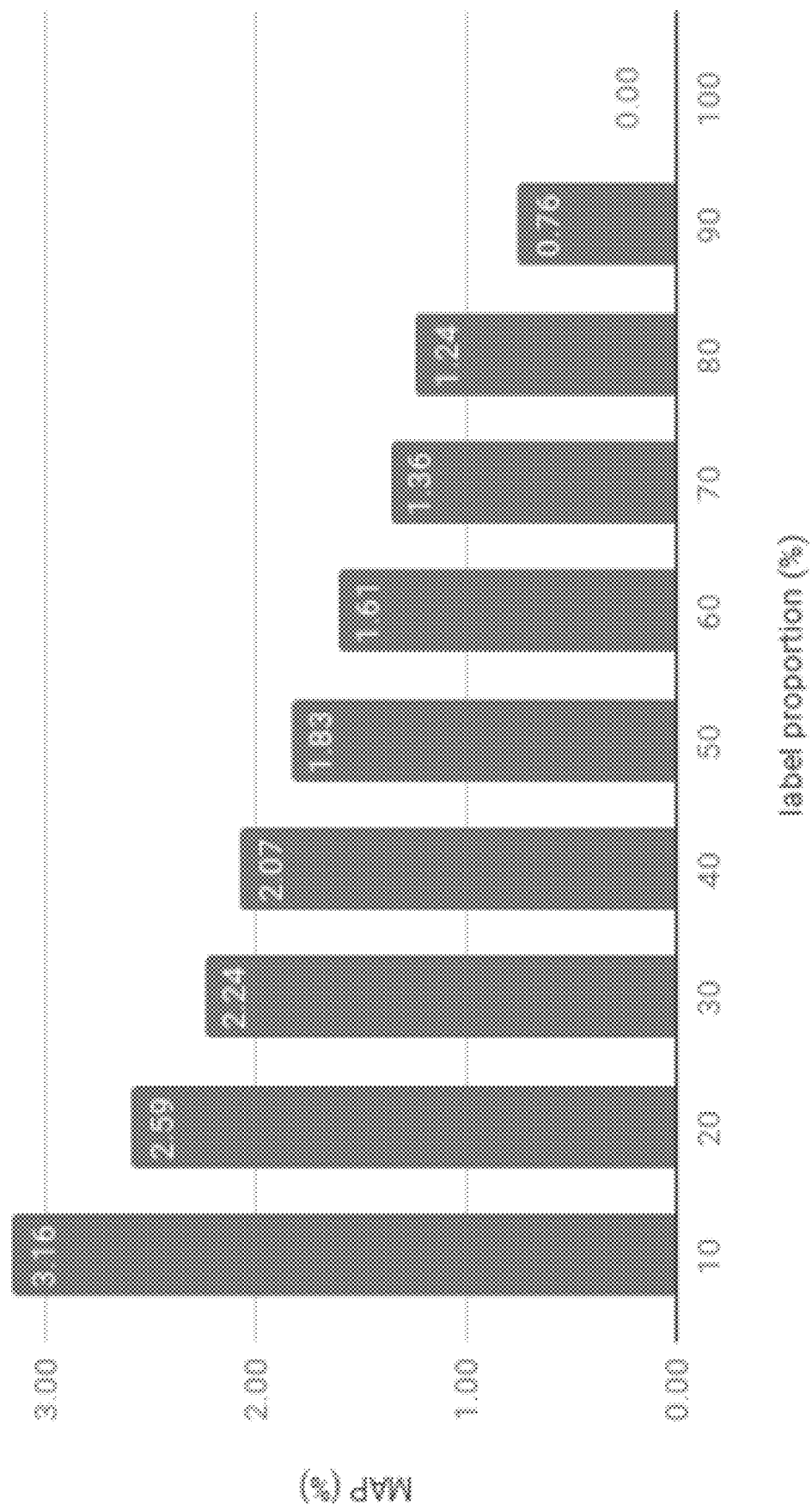
FIG. 15A MAP

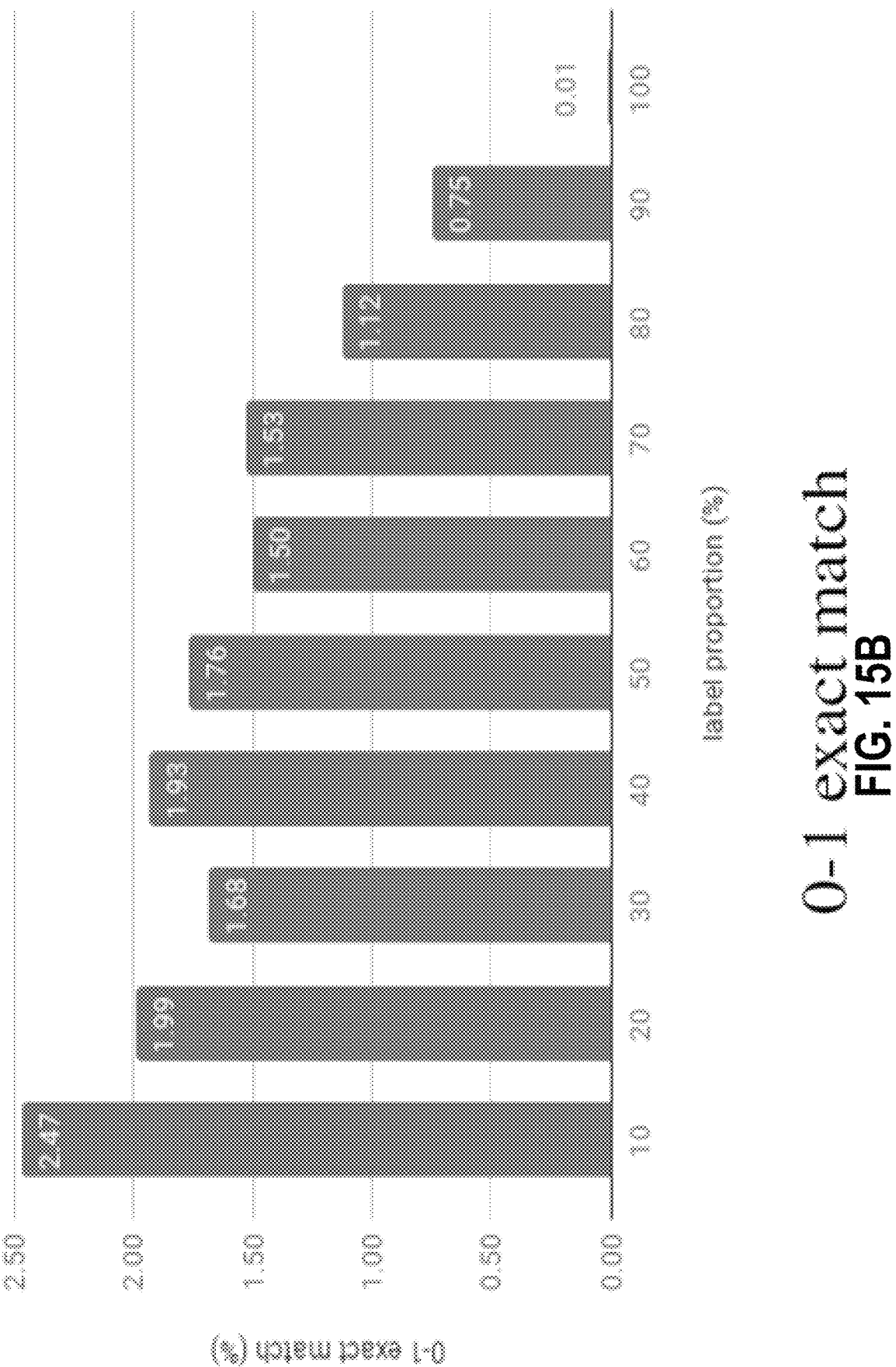

Macro-F1

Micro-F1

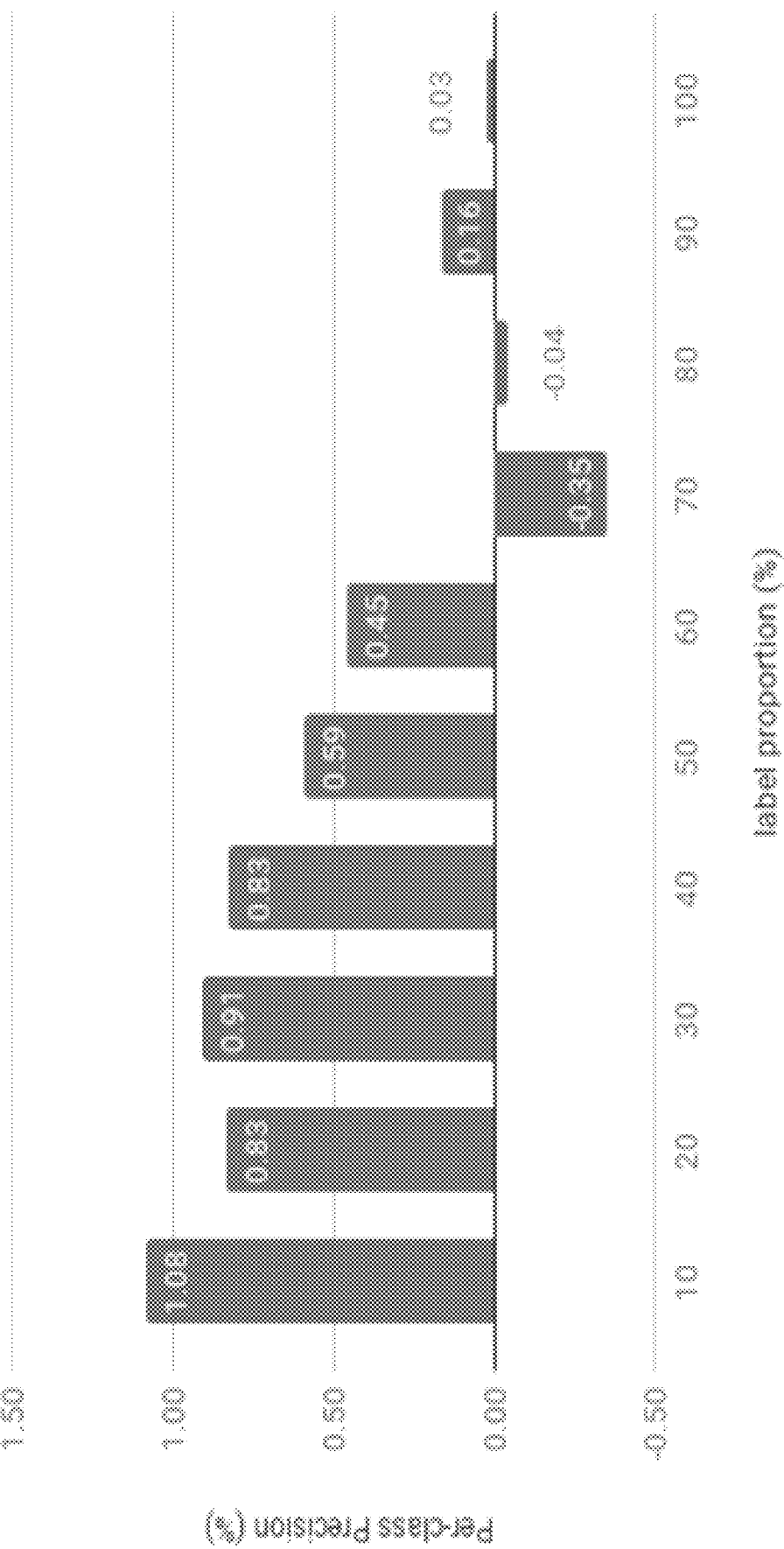
FIG. 15E Per-class Precision

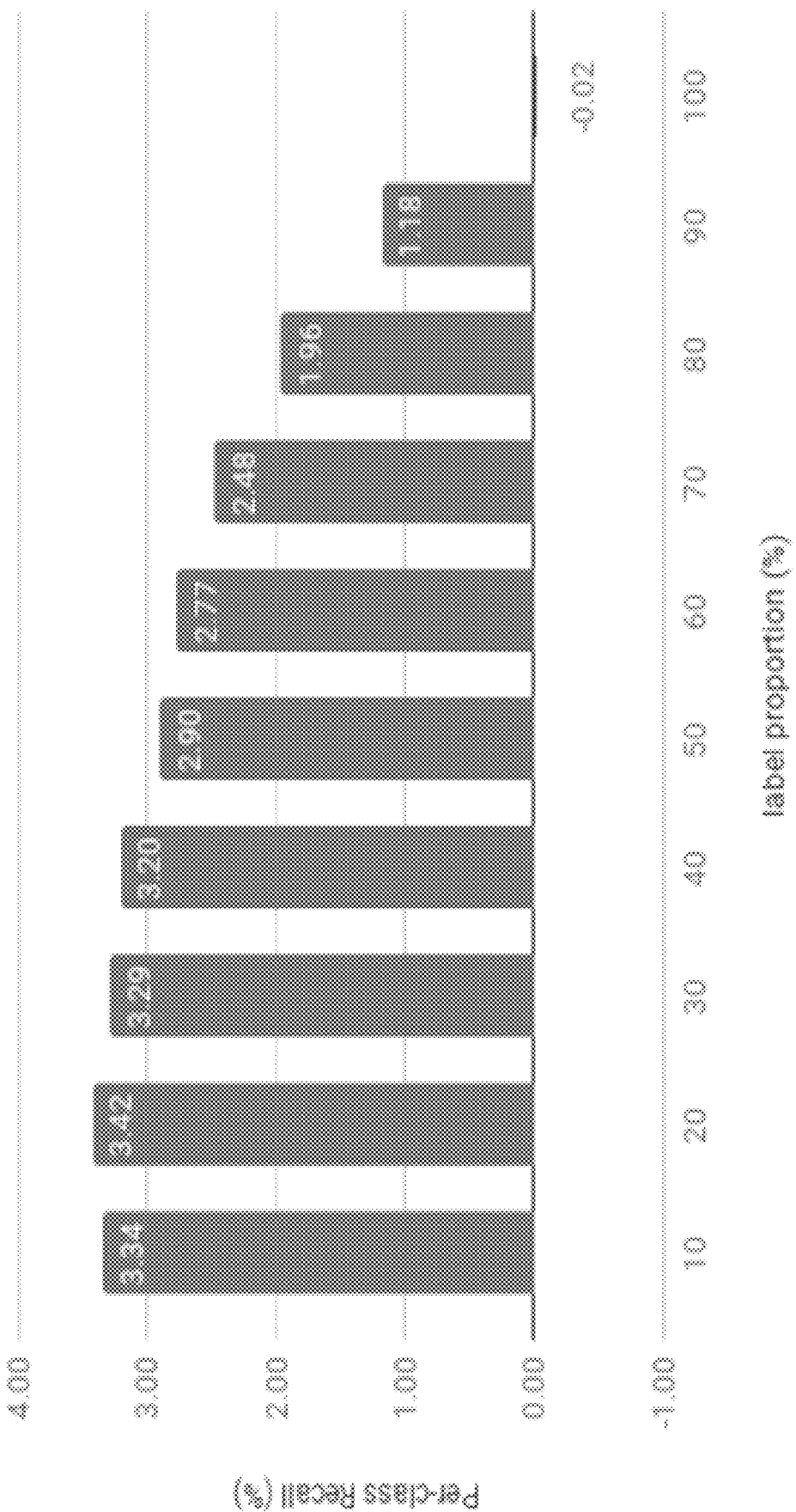
FIG. 15F Per-class Recall

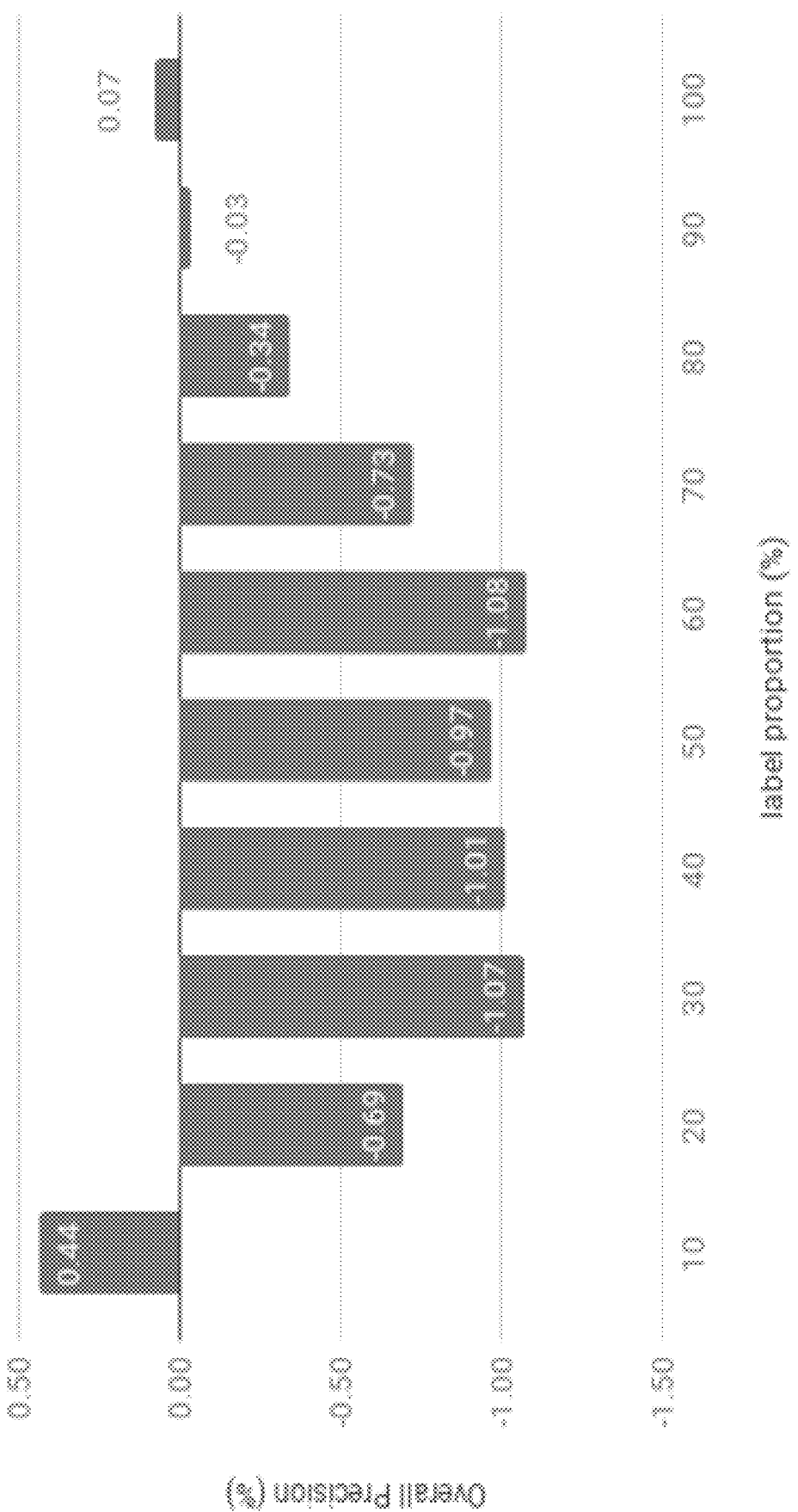

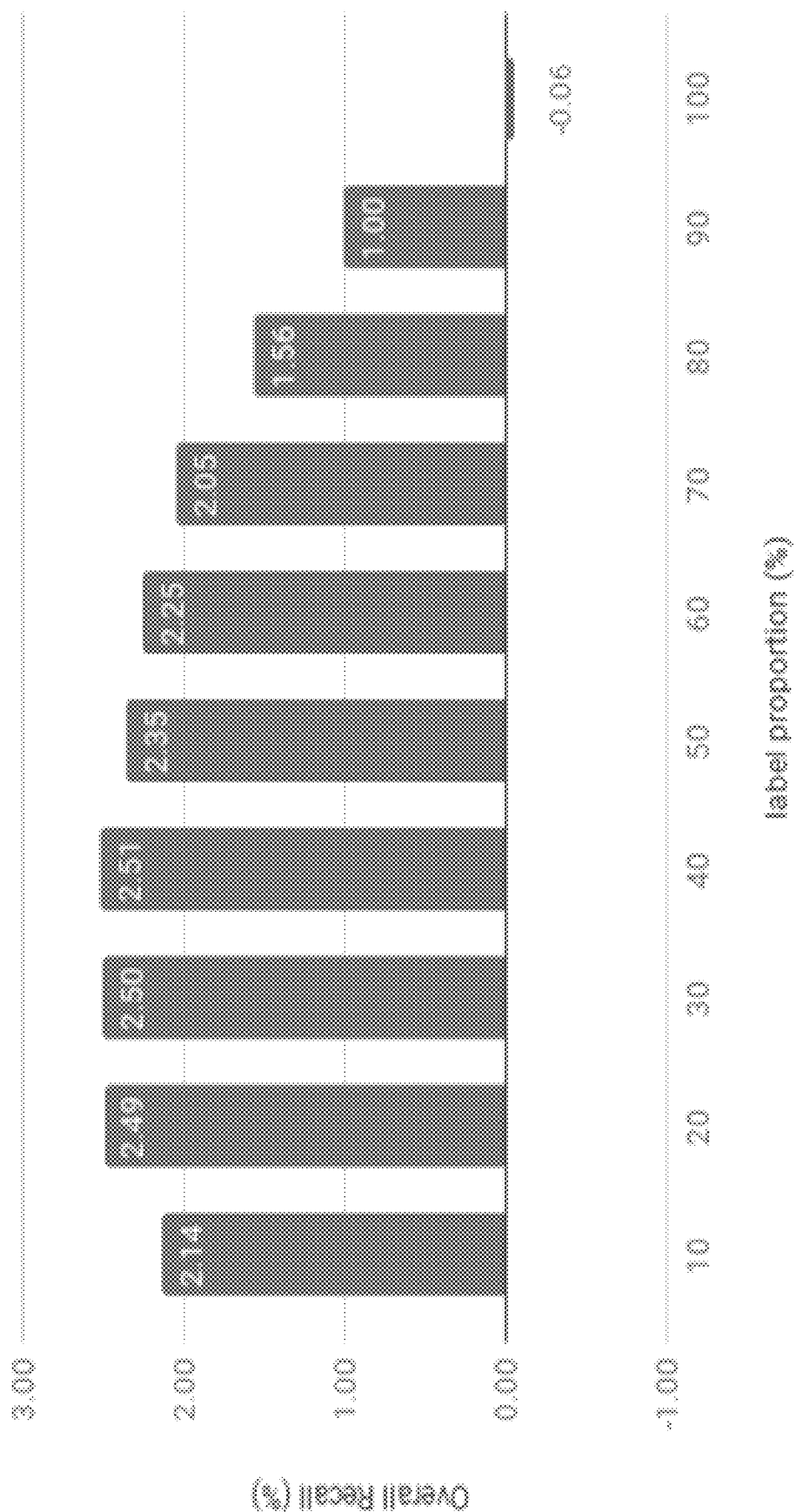

MAP

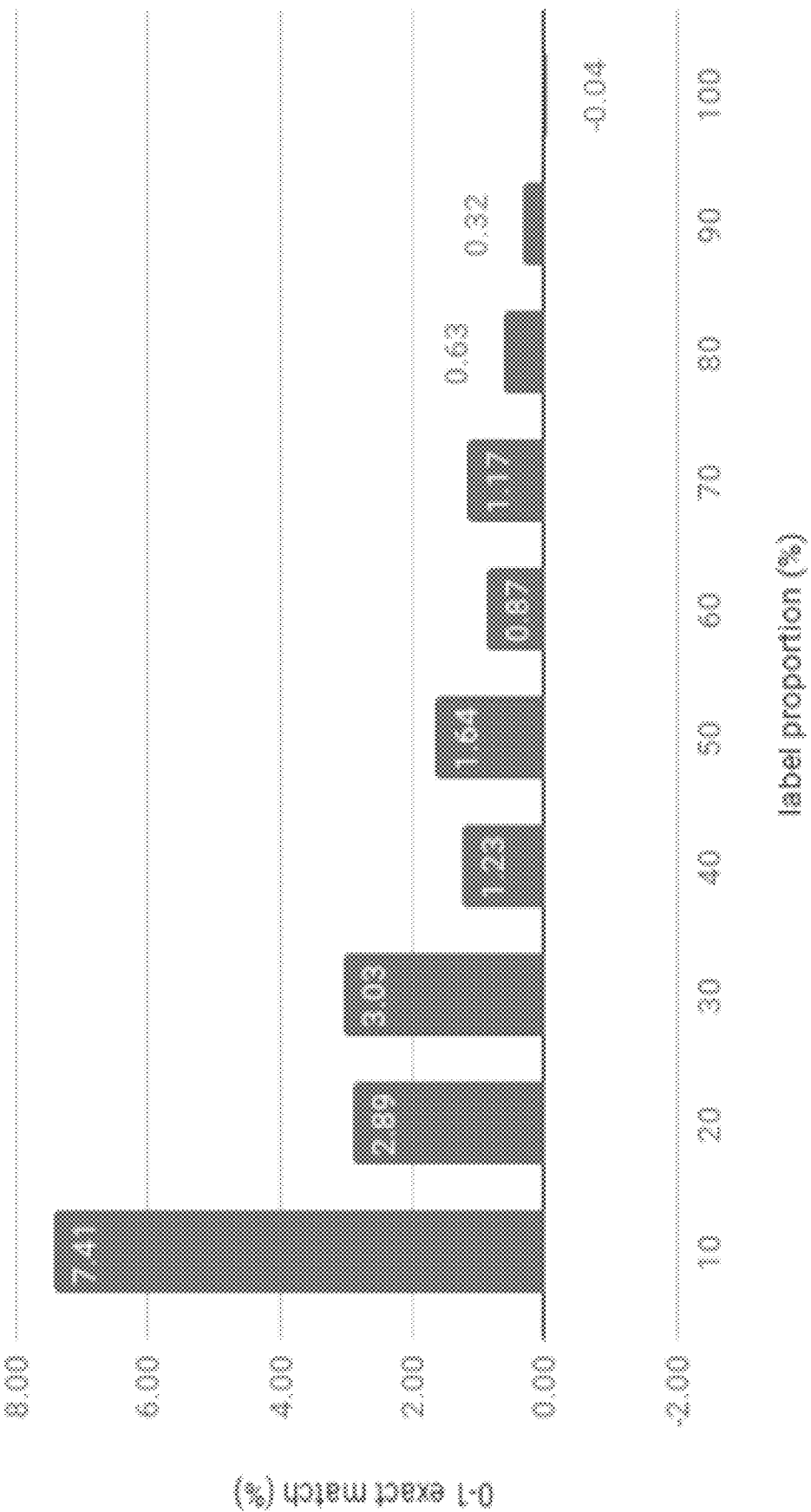
FIG. 17B 0-1 exact match

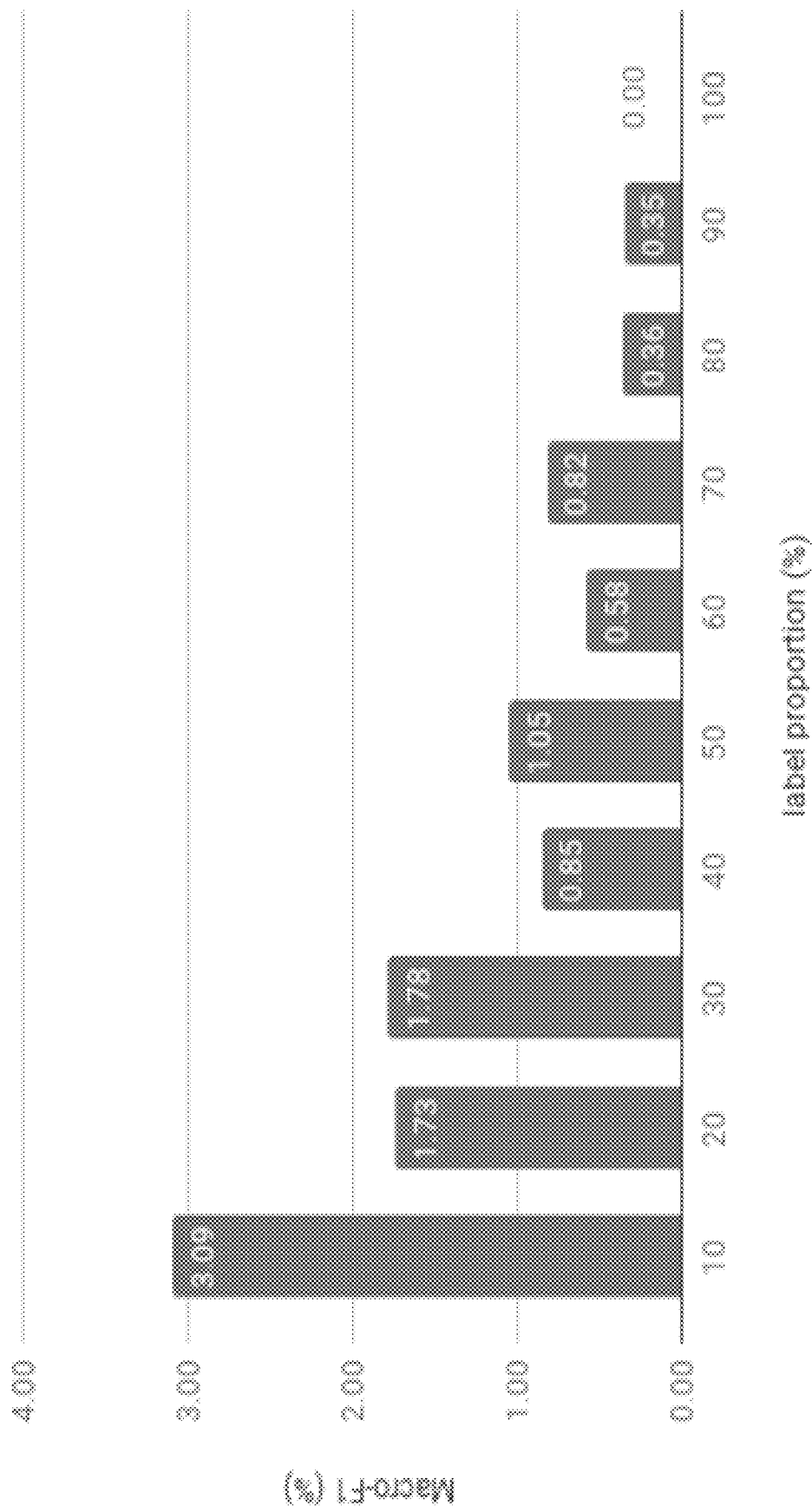

Micro-F1

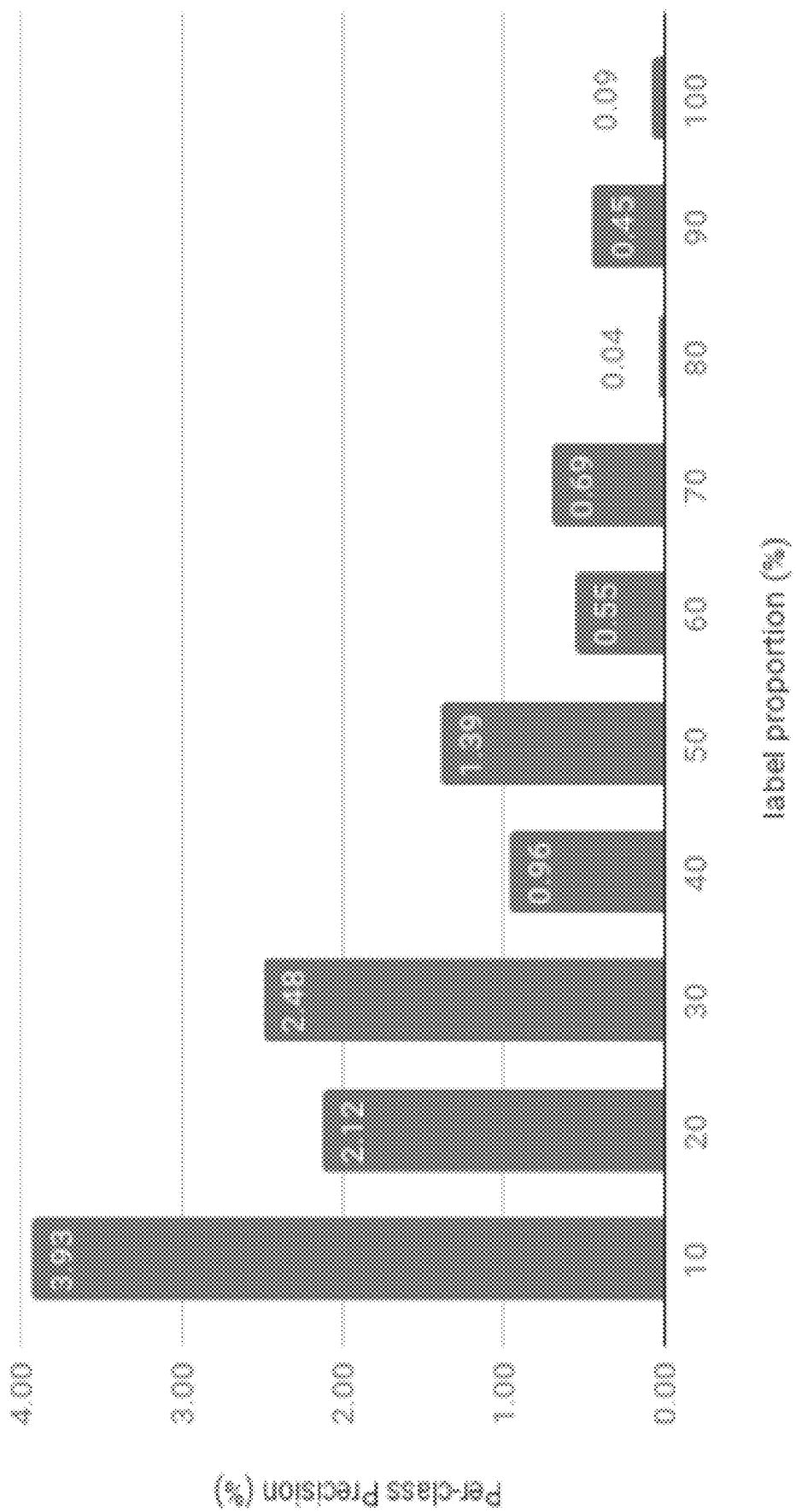

Per-class Recall

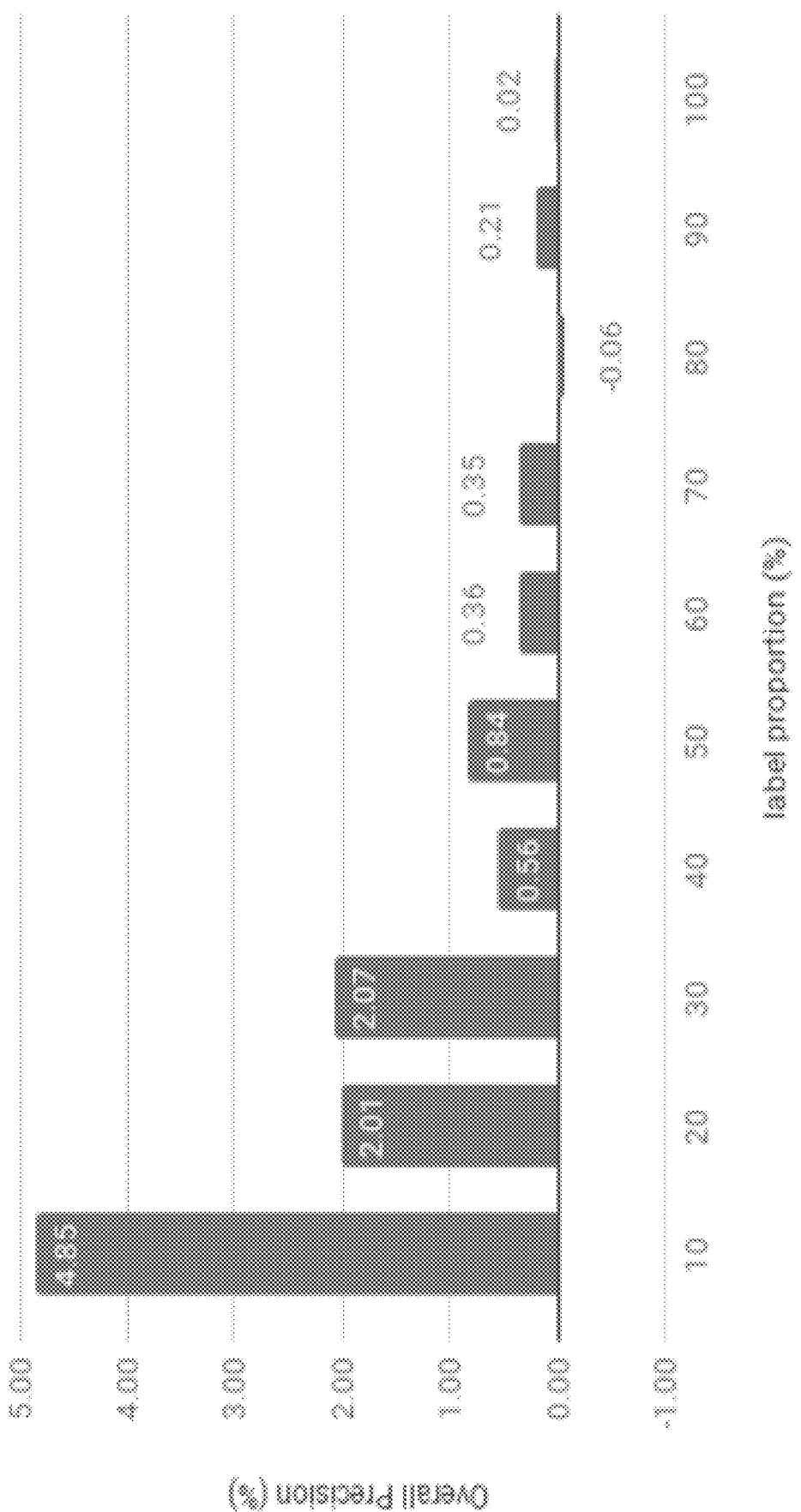

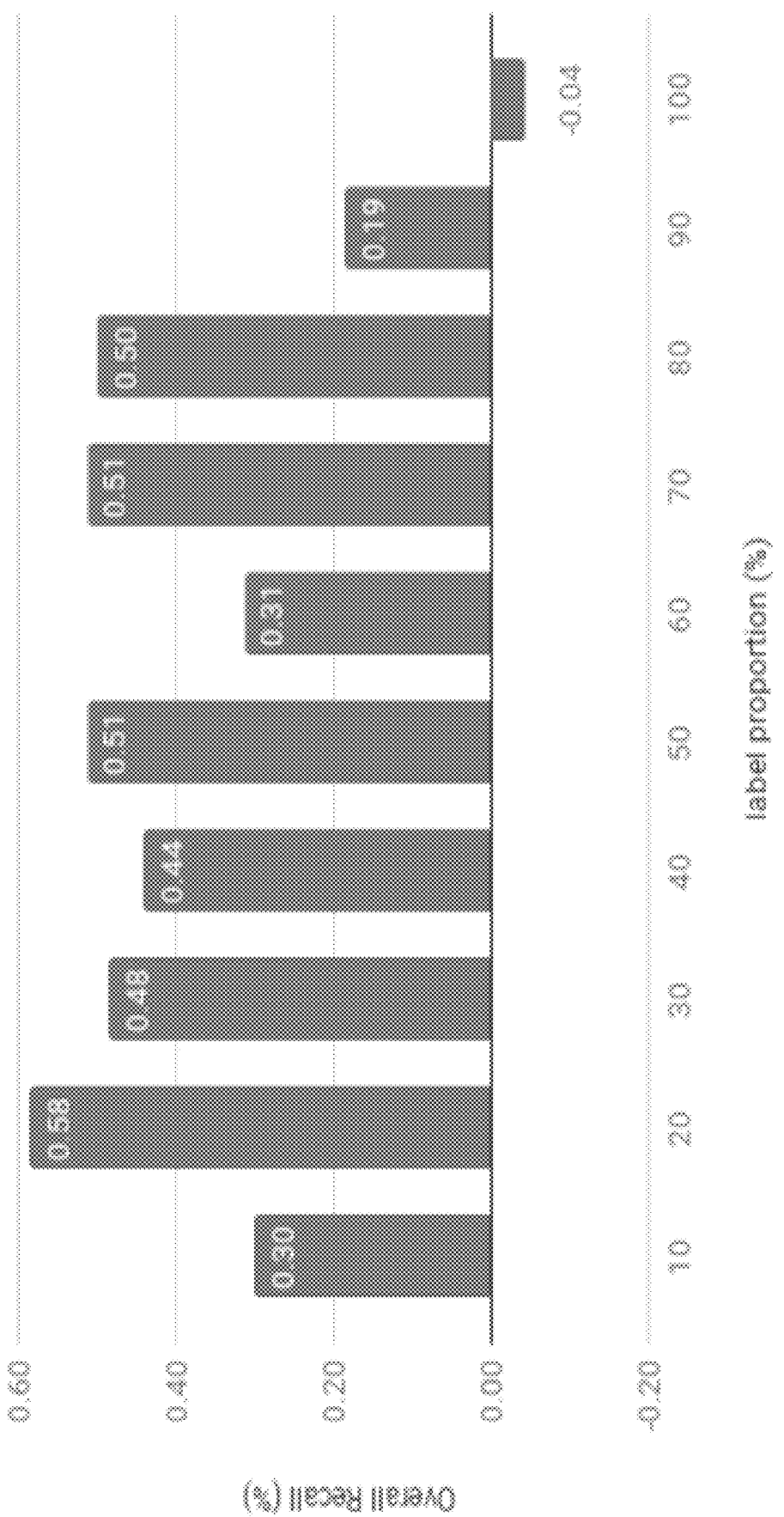
FIG. 17H Overall Recall

ResNet-50

ResNet-101

ResNet-101 WELDON

SYSTEM AND METHOD FOR A CONVOLUTIONAL NEURAL NETWORK FOR MULTI-LABEL CLASSIFICATION WITH PARTIAL ANNOTATIONS

CROSS REFERENCE

This application is a non-provisional of, and claims all benefit to, including priority, U.S. Application No. 62/768, 639, entitled SYSTEM AND METHOD FOR A CONVOLUTIONAL NEURAL NETWORK FOR MULTI-LABEL CLASSIFICATION WITH PARTIAL ANNOTATIONS, filed on 16 Nov. 2018, incorporated herein by reference in its entirety.

FIELD

The present disclosure generally relates to the field of machine learning, in particular, systems and methods for introducing partial annotations in machine learning.

INTRODUCTION

Since 2012, convolutional neural networks (ConvNets) [30] have shown many great successes on single label image classification tasks. Recently, Stock and Cisse [47] have presented empirical evidence that the performance of state-of-the-art classifiers on ImageNet [45] is largely underestimated, and little error is left unresolved. However there are no similar results for multi-label image classification.

Labelling and annotations are an important aspect of machine learning. Labelling data sets can be expensive and time consuming. For example, in CIFAR-10, an image data set, students were paid to label all of the images. Labelling becomes increasingly challenging as the number of dimensions and thus labels increase for the data. As costs scale, labelling becomes impractical for humans to conduct.

SUMMARY

Despite the great performances of deep ConvNets for single-label classification, the performances for multi-label classification are less impressive because the data are more complex and difficult. Recent works showed that one strategy to improve the classification performances is to use more training data. However collecting clean multi-label annotations is difficult to scale-up because the annotation cost is proportional to the number of images and categories.

A computational approach is described herein to train a machine learning model data architecture with partial annotations i.e., only some labels are known per image and most of the labels are unknown. This approach is provided as a specific technical improvement that may aid in reducing the annotation cost by utilizing specific improvements in machine learning architectures.

Not all partially annotated data sets are the same. There can be differences in difficulty level—for example, there can be varying amounts of labels missing (i.e., proportion of known labels can vary from 0-100%). Furthermore, in some cases, where there is effort yet to be expended in labelling, there may be a fixed budget of clean labels (e.g., there may be 50 man hours available for someone to label images, indicating if they have airplanes, people, among others). There may also be noise in labels (i.e., incorrectly labelled/wrong labels).

A new classification loss relation is introduced that exploits the proportion of labels per example, and this loss relation is encapsulated in systems and methods for conducting machine learning, despite the training set only having partial labels by learning an accurate model used for predicting missing labels. In some embodiments, a learning approach (e.g., a curriculum learning approach, where a model is trained with progressively harder examples).

A new classification loss relation is described along with a new normalization function that can be used as a relation for modifying how machine learning is conducted on a physical hardware computing device. These approaches are described along with new approaches for modelling interactions between the categories using a graph neural network, which conducts message update and hidden state updates between nodes. In some embodiments, the approach further includes predicting missing labels, which can, for example, using an alternating algorithm where two aspects are alternatively minimized.

A number of different approaches are described for curriculum training and for estimating confidence scores, and it is noted that, among others, a curriculum learning model using Bayesian uncertainty is an accurate strategy to label missing labels.

The system can be configured to generate different data structure/data outputs. In one embodiment, the system is used to train an output neural network that has improved training outcomes relative to other approaches despite being provided partial labels. The output, in this case, is a data structure storing a representation of the trained neural network. This trained neural network can be used for generating predictions (e.g., outputting logits for various output nodes).

In another embodiment, the system is used to re-generate a data set that initially has partial labels. The missing labels are inferred by the trained neural network, and then collated for output. The missing labels may have additional metadata associated, for example, indicating a confidence level of the inference. The original data set may thus be augmented with the inferred labels to provide a more complete (or fully complete) data set. In some cases, where the system cannot confidently infer a label, it may be configured to simply not provide an inferred label for a missing label.

The classification loss allows the machine learning data model architecture to use the same training settings that when learning with all the annotations. Several strategies to predict missing labels are also explored, and described for use training. The results are evaluated on two large-scale multi-label datasets: MS COCO and NUS-WIDE. Through experimental results noted below, Applicants also show that this model allows to learn with several datasets with overlapping categories.

In an aspect, a computer implemented method for training a convolutional neural network for machine learning with multi-label training data having partial annotations including known labels and unknown labels, is provided.

The method includes: weighting each training example of a plurality of training examples in respect to its label proportion and establishing a partial binary cross-entropy loss function that normalizes a loss by a proportion of the known labels relative to a total of a number of the known labels and the unknown labels.

This approach avoids the drawback that occurs with alternate approaches where binary cross-entropy is normalized by the number of classes, the problem arising when the back-propagated gradient becomes too small.

Usually, the multi-label loss functions are normalized by the number of classes i.e., it looks like $1/C \, sum\_\{i=1\}^C$ loss where C is the number of categories and loss is loss function per label. This normalization allows the approach to keep the same range of values for the loss value.

But when the number of classes is large and the proportion of labels is small, this normalization becomes wrong and leads to very small loss values.

For instance, OpenImages has 600 categories and about 1% of the labels are annotated so the loss value is 100 times smaller ((600*1%)/600). So the information back-propagated in the model is 100 times smaller.

To avoid this technical problem, Applicants, in some embodiments, propose a new normalization strategy that depends of the proportion of labels.

The convolutional neural network is trained using the partial binary cross-entropy loss function that normalizes a loss by a proportion of the known labels relative to a total of a number of the known labels and the unknown labels in conjunction with the plurality of training examples to iteratively tune one or more weightings between interconnected nodes of the convolutional neural network to minimize the loss function.

The trained neural network is then utilized in relation to a new data set to generate a set of logits, each logit corresponding to a set of output categories. From the set of logits, the system determines a predicted output category based at least on a selected output category of the set of output categories having a greatest logit relative to other logits of the set of logits.

In another aspect, the partial binary cross-entropy loss function is based at least on the relation:

$$\ell(x, y) = \frac{g(p_y)}{C} \sum_{c=1}^{C} \left[ 1_{[y_c=1]} \log\left(\frac{1}{1+\exp(-x_c)}\right) + 1_{[y_c=-1]} \log\left(\frac{\exp(-x_c)}{1+\exp(-x_c)}\right) \right] \quad (1)$$

wherein $p_y \in [0, 1]$ is the proportion of known labels in y and g is a normalization function with respect to the label proportion, C is a number of categories, and training data is denoted as $\mathcal{D} = \{(\mathcal{I}^{(1)}, y^{(1)}), \ldots, (\mathcal{I}^{(N)}, y^{(N)})\}$ where $\mathcal{I}^{(i)}$ is an $i^{th}$ data element (e.g., an image) and $y^{(i)} = [y_1^{(i)}, \ldots, y_C^{(i)}] \in y \subseteq \{-1, 0, 1\}^C$ a label vector.

In another aspect, the normalization function g is based at least on the relation:

$$g(p_y) = \alpha p_y^\gamma + \beta$$

wherein $\alpha$, $\beta$, and $\gamma$ are hyper-parameters.

In another aspect, at least one of $\alpha$ is approximately 1, $\beta$ is approximately 0 or $\gamma$ is approximately $-1$.

In another aspect, $\gamma$ is approximately 1. In another aspect, at least one of $\alpha$, $\beta$, or $\gamma$ are determined based at least on a proportion of the known labels relative to a total of a number of the known labels and the unknown labels across all of the training examples. In another aspect, at least one of $\alpha$, $\beta$, or $\gamma$ are determined based at least on a proportion of inaccurate or accurate labels relative to a total of a number of the known labels and the unknown labels across all of the training examples.

In another aspect, the convolutional neural network is adapted for multi-label image classification. In another aspect, a proportion of inaccurate or accurate labels relative to a total of a number of the known labels and the unknown labels across all of the training examples is between about 5 to about 10%.

In another aspect, a computer implemented method for modelling interactions between categories of a convolutional neural network is provided, the method including: generating a graph neural network wherein the input data is a graph G={V, E}, where V (resp. E) is a set of nodes (resp. edges) of the graph, where for each node $v \in V$, an input feature vector Xv and its hidden representation describing the node's state at time step t are denoted by $h^t_v$, and where $\Omega v$ denotes a set of neighboring nodes of v; wherein each node uses information from its neighbors to update its hidden state; and wherein the update is decomposed into two steps: a message update and a hidden state update. In another aspect, the message update step includes combining messages sent to node v into a single message vector $m^t_v$ according to the relation:

$$m_v^t = \mathcal{M}(\{h_u^t | u \in \Omega_v\})$$

where M is the function to update the message.

In another aspect, the hidden state update step, hidden states $h^t_v$ at each node in the graph are updated based on messages $m^t_v$ according to:

$$h_v^{t+1} = \mathcal{F}(h_v^t, m_v^t)$$

where F is the function to update the hidden state.

In another aspect, the message update step includes combining messages sent to node v into a single message vector $m^t_v$ according to the relation:

$$m_v^t = \mathcal{M}(\{h_u^t | u \in \Omega_v\})$$

where M is the function to update the message; and wherein the hidden state update step, hidden states $h^t_v$ at each node in the graph are updated based on messages $m^t_v$ according to:

$$h_v^{t+1} = \mathcal{F}(h_v^t, m_v^t)$$

where F is the function to update the hidden state.

In another aspect, M and F are feedforward neural networks that are shared among different time steps. In another aspect, the graph neural network is adapted for multi-label classification, and each node represents one category (V={1; . . . ; C}) and the edges represent the connections between the categories. In another aspect, a fully connected graph is used to model correlation between all categories. In another aspect, a partially connected graph is used to model correlation between all categories.

In another aspect, the message update function is:

$$m_v^t = \frac{1}{|\Omega_v|} \sum_{u \in \Omega_v} g \mid (h_u^t);$$

where g is a multi-layer perceptron (MLP); and wherein the message is computed by first feeding hidden states to the MLP g and then taking the average over the neighborhood.

In another aspect, g is a fully connected layer with ReLU.

In another aspect, the hidden state update function is:

$$h_v^{t+1} = \text{GRU}(h_v^t, m_v^t),$$

where the GRU is a gated recurrent unit, and the hidden state is updated based on the incoming messages and the previous hidden state.

A computer implemented method for predicting missing labels using curriculum learning, the method including: iteratively labelling unlabelled labels of a plurality of training examples with one or more predicted labels generated using a self-paced model adapted for optimizing an objective function based at least on the relation:

$$\min_{w \in \mathbb{R}^d, v \in \{0,1\}^{N \times C}} J(w, v) = \beta \|w\|^2 + G(v; \theta) + \frac{1}{N} \sum_{i=1}^{N} \frac{1}{C} \sum_{c=1}^{C} v_{ic} \ell_c(f_w(\mathcal{I}^{(i)}), y_c^{(i)}) \quad (7)$$

where $l_c$ is the loss for category c and $v_i \in \{0, 1\}C$ is a vector to represent the selected labels for the i-th sample; where vic=1 (resp. vic=0), such that that the c-th label of the i-th example is selected (resp. unselected); and where the function G defines a curriculum, parameterized by θ, which defines a learning approach.

In another aspect, the learning approach includes a score threshold strategy. In another aspect, the learning approach includes a score proportion strategy. In another aspect, the learning approach includes a predict only positive labels strategy. In another aspect, the learning approach includes a model ensemble score threshold strategy. In another aspect, the learning approach is iterated until a predefined number of iterations are conducted.

In another aspect, the learning approach is iterated until a predefined level of unreliability is reached.

In another aspect, wherein the learning approach is used to improve the label proportion of at least one training example of the plurality of training examples. In another aspect, wherein the loss function is modified to discriminate between original labels of the plurality of training examples and the predicted labels.

In various further aspects, the disclosure provides corresponding systems and devices, and logic structures such as machine-executable coded instruction sets for implementing such systems, devices, and methods.

In some embodiments, a machine learning system for usage on data sets with partial annotations is provided in the form of a physical computer appliance or specially configured machine having machine-interpretable instructions stored thereon in non-transitory computer readable media, and processors for executing the machine-interpretable instructions. The machine learning system, for example, can be a hardware appliance or a specially programmed computer that resides within a data center and is coupled to other computer systems across a message bus or a network.

The machine learning system receives inputs in the form of data sets having partial annotations from the other computer systems. These data sets can include, for example, image data, video data, event logs, monitored network metrics, infrastructure usage logs, facial data, handwriting data, financial/personal information data, among others.

Annotations may be partial for various reasons—there may only be a limited amount of labels available (e.g., expense to hire people to annotate images), the data may simply not be available (e.g., financial data held by another financial institution), the data may not be provided (e.g., the user omitted a postal code when rushing to complete a purchase), or the data may relate to events that have not occurred yet.

The data sets are provided and the machine learning system is adapted to conducting training based on the partial annotations, as noted in embodiments above. In an embodiment, the machine learning system conducts training and can be utilized to estimate labels for the unlabelled annotations. The estimated labels can be added to the data, and may be associated with a confidence level based on the confidence level assigned from the system when generating the estimated label.

The data set along with the estimated labels can then be used by downstream machine learning systems, and the confidence levels can be used to weight a level of reliance on a particular label. In a second embodiment, the machine learning system conducts training and is used to generate predictions from the data set despite only partial labels being available (e.g., the machine learning system can be utilized to predict logits for a set of potential output nodes). Accordingly, the system can be used for different purposes: to provide a trained neural network, to provide estimated/inferred labels for improving the completeness of an incomplete data set, and/or to conduct predictions based on partial annotations.

To expand upon the example relating to financial data, a financial institution may have incomplete information about a customer as the customer may conduct activities at other institutions. The system can be utilized to conduct predictions based on the incomplete information, or to aid in estimating labels for the incomplete information. The customer may have a credit card and a chequing account, but may have a retirement savings account at another financial institution. Other data available can include specific credit card transaction data, which shows that this is a person who spends a lot of money on healthcare.

Using data available from different categories of users, and ground truth labelling for some and partial labels for others, the system can be used to estimate whether this person has a retirement savings account and, for example, how much may be in the retirement savings account. For the updated labels, they can be marked as "inferred labels". The graph neural network approach described above can aid in modelling different attributes, as, for example, some labels, such as "person has a child", "person has a car", "person owns a small business" may require different parameters in a learning algorithm. A graph neural network can be used to model correlations and relationships between different attributes.

The system can be provided as a computer server or a computer program product stored on a non-transitory computer medium in the form of machine-interpretable instructions, which when executed by a processor of the computer, perform steps of methods described herein in various embodiments.

The computer server can include processors, computer memory, communications/networking interfaces that receive and/or communicate data sets (e.g., partially annotated data sets). The interfaces can connect to messaging buses, for example, which allow for data messages and packets to be communicated with other systems (e.g., a data storage storing partially annotated image data).

The computer server can be provided in the form of a rack mounted appliance or other type of modular computer system that can be provided, for example, in a data center.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting. Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 2C is an example method for training a neural network with an improved loss function, according to some embodiments.

FIG. 2E is an example method for predicting labels for missing labels, according to some embodiments.

FIGS. 8A-8H are plots showing results for different metrics on MS COCO val2014 to analyze the sensibility of the initial label set, according to some embodiments.

FIGS. 15A-15H are plots showing improvement analyses between partial-BCE and BCE for different metrics on MS COCO val2014, according to some embodiments.

FIGS. 17A-17H are plots showing improvement analysis between partial-BCE and BCE for different metrics on Pascal VOC 2007, according to some embodiments.

DETAILED DESCRIPTION

One of the reasons that multi-label data classification are still very difficult is that multi-label data are more complex and difficult that single-label data [40]. Some embodiments described herein are adapted to issues where labelling is incomplete such that the training examples are partially labelled and partially unlabelled. For example, in the context of medical patient data, a population of patients may be used as the training sample but information known about each of the patients may be inconsistent (the weight is known for some, the height for others, some are vegetarians, some have diabetes, etc.).

The more labels are required associated with data examples, the more difficult it is to obtain a good training set of examples, as the effort for providing labels scales quickly and becomes impractical. Furthermore, many practical data sets that can be used for training are provided in a partially annotated format (e.g., labelling is incomplete).

Effectively training machine learning systems with incomplete/partial labels is a practical, technical problem that solutions described herein attempt to overcome. In particular, an approach to modify loss functions on a proportionality basis is noted in some embodiments. In other embodiments, a graph neural network is provided to help identify correlations/causations as between categories. In another set of embodiments, a prediction approach is described to, based on originally provided labels, predict labels for unlabelled training samples such that the proportion of labelled labels relative to all labels is increased.

These approaches are technical solutions to technical problems, and improve how computing systems are able to utilize and process training data with partial annotations, reducing a need for fully labelled training data (which, in some situations, is an impractical or impossible request) while improving training outcomes. Additional, more specific embodiments are described that further tune the solutions to adapt to aspects of the training data to further improve performance. For example, the selection of hyper-parameters for use in the function can be guided through a known proportion of labels.

The solutions described herein can be used individually or in conjunction, according to various embodiments. For example, the prediction approaches can be used to improve a proportion of labelled data, and furthermore, the predicted labels and the original labels could, in some embodiments, be treated differently in the loss function. Accordingly, the improved proportion of labelled data, can be used in conjunction with the loss function of some embodiments. Image classification is described as an example embodiment, but other applications where there are multiple labels are contemplated.

Figure 1:
FIG. 1 are illustrations showing example images for the query "car" (first row) and "Tesla™ car" (second row). Each image contains the query but other categories can be presented like person (right images).
Figure 1:
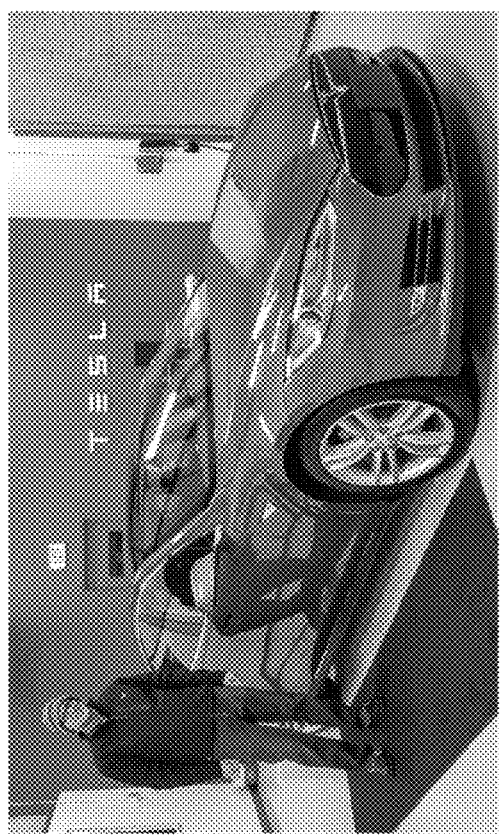
Figure 1:
Figure 1:
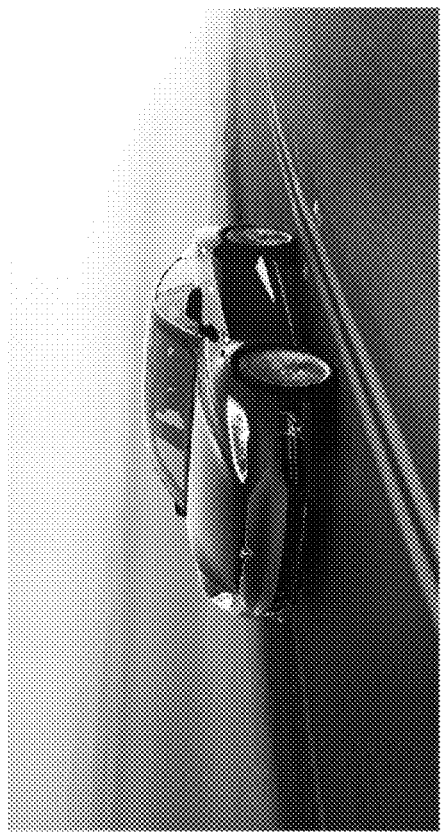

As shown in FIG. 1, some objects (e.g., person) can have different sizes and be at different locations in the image. Four images are shown in FIG. 1. Most of the single-label image datasets (e.g., ImageNet) contain iconic images i.e., images having a single large object centered in the image whereas most of the multi-label image datasets (e.g., MS COCO [35]) contain non-iconic images. In real-world applications, most of the images represent scenes and are inherently multi-label [35].

The two main (and complementary) strategies to improve the image classification performances are: (a) designing/learning better model architectures [41, 20, 48, 64, 14, 58, 51, 43, 65, 36] and (b) learning with more labeled data [49, 37]. However, collecting a large-scale multi-label dataset is more difficult and less scalable than collecting a single label dataset [13], because collecting a consistent and exhaustive list of labels for every image requires significant effort.

To overcome this challenge, [49, 33, 37] generated automatically the labels by using web supervision. But the drawback of these approaches is that the annotations are noisy and not exhaustive, and [63] showed that learning with corrupted labels can lead to very poor generalization performance. Some methods have been proposed to learn with noisy labels [54]. In various embodiments described herein, an orthogonal approach is described where each example is annotated with clean partial labels. For each image, the system is privy to information of the label of some categories but the remaining labels are unknown (see Table 1). For instance, the system may have training data indicating that there is a car and there is not bear in the image, but the system does not have no information if there is a person, a boat or an apple. The images are sparsely labeled.

Learning with partial annotations relaxes the constraint of the exhaustive list of labels. With crowdsourcing platforms like Amazon Mechanical Turk (AMT)™ and Google Image Labeller™, it is easy to know some labels for random images.

TABLE 1

Example of annotations for the top right picture of FIG. 1.

|  | car | person | boat | bear | apple |
|---|---|---|---|---|---|
| fully supervi. | ✓ | ✓ | X | X | X |
| partially supervi. | ✓ |  |  | X |  |
| webly supervi. | ✓ | X | X | X | X |

In the partially supervised setting some annotations are missing (person, boat and apple) whereas in the webly supervised setting one annotation is wrong (person).

An example application where it easy to have some partial annotations includes crowdsourcing tasks. It is difficult to find an expert that can annotate all the categories when the number of categories become large. Learning with partial labels allows an approach to add a new category without labeling each image. It is only necessary to have some positive and negative examples (e.g., by reCAPTCHA™). This is an important distinction and provides a technical advantage as in practical approaches, it is desirable to be able to add categories without undertaking the expense and effort of labelling every single image accordingly.

Learning with partial annotations (or missing labels) is different from semi-supervised learning [6] because in the semi-supervised learning setting, only a subset of the examples is labeled with all the labels and the other examples are unlabeled whereas in the learning with partial labels setting, all the images are labeled but only with a subset of labels.

In the experiments described herein, a comparison is provided in relation to the two strategies and, for some embodiments, it is demonstrated that for the same number of annotations, using learning with partial annotations is better than semi-supervised learning. For example, there may be higher accuracy for a same amount of labelling effort, etc.

Note that [12] also introduced a partially labeled learning problem but this problem is different from the problem studies described in various embodiments herein. In the partially labeled learning problem, also called ambiguously labeled learning problem, each example is annotated with multiple labels but only one of which is correct.

To summarize, the contribution of various embodiments is threefold:

A new loss function is proposed that weights an example with respect to its label proportion. The loss function is significantly better than the standard binary cross-entropy loss when learning with partial labels. The proposed loss allows to have the same training settings that when learning with all the annotations. Different strategies based on Curriculum Learning are explored [2] to predict the unknown/missing annotations. convolutional neural networks are not robust to noise [63]. It also allows to exploit unlabeled images during training via label propagation.

As noted herein, it is possible to learn a convolutional neural network for multi-label image classification with partial annotations on several datasets. This disclosure analyzes the performances for different proportions of labels. In particular, Applicants show that for the same label cost (i.e., same number of labels) it is better to annotate a subset of categories for all images than all categories for a subset of images.

Learning with partial/missing labels: Due to the incompleteness nature of multi-label learning, several methods have been proposed to solve the problem of multi-label learning with missing labels (MLML). The first and simple approach is to treat the missing labels as negative labels [50, 3, 38, 56, 49, 37]. The MLML problem becomes a fully labeled multi-label learning problem. This solution is used on most webly supervised approaches [49, 37]. The standard assumption is that only the category of the query is present (e.g., car in FIG. 1) and all the other categories are absent. However, the performance dropped because many of ground-truth positive labels are initialized as negative labels [25].

A second solution is the Binary Relevance (BR) [53], which treats each label as an independent binary classification. But this approach is not scalable when the number of categories grows and it ignores the correlations between labels and between instances, which could be helpful for recognition. Unlike BR, various embodiments described herein allows to learn a single model by using partial labels.

To overcome the second problem, several works proposed to exploit some label correlations from the training data to propagate the label information from the provided labels to missing labels. [4, 59] used a matrix completion approach to fill in missing labels. These methods exploit label-label correlations and instance-instance correlations with low-rank regularization on the label matrix to complete the instance-label matrix.

Similarly, [62] introduced a low rank empirical risk minimization, [57] used a mixed graph to encode a network of label dependencies and [38, 13] learned correlation between the categories to predict some missing labels. Unlike most of the existing models that assume that the correlations are linear and unstructured, [60] proposed to learn structured semantic correlations. Another strategy is to treat missing labels as latent variables in probabilistic models. This approach allows to predict the missing labels by performing posterior inference. [26, 55] used models based on Bayesian networks [22] whereas [10] proposed a deep sequential generative model based on Variational Auto-Encoder framework [28] that also allows to deal with unlabeled data.

However, most of these works cannot be used to learn a deep convolutional neural networks. They require to solve an optimization problem that need to put all the training set in memory, so it is not possible to use mini-batch strategy to fine-tune the model. This is limiting because it is well-known that fine tuning is important to transfer pre-trained architecture [29]. Some methods are also not scalable because they require to solve convex quadratic optimization problems [57, 60] that are intractable for large-scale datasets. Unlike these methods, embodiments herein propose a model that is scalable and end-to-end learnable. To train the model, some embodiments herein introduce a new loss function that adapts itself to the proportion of known labels per example. Similarly to some MLML methods, several strategies are explored to label missing labels by using the learned classifier.

Curriculum Learning/Never-Ending Learning: To predict missing labels, an iterative strategy based on Curriculum Learning is described in various embodiments [2]. The idea of Curriculum Learning is inspired by the way human learns: start to learn with easy samples/subtasks, and then gradually increase the difficulty level of the samples/subtasks.

But, the main problem in using the curriculum learning is to measure the difficulty of an example. To solve this problem, [31] used the definition that easy samples are ones whose correct output can be predicted easily. They introduced an iterative self-paced learning (SPL) approach where each iteration simultaneously selects easy samples and updates the model parameters. [23] generalizes the SPL to different learning schemes by introducing different self-paced functions. Instead of using human-designed heuristics, [24] proposed MentorNet, a method to learn the curriculum from noisy data.

Similarly to some embodiments described herein, [19] recently introduced the CurriculumNet that is a model to learn from large-scale noisy web images with a curriculum learning approach. However this strategy is designed for multi-class image classification and cannot be used for multi-label image classification because it uses a clustering-based model to measure the difficulty of the examples.

Some embodiments described herein are also related to the Never-Ending Learning (NEL) paradigm [39]. The key idea of NEL is to use previously learned knowledge to improve the learning of the model. [32] proposed a framework that alternatively learns object class models and collects object class datasets. [5, 39] introduced the Never-Ending Language Learning to extract knowledge from hundreds of millions of web pages. Similarly, [7, 8] proposed the Never-Ending Image Learner to discover structured visual knowledge. Unlike these approaches that use previously learned model to extract knowledge from web data, some embodiments herein use the learned model to predict missing labels.

Figure 2A:
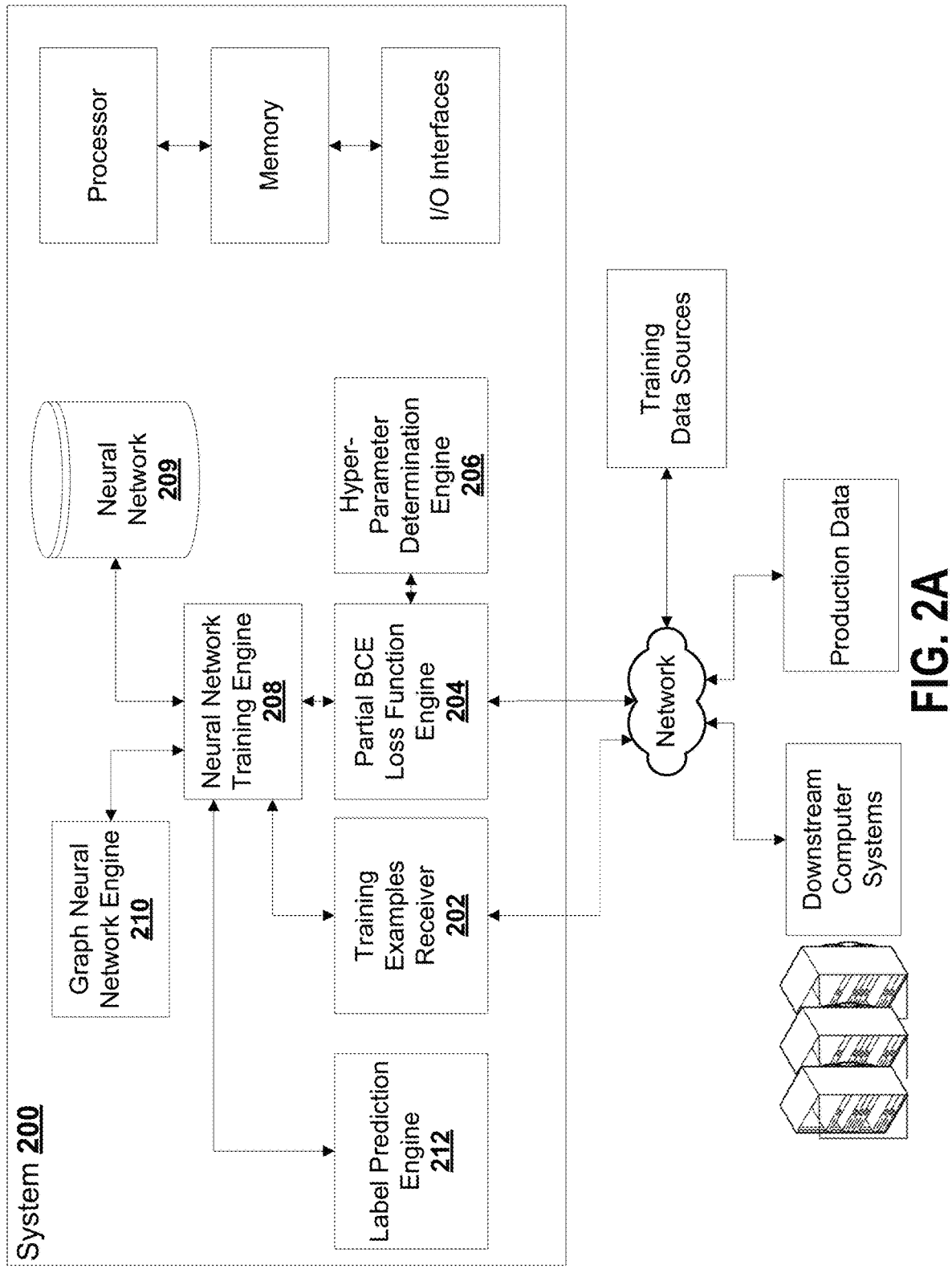
FIG. 2A is a block schematic diagram of an example system, according to some embodiments.

FIG. 2A is an example block schematic of a neural network system, according to some embodiments. Computing components are shown as examples, and are not meant to be limiting. These components are implemented using electronic circuits and combinations of computer hardware, software, and firmware. A training examples receiver 202 receives data sets including training data and their associated labels.

As noted in embodiments below, the neural network training engine 208 is adapted to iteratively tune weightings between computing nodes of neural network 209, which is adapted for classifications in view of data having multiple labels. A partial binary cross-entropy loss function engine 204 is utilized to receive the training examples and weight them for loss function determination, as noted in various embodiments below. In a variant embodiment, hyper-parameter determination engine 206 is utilized to tune the binary cross-entropy loss function for increased performance.

Graph neural network engine 210 can be utilized to make inferences that rely on correlation or causation. The label prediction engine 212 is adapted for generating and applying labels to missing labels in the training data set, and in some embodiments, outputs an enhanced training data set having a greater proportion of labelled data relative to the original training data set.

As noted in various embodiments, an objective is to train deep convolutional neural networks given partial labels. The notations of the problem are first defined. Then, a binary cross-entropy for partial labels is introduced, for example in accordance with the method shown in FIG. 2C, from steps 252-262. A graph neural network is proposed to explicitly model the correlations between categories, and a method for generating the graph neural network is shown as an example method in FIG. 2D, steps 272-278. Finally, a curriculum-based approach is also proposed that uses the previous contributions to label some missing labels, shown in FIG. 2E, steps 282-286. Each of these aspects can be considered independently, and also in conjunction with one another, in accordance with various embodiments.

Notations.

Applicants note C the number of categories and N the number of training examples. Applicants denote the training data as $D=\{(I^{(1)}; y^{(1)}); \ldots; (I^{(N)}; y^{(N)})\}$, where $I^{(i)}$ is the i-th image and $y^{(i)}=[y_1^{(i)}, \ldots, y_C^{(i)}] \in y \subseteq \{-1, 0, 1\}^C$ is the label vectors. For a given example i and category c, $y_c^{(i)}=1$ means that the category is present, $y_c^{(i)}=-1$ means that the category is absent and $y_c^{(i)}=0$ means that the label is unknown.

$y=[y^{(1)}; \ldots; y^{(N)}] \in \{-1, 0, 1\}^{N \times C}$ is the matrix of labels of the training set. It is noted that $f_w$ is a deep convolutional neural network and w its parameters. $x^{(i)}=[x_1^{(i)}, \ldots, x_C^{(i)}]=f_w(I^{(i)}) \in \mathbb{R}^C$ is the output (before sigmoid) of the deep convolutional neural network $f_w$ for image $I^{(i)}$.

Binary cross-entropy for partial labels: An approach to train a model for multi-label classification is the binary cross-entropy (BCE). To be independent of the number of categories, the BCE loss is normalized by the number of classes. It becomes a drawback for partially labeled data because the back-propagated gradient becomes small. To overcome this problem, Applicants have proposed a partial-BCE loss that normalizes the loss by the proportion of known labels:

$$\ell(x, y) = \frac{g(p_y)}{C} \sum_{c=1}^{C} \left[ 1_{[y_c=1]} \log\left(\frac{1}{1+\exp(-x_c)}\right) + 1_{[y_c=-1]} \log\left(\frac{\exp(-x_c)}{1+\exp(-x_c)}\right) \right] \quad (1)$$

where $p_y \in [0, 1]$ is the proportion of known labels in y and g is a normalization function with respect to the label proportion. Note that the partial-BCE loss ignores the categories for unknown labels ($y_c=0$). In the standard BCE loss, the normalization function is $g(p_y)=1$. Unlike the standard BCE, the partial-BCE gives the same importance to each example independently to the number of known labels which is useful when the proportion of labels per image is not fixed. This loss adapts itself to the proportion of known labels.

How to design the normalization function g: The function g normalizes the loss function with respect to the label proportion. An objective is that the partial-BCE loss has the same behavior than the BCE loss when all the labels are present i.e., $g(1)=1$.

In some embodiments, the following normalization function is used:

$$g(p_y) = \alpha p_y^\gamma + \beta$$

Figure 2B:
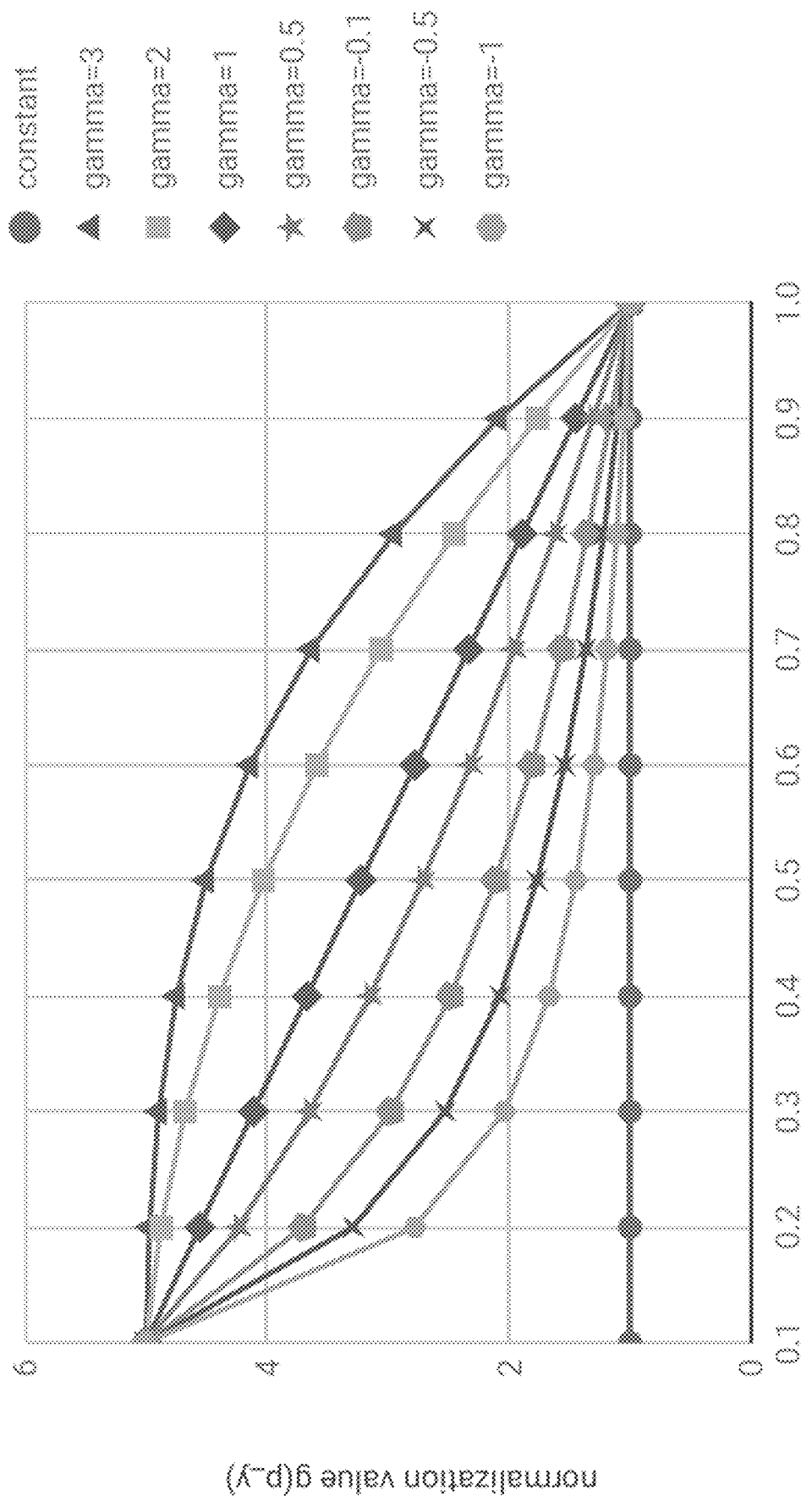
FIG. 2B is a plot showing examples of the weight function g (Equation 2) for different values of hyper-parameter with the constraint g (0.1)=5, according to some embodiments.
Figure 2D:
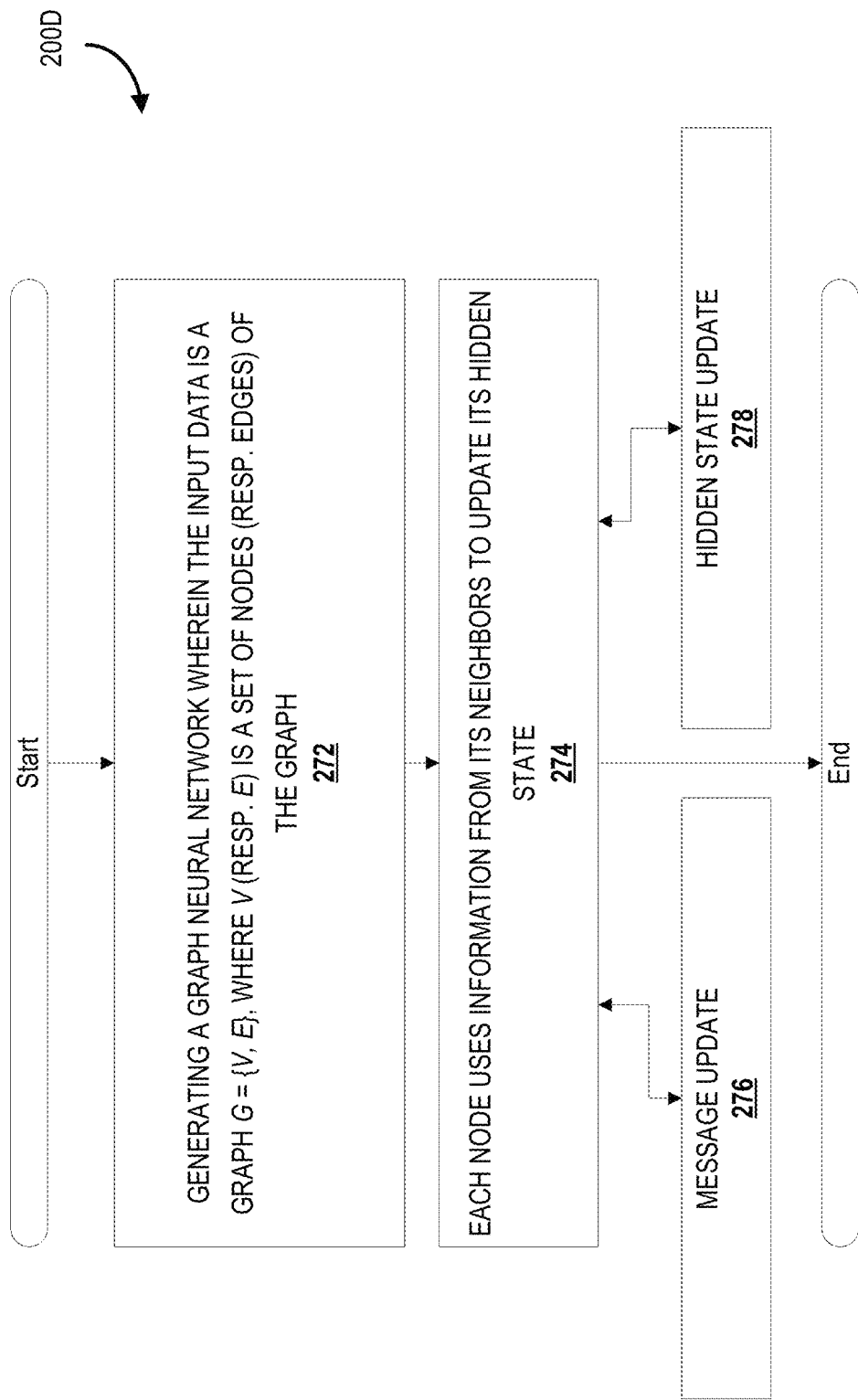
FIG. 2D is an example method for establishing a graph neural network, according to some embodiments.

FIG. 2B provides examples of the weight function g (Equation 2) for different values of hyper-parameter $\gamma$ with the constraint $g(0.1)=5$.

$\gamma$ controls the behavior of the normalization with respect to the label proportion Py. where $\alpha$, $\beta$ and $\gamma$ are the hyper-parameters that allows to generalize several standard functions. For instance with $\alpha=1$, $\beta=0$ and $\gamma=-1$, this function weights each example inversely proportional to the proportion of labels. It is equivalent to normalize by the number of known classes instead of the number of classes.

Given a $\gamma$ value and the weight for a given proportion (e.g., $g(0.1)=5$), the approach can find the hyper-parameters $\alpha$ and $\beta$ that satisfies these constraints.

The hyper-parameter $\gamma$ controls the behavior of the normalization with respect to the label proportion. In FIG. 2B, the function for different values of $\gamma$ given the constraint $g(0.1)=5$. For $\gamma=1$ the normalization is linearly proportional to the label proportion, whereas for $\gamma=-1$ the normalization value is inversely proportional to the label proportion. The importance of each hyper-parameters is considered in the experimental section below.

Multi label classification with graph neural network: To model the interactions between the categories, in some embodiments, a Graph Neural Network (GNN) [18, 46] is proposed on top of a convolutional neural network. The GNN is first introduced below and then details how the GNN is used for multi-label classification is provided later.

For GNNs, the input data is a graph $G=\{V, E\}$ where V (resp. E) is the set of nodes (resp. edges) of the graph. For each node $v \in V$, the input feature vector $x_v$ is denoted and its hidden representation describing the node's state at time step t by $h_v^t$. $\Omega_v$ is used to denote the set of neighboring nodes of v.

A node uses information from its neighbors to update its hidden state.

The update is decomposed into two steps: message update and hidden state update. In the message update step combines messages sent to node v into a single message vector according to:

$$m_v^t = \mathcal{M}(\{h_u^t | u \in \Omega_v\}) \quad (3)$$

Where M is the function to update the message.

In the hidden state update step, the hidden states $h_v^t$ at each node in the graph are updated based on messages $m_v^t$ according to:

$$h_v^{t+1} = \mathcal{F}(h_v^t, m_v^t) \quad (4)$$

where F is the function to update the hidden state. M and F are feedforward neural networks that are shared among different time steps. Note that these update functions specify a propagation model of information inside the graph.

GNN for multi-label classification: For multi-label classification, each node represents one category ($V=\{1, \ldots, C\}$) and the edges represent the connections between the categories. A fully-connected graph is used to model correlation between all categories, but other embodiments can use partially connected graphs. The node hidden states are initialized with the convolutional neural network output. The GNN functions are described below.

Message update function M. The approach can use the following message update function:

$$m_v^t = \frac{1}{|\Omega_v|} \sum_{u \in \Omega_v} g(h_u^t) \quad (5)$$

where g is a multi-layer perceptron (MLP). Note that the g in this function is separate from the g used in the normalization function of equations (1) and (2).

The message is computed by first feeding hidden states to the MLP g and then taking the average over the neighborhood. In experiment analysis noted below, g is a fully-connected layer with ReLU, but other types of layers are contemplated as well.

Hidden state update function F. The following hidden state update function is used:

$$h_v^{t+1} = GRU(h_v^t, m_v^t) \quad (6)$$

which uses a Gated Recurrent Unit (GRU) [9]. The hidden state is updated based on the incoming messages and the previous hidden state.

Prediction of Unknown Labels: A method to predict some missing labels with a curriculum learning strategy is proposed [2]. A problem is formulated based on the self-paced model [31, 23] and the goal is to optimize the following objective function:

$$\min_{w \in \mathbb{R}^d, v \in \{0,1\}^{N \times C}} J(w, v) = \beta \|w\|^2 + G(v; \theta) + \frac{1}{N} \sum_{i=1}^{N} \frac{1}{C} \sum_{c=1}^{C} v_{ic} \ell_c(f_w(I^{(i)}), y_c^{(i)}) \quad (7)$$

where $\ell_c$ is the loss for category c and $v_i = \{0, 1\}^C$ is a vector to represent the selected labels for the i-th sample. $v_{ic}=1$ (resp. $v_{ic}=0$) means that the c-th label of the i-th example is selected (resp. unselected). The function G defines a curriculum, parameterized by $\theta$, which defines the learning scheme.

The first term (beta*||w||^2) is the regularization term. It forces the model to generalize to data unseen during training and prevents the model to converge to trivial solutions.

The second term (G(v, theta)) defines the curriculum function i.e. what is the strategy to define the easy examples. This term allows to define the strategies to select the easy examples used in Table 9. It defines the trade-off between the number of selected easy examples and the error of the selected examples.

The last term is the sum of the loss function for each image and each category. The variable v_ic indicates what images and labels are used during training. The loss function is applied only on "easy" pair image-labels.

An alternate approach is considered where w and v are alternatively minimized, one at a time while the other is held fixed.

The approach is shown in example algorithm 1. Initially, the model is learned with only clean partial labels. Then, the approach uses the learned model to add progressively new "easy" weak (i.e., noisy) labels in the training set, and then uses the clean and weak labels to continue the training of the model.

Applicants analyze different strategies to add new labels:

[a] Score threshold strategy. This strategy uses the classification score (i.e., convolutional neural network) to estimate the difficulty of a pair category-example. An easy example has a high absolute score whereas a hard example has a score close to 0. The learned model is used on partial labels to predict the missing labels only if the classification score is larger than a threshold θ>0.

When w is fixed, the optimal v can be derived by:

$$v_{ic} = 1[x_c^{(i)} \geq \theta] + 1[x_c^{(i)} < -\theta] \quad (8)$$

The predicted label is $y_c^{(i)} = \text{sign}(x_c^{(i)})$.

[b] Score proportion strategy. This strategy is similar to the strategy [a] but instead of labeling the pair category example higher than a threshold, a fixed proportion θ of pairs per min-batch are labelled. To find the optimal v, sort the example by decreasing order of absolute score and label only the top-θ% of the missing labels.

[c] Predict only positive labels. Because of the unbalanced annotations, the approach only predict positive labels with strategy [a]. When w is fixed, the optimal v can be derived by:

$$v_{ic} = 1[x_c^{(i)} \geq \theta] \quad (9)$$

[d] Model ensemble score threshold strategy. This strategy is similar to the strategy [a] but it uses an ensemble of models to estimate the confidence score. The classification score of each model is averaged to estimate the final confidence score. This strategy allows to be more robust than the strategy [a]. When w is fixed, the optimal v can be derived by:

$$v_{ic} = 1[E(\mathcal{I}^{(i)})_c \geq \theta] + 1[E(\mathcal{I}^{(i)})_c < -\theta] \quad (10)$$

---

Algorithm 1 Curriculum labeling

Input: Training data $\mathcal{D}$
1:     Initialize v with known labels
2:     Initialize w: learn the ConvNet with the partial labels
3:     repeat
4:         Update v (fixed w): find easy missing labels
5:         Update y: predict the label of easy missing labels
6:         Update w (fixed v): improve classification model with the clean and easy weak annotations
7:     until stopping criteria

--- where $E(\mathcal{I}^{(i)}) \in \mathbb{R}^C$ is the vector score of an ensemble of models. The predicted label is $y_c^{(i)} = \text{sign}(E(\mathcal{I}^{(i)})_c)$.

[e] Bayesian uncertainty strategy. Instead of using the classification score, the Bayesian uncertainty of each pair category-example is estimated [27]. An easy pair category-example has a small uncertainty. When w is fixed, the optimal v can be derived by:

$$v_{ic} = 1[U(\mathcal{I}^{(i)})_c \leq \theta] \quad (11)$$

where $U(\mathcal{I}^{(i)})$ is the Bayesian uncertainty of category c of the i-th example.

This strategy is similar to strategy [d] excepts that it uses the variance of the classification scores instead of the average to estimate the difficulty.

EXPERIMENTS

Datasets. Applicants have perform experiments on large publicly available multi-label datasets: Pascal VOC 2007 [16], MS COCO [35] and NUS-WIDE [11].

For each dataset, Applicants use the standard train/test sets introduced respectively in [16], [40], and [17]. From these datasets that are fully labeled, Applicants create partially labeled datasets by randomly dropping some labels per image. Applicants perform experiments for a proportion of known labels between 10% (90% of the labels are missing) and 100% (all labels).

Metrics. To evaluate the performances, Applicants use several metrics: mean Average Precision (MAP) [1], 0-1 exact match, Macro-F1 (M-F1) [61], Micro-F1 (m-F1) [52], per-class precision (PC-P), per-class recall (PC-R), overall precision (OV-P), overall recall (OV-R). These metrics are standard metrics for multi-label classification. Applicants mainly show the results for the MAP metric but results for other metrics are shown in supplementary.

Classification model. Applicants employ ResNet-WELDON [15] as a classification network. Applicants use a ResNet-101 [20] pertained on ImageNet as backbone architecture. Applicants show results for other architectures in supplementary. The hyper-parameters of the WELDON pooling function are $k^+ = k^- = 0.1$. Each image is resized to 448 448 with 3 color channels.

Implementation details. The models are implemented with PyTorch [42] and are trained with SGD during 20 epochs with a batch size of 16. The initial learning rate is 0:01 and it is divide by 10 after 10 epochs. During training, Applicants only use random horizontal flip as data augmentation. The same training setting is used for all experiments and is a standard setting when learning with all annotations. The hyper-parameters of the partial-BCE loss function are $\alpha = -4:45$, $\beta = 5:45$ (i.e., $g(0.1) = 5$) and $\gamma = 1$. To predict missing labels, Applicants use the Bayesian uncertainty strategy with $\theta = 0:3$.

Applicants investigate which is the superior strategy to annotate a dataset. In the first set of experiments, Applicants study three strategies to annotate a multi-label dataset. The goal is to answer to the question: what is the best strategy to annotate a dataset with a fixed budget of clean labels? Applicants explore the three following scenarios:

Partial labels. It is the strategy used in this paper. In this setting, all the images are used but only a subset of the labels per image are known. The known categories are different for each image.

Complete image labels or dense labels. In this scenario, only a subset of the images are labeled, but the labeled images have the annotations for all the categories. This is the standard setting for semi-supervised learning [6] except that Applicants do not use a semi-supervised model.

Noisy labels. All the categories of all images are labeled but some labels are wrong. This scenario is similar to the webly-supervised learning scenario [37] where some labels are wrong.

Figure 3A:
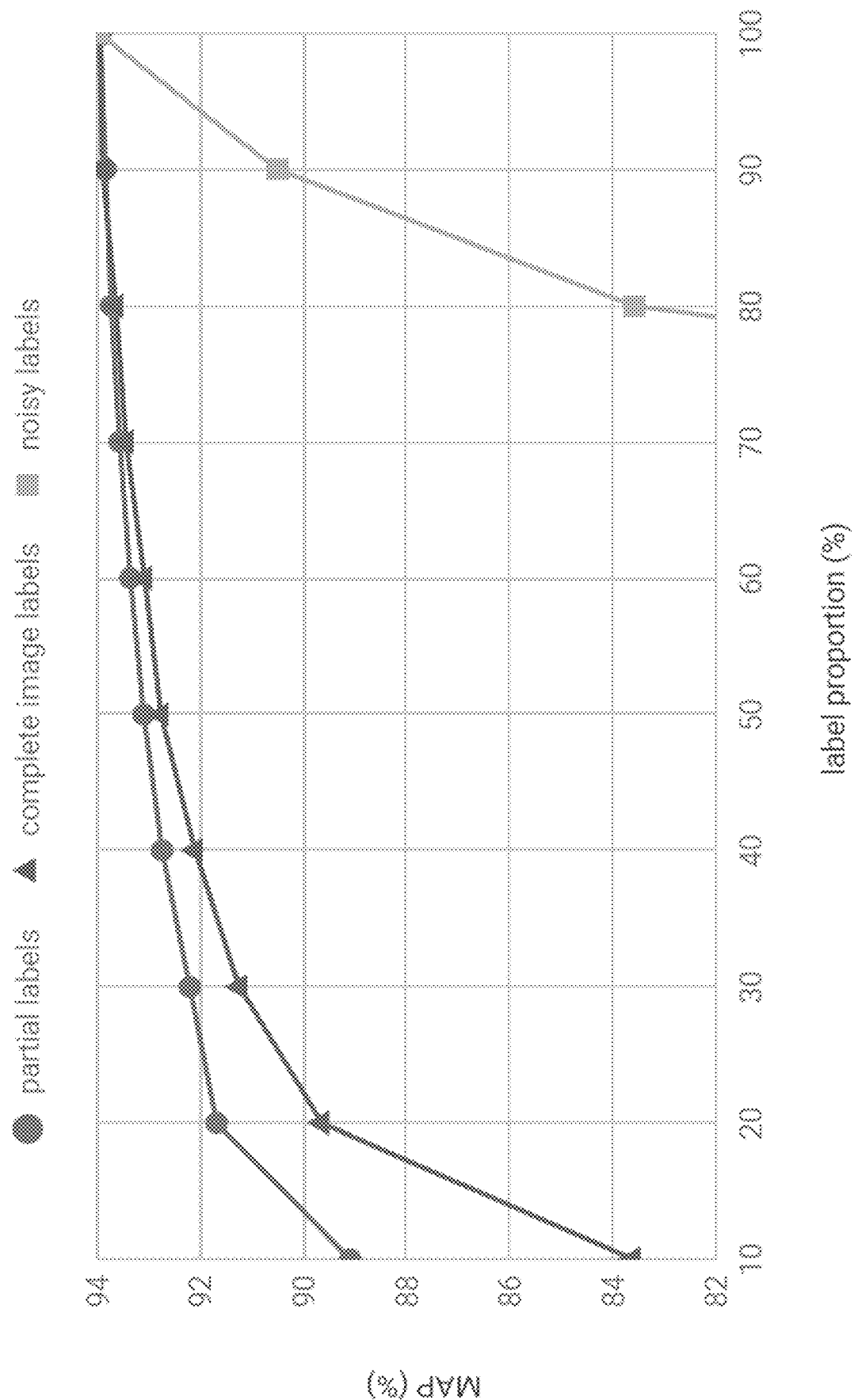
FIGS. 3A-3C are plots showing Pascal VOC 2007, MS COCO and NUS-WIDE for different libelling strategy: partial labels, semi-supervised and noisy labels, according to some embodiments. The x-axis shows the proportion of clean labels.
Figure 3B:
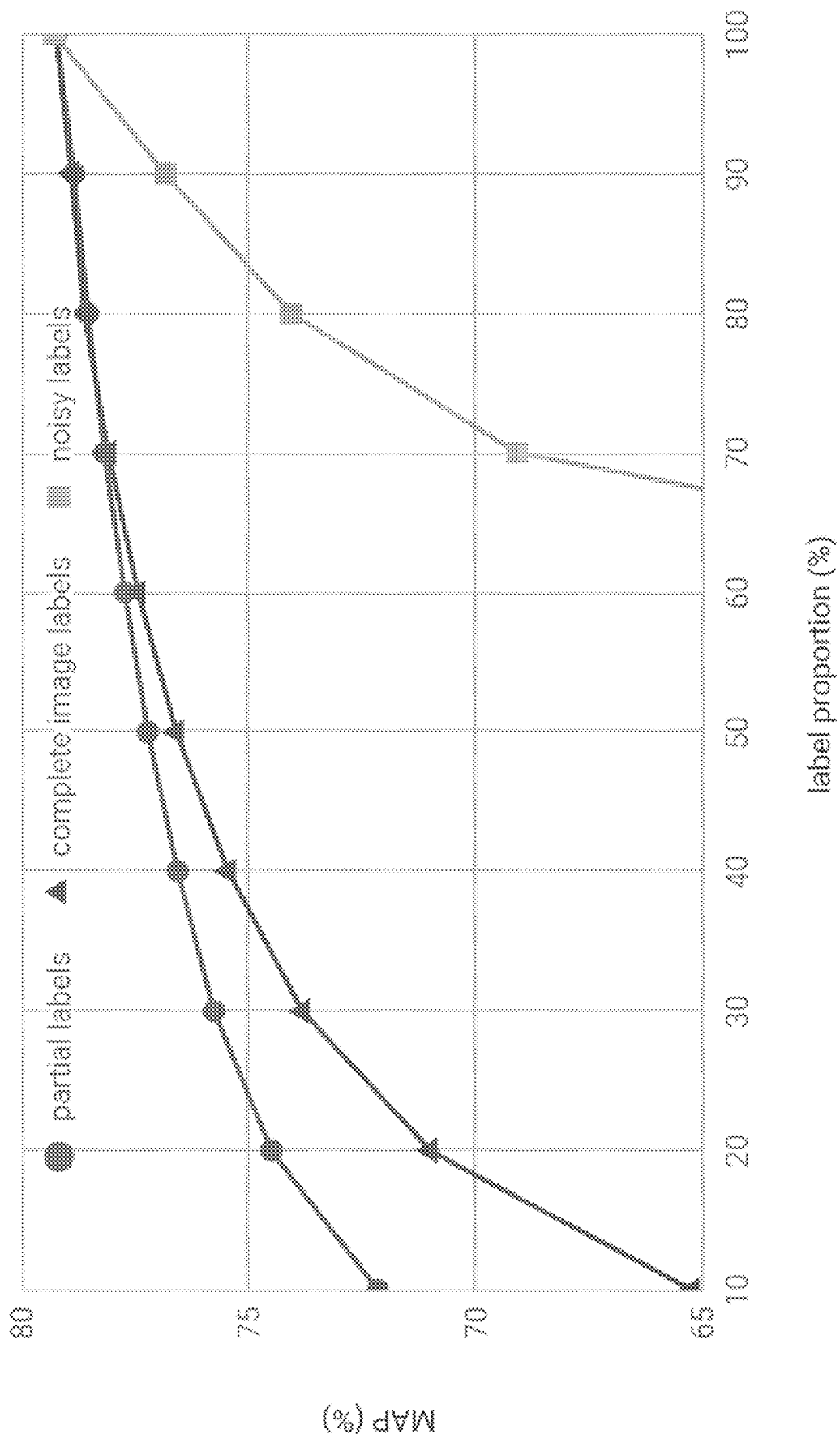
Figure 3C:
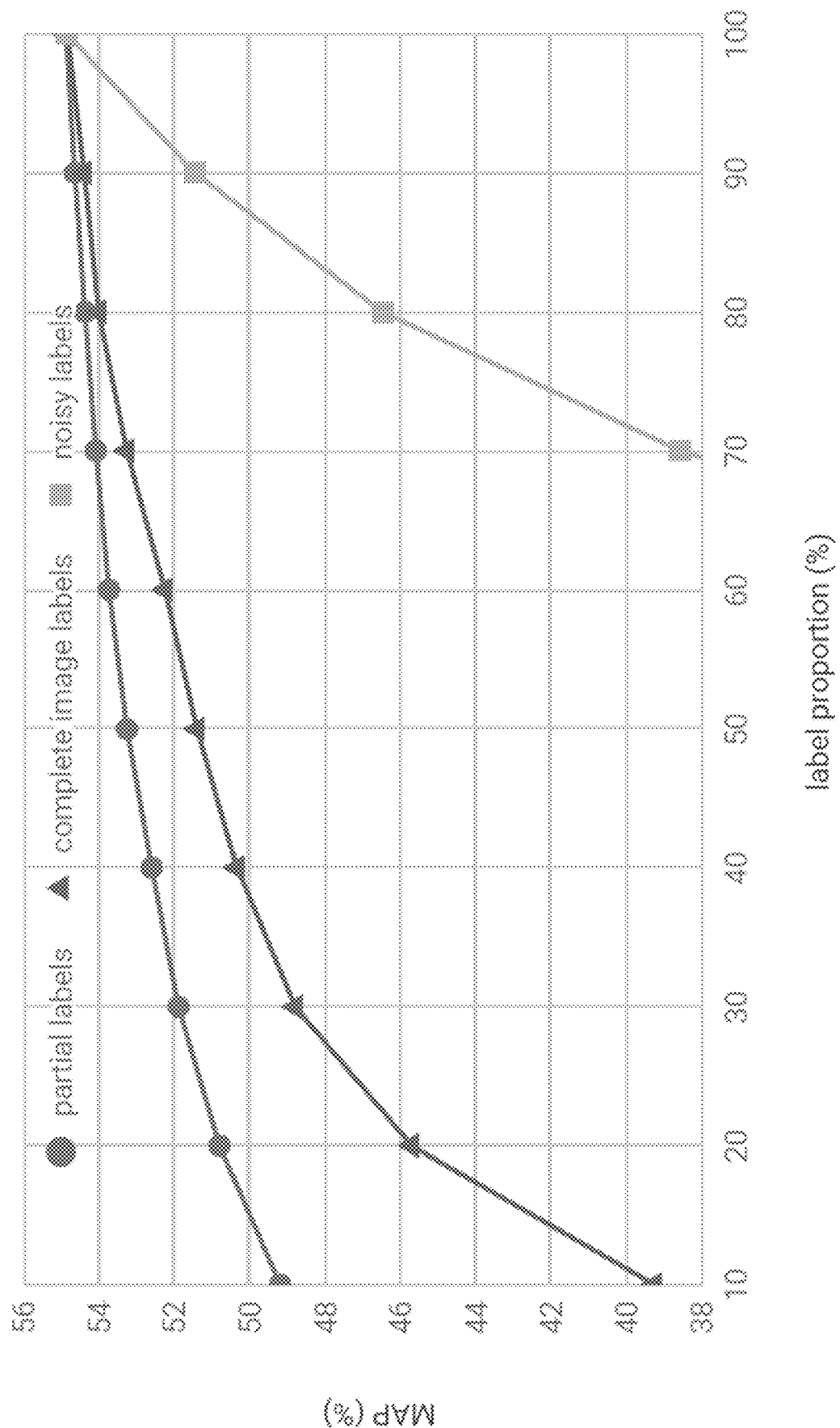

To have fair comparison between the approaches, Applicants use a BCE loss function for these experiments. The results are shown in FIGS. 3A-3C for different proportion of clean labels. For each experiment, Applicants use the same number of clean labels. 100% means that all the labels are known during training (standard classification setting) and 10% means that only 10% of the labels are known during training. The 90% of other labels are unknown labels for the partial labels and the complete image labels scenarios and are wrong labels for the noisy labels scenario. From this first experiment, Applicants can draw the following conclusions:

Given a fixed number of clean labels (i.e., similar annotation cost), Applicants observe that learning with partial labels is better than learning with a subset of dense annotations. The improvement increases when the label proportion decreases. 80% clean/20% wrong means that given an image, 80% of the labels are correctly annotated and 20% of the labels are incorrect. This experiment shows that incorrect labels can lead to bad performance because the model learns wrong decision. For instance, it forces the model to classify as a non-cat image as cat. The model try to find a common pattern between images containing cats and images that do not contain cat so the model will focus on some background pattern that are not semantically related to cat.

It is better to learn with a small subset of clean labels than a lot of labels with some wrong labels. Both partial labels and complete image labels scenarios are better than the noisy label scenario. For instance on MS COCO, Applicants observe that learning with only 20% of clean partial labels is better than learning with 80% of clean labels and 20% of wrong labels.

TABLE 2

Comparison with a webly-supervised strategy: noisy+.

| model | clean | partial 10% | noisy+ |
|---|---|---|---|
| % clean labels | 100 | 10 | 97.6 |
| % noisy labels | 0 | 0 | 2.4 |
| MAP | 79.22 | 72.15 | 71.60 |

Similarly to [49], Applicants observe that the performance increases logarithmically based on proportion of labels.

Noisy web labels. Another strategy to generate a noisy dataset from a multi-label dataset is to use only one positive label for each image. This is a standard assumption made when collecting data from the web [33] i.e., the only category present in the image is the category of the query.

This strategy transforms a multi-label problem in a single label problem. From the clean MS COCO dataset, Applicants generate a noisy dataset (named noisy+) by keeping only one positive label per image. If the image has more than one positive label, Applicants randomly select one positive label among the positive labels and switch the other positive labels to negative labels. The results are reported in Table 2 for three scenarios: clean (all the training labels are known and clean), 10% of partial labels and noisy+ scenario. Applicants also show the percentage of clean and noisy labels for each experiment. The noisy+ approach generates a small proportion of noisy labels (2.4%) that decreases the performances by about 7 pt with respect to the clean baseline.

Applicants observe that a model trained with only 10% of clean labels is slightly better than the model trained with the noisy labels. This experiment shows that the standard assumption made in most of the webly-supervised datasets is not good for complex scenes/multi-label images because it generates noisy labels that significantly decreases the generalization performance Learning with partial labels In this section, Applicants compare the standard BCE and the partial-BCE and analyze the impact of the GNN.

Figure 4A:
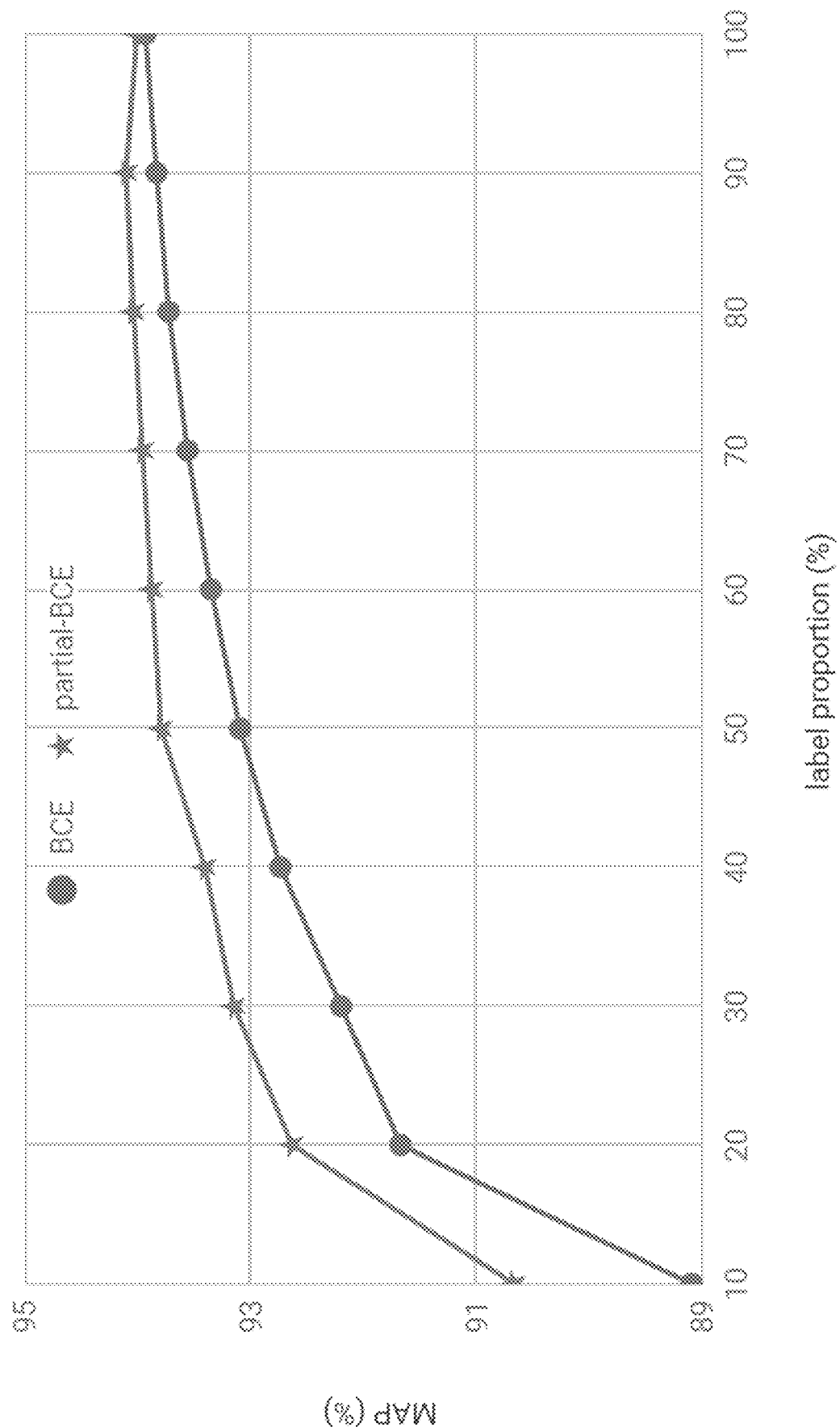
FIGS. 4A-4C are plots showing Pascal VOC 2007 MS COCO NUS-WIDE, according to some embodiments. Comparison of the BCE and the partial-BCE on Pascal VOC 2007, MS COCO and NUS-WIDE datasets.
Figure 4B:
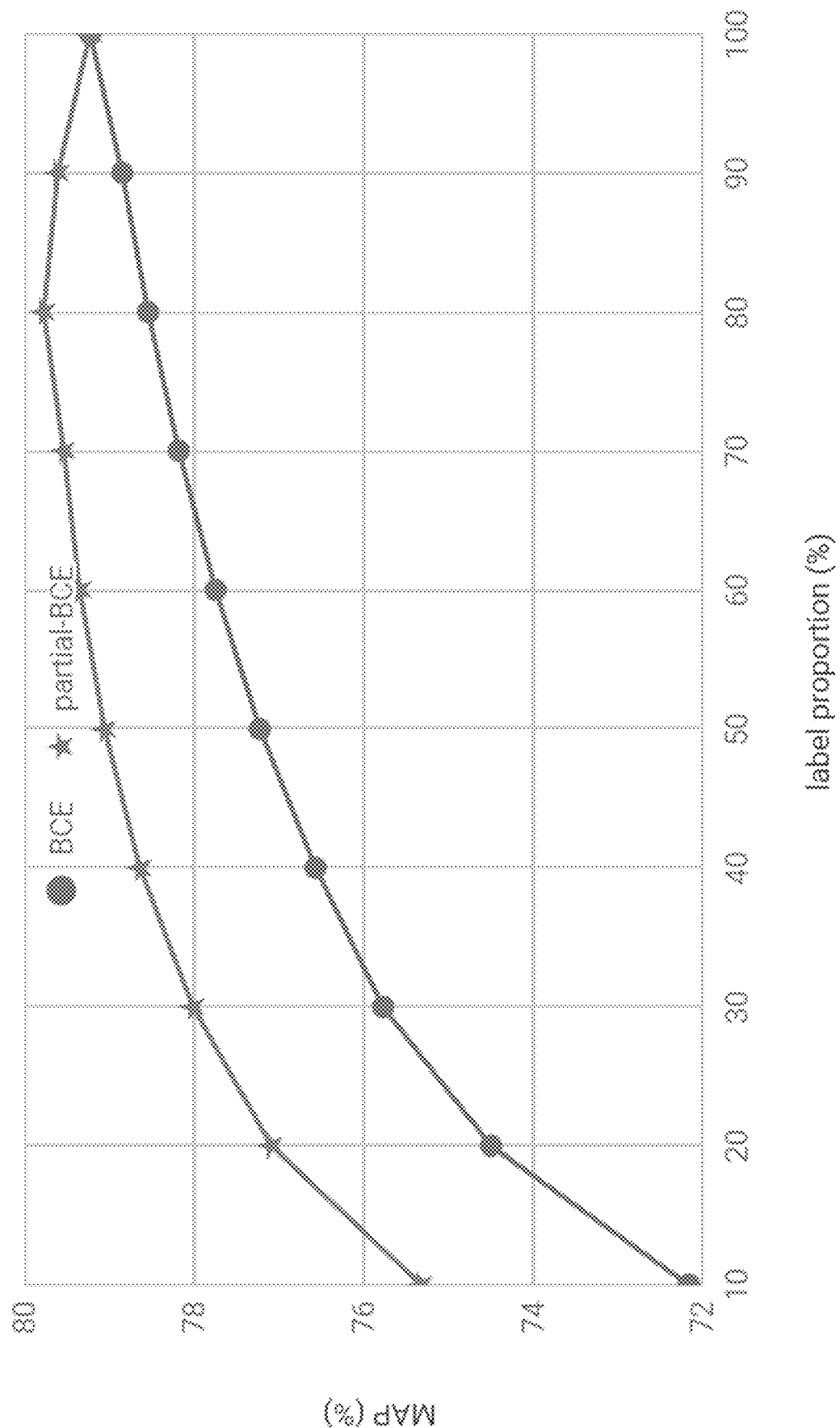
Figure 4C:
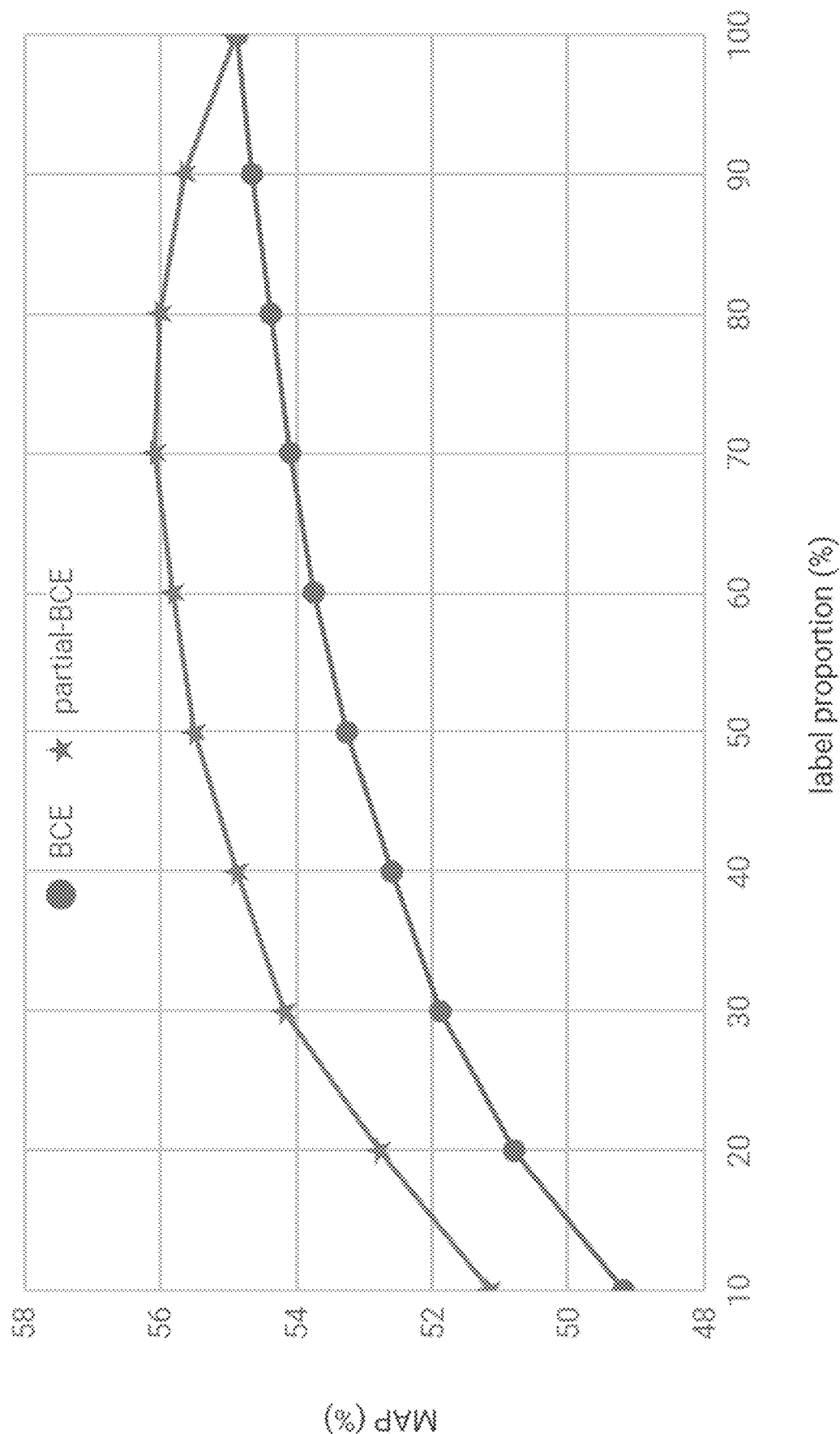

BCE vs partial-BCE loss function. The FIGS. 4A-4C shows the MAP results for different proportion of known labels on VOC 2007, MS COCO and NUS-WIDE, respectively. Additional results for different metrics are considered. For the three datasets, Applicants observe that using the partial-BCE significantly improves the performances: the lower the label proportion, the better the improvement. Applicants observe the same behavior for the other metrics. These experiments show that the loss learns better than the BCE because it exploits the label proportion information during training. It allows to learn efficiently while keeping the same training setting that with all annotations.

Figure 5:
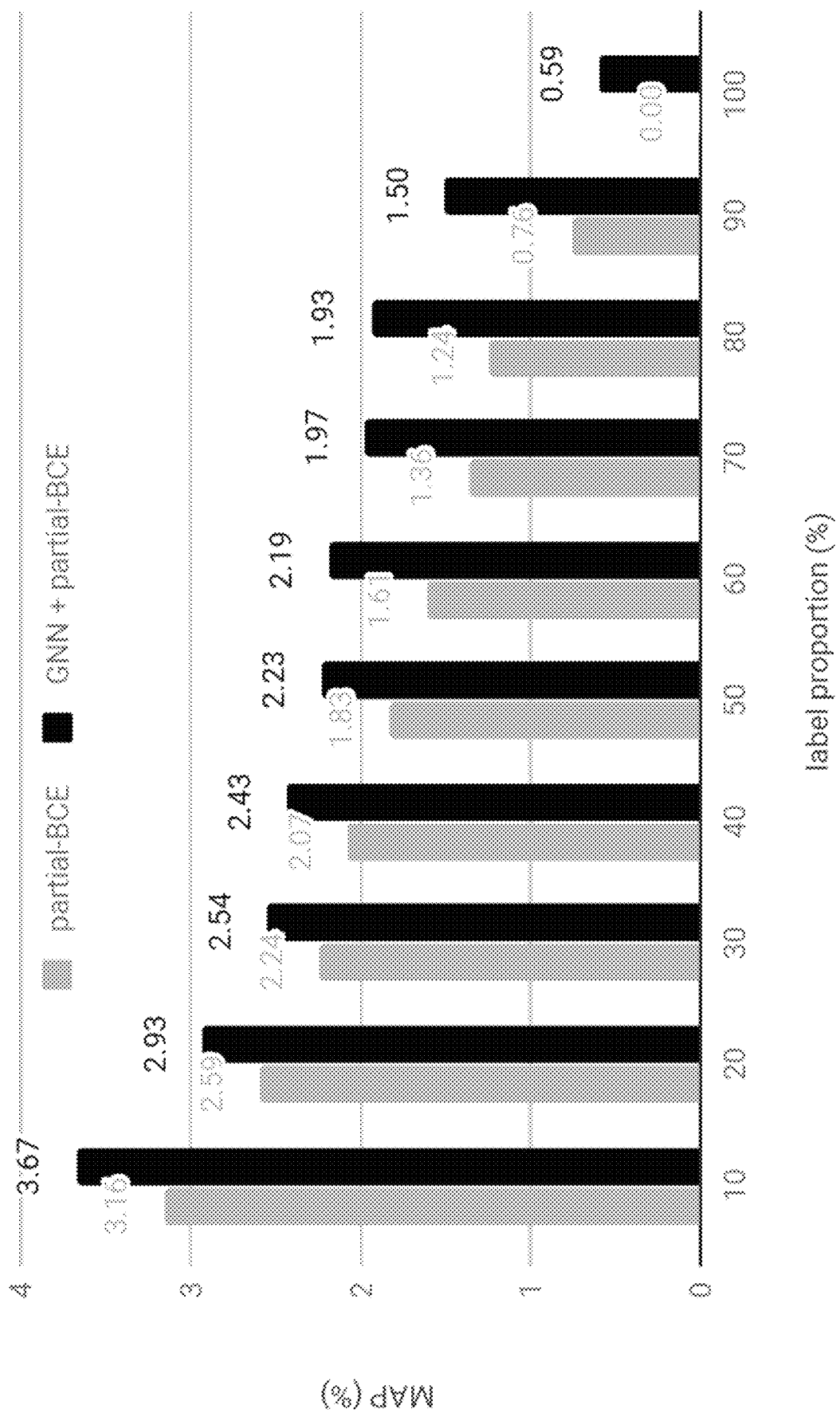
FIG. 5 is a bar chart showing MAP (%) improvement with respect to the proportion of known labels on MS COCO for the partial-BCE and the GNN+partial-BCE. 0 means the result for a model trained with the standard BCE, according to some embodiments.

GNN. Applicants now analysis the improvements of the GNN to learn relationships between the categories. Applicants show the results on MS COCO in FIG. 5. Applicants observe that for each label proportion, using the GNN improves the performances. This experiment shows that modeling the correlation between categories is important even in case there are a lot of labels missing. However, Applicants also note that a convolutional neural network implicitly learns some correlation between the categories because some learned representations are shared by all categories.

Ablation study. To analyze the importance of each contribution, Applicants perform an ablation study on MS COCO for a label proportion of 10%. The results are shown in Table 3 for different metrics. Applicants first observe that fine-tuning is important. It validates the interest to build end-to-end trainable models to learn with missing labels. Using the partial-BCE loss function increases the performances of each metric because it exploits the label proportion information during training. Applicants show that using GNN or relabeling improves the performances. In particular, the relabeling stage significantly increase the 0-1 exact match score (+5 pt) and the micro-F1 score (+2.5 pt). Finally, Applicants observe that both GNN and relabeling are complementary.

Figure 7:
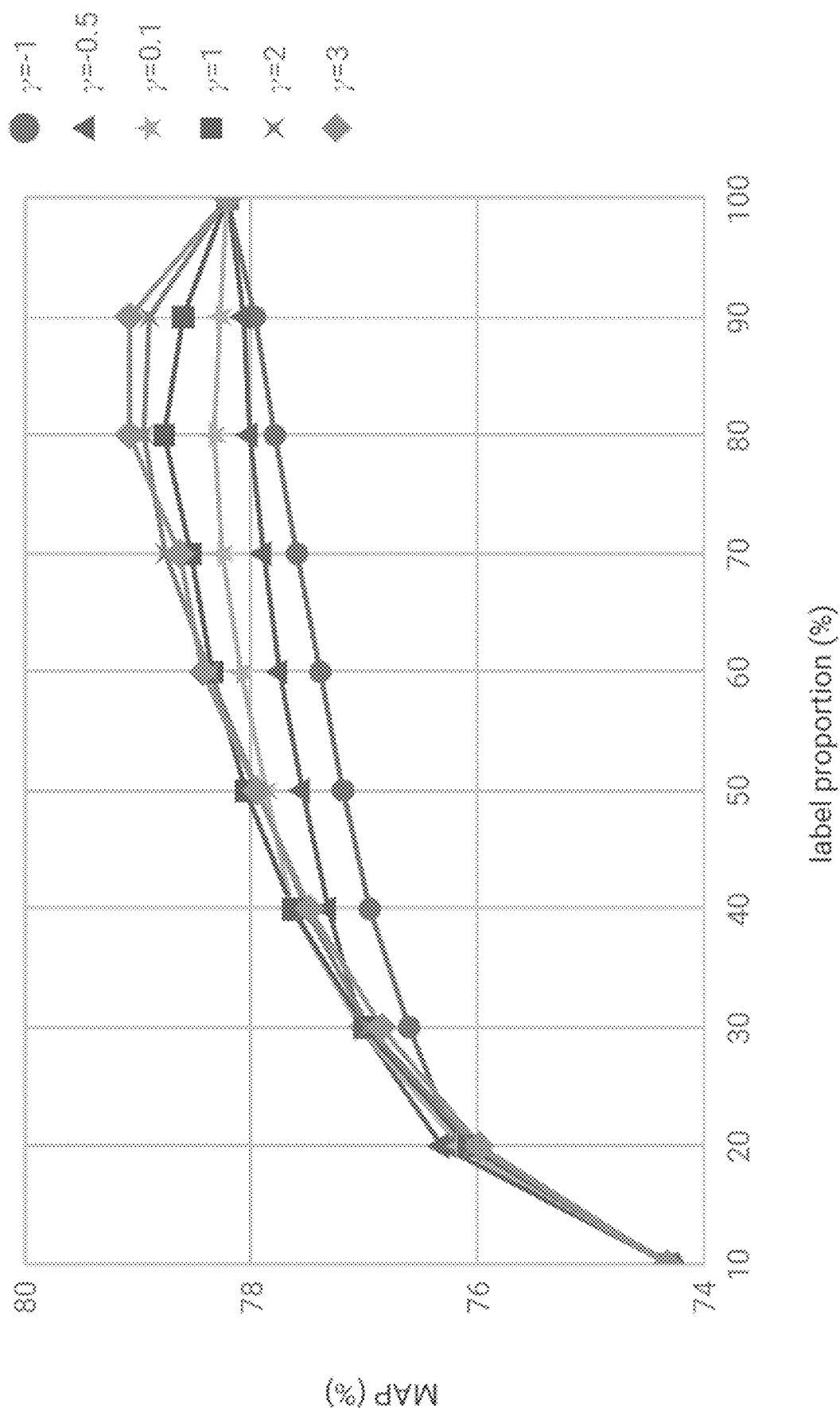
FIG. 7 is a plot showing an analysis of hyper-parameters on MS COCO val2014, according to some embodiments.
Figure 8A:
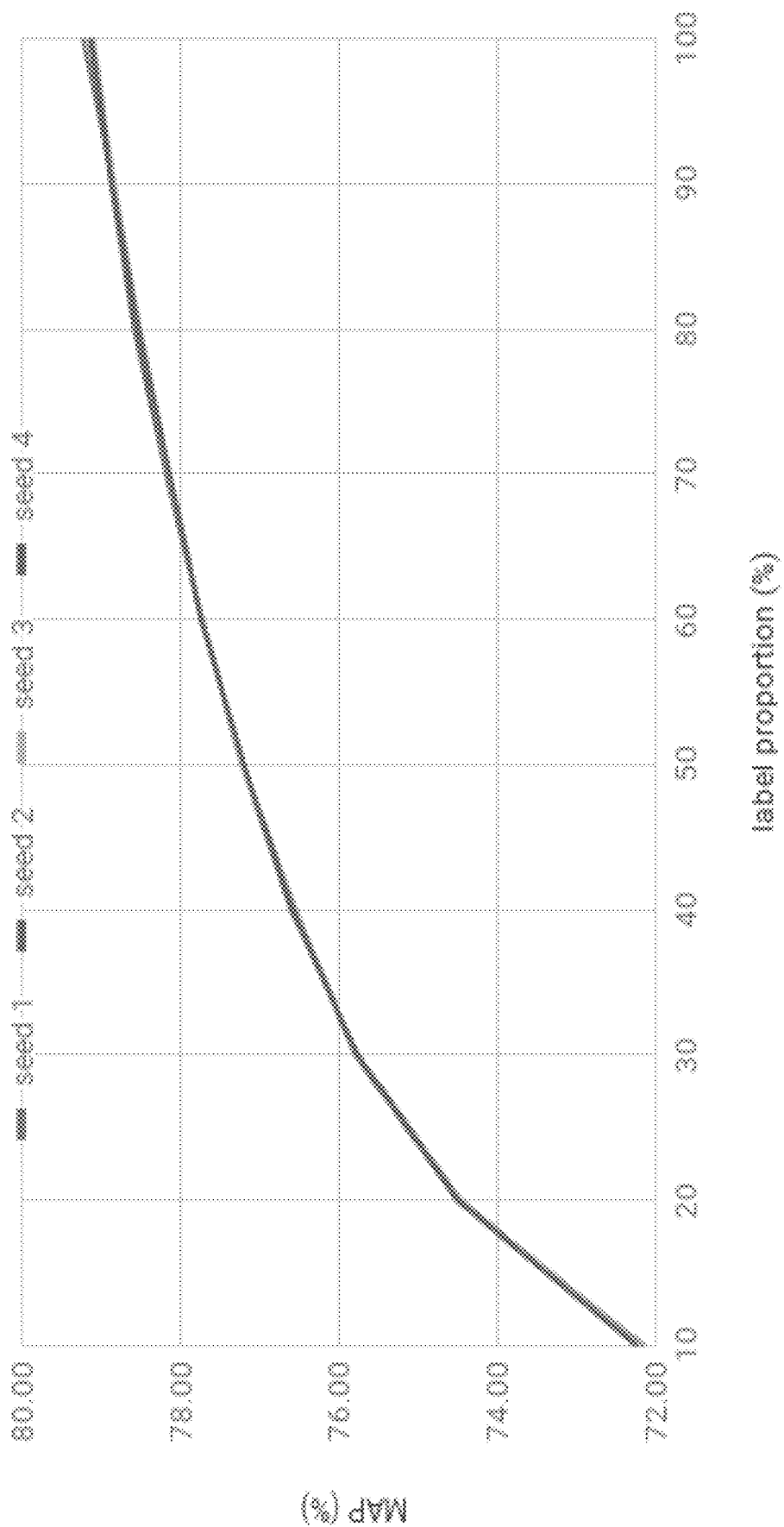
Figure 8B:
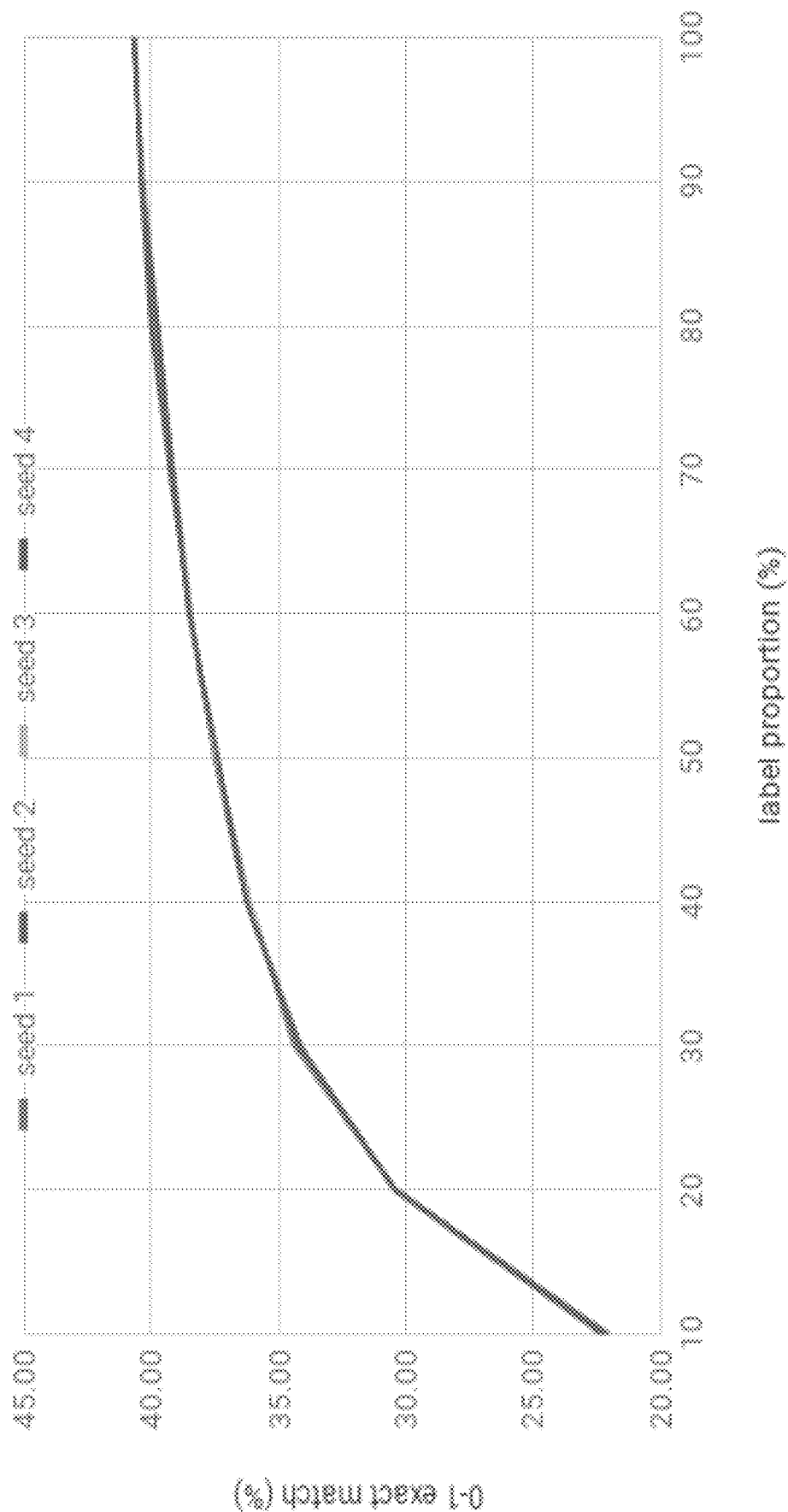
Figure 8C:
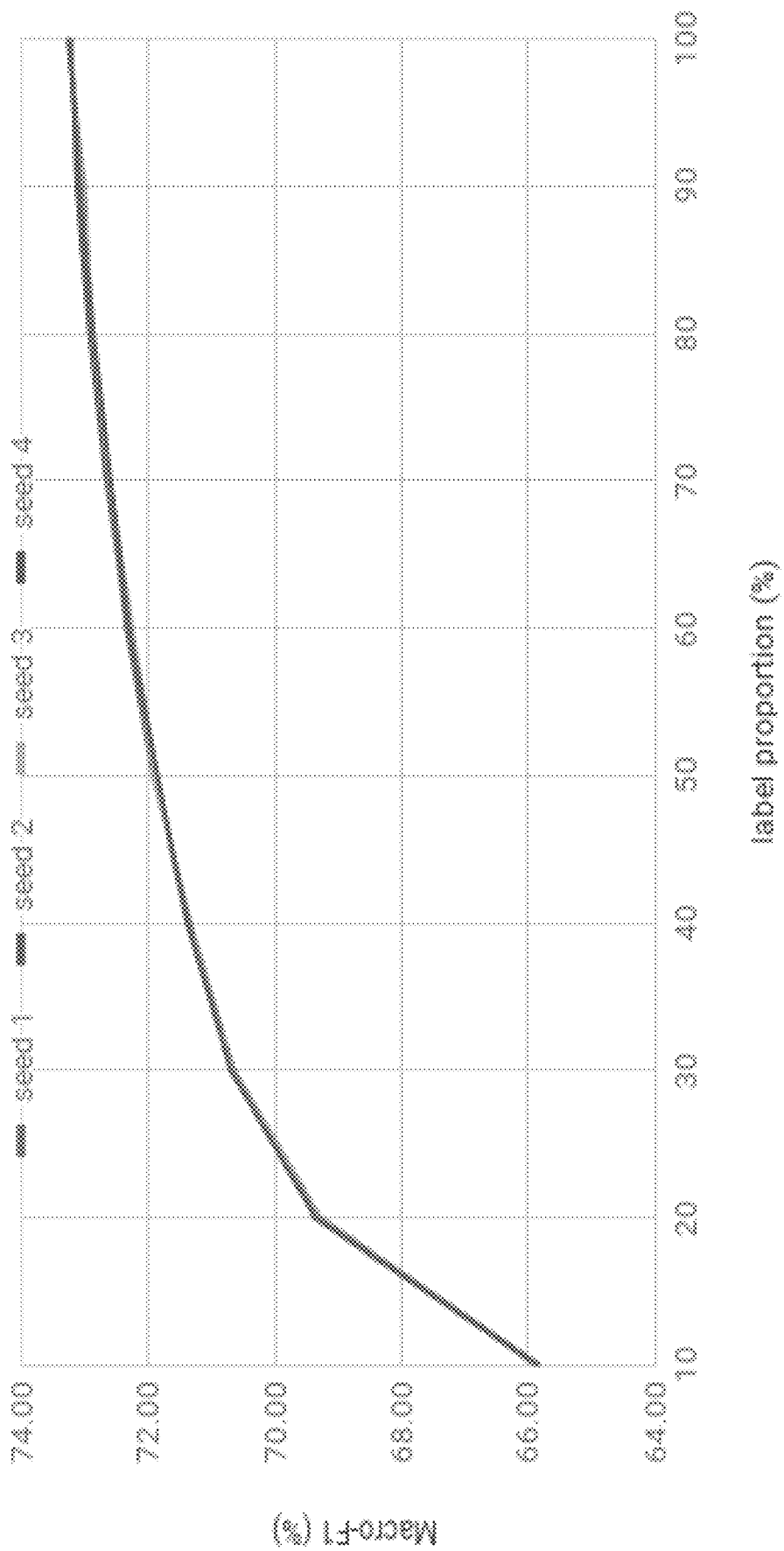
Figure 8D:
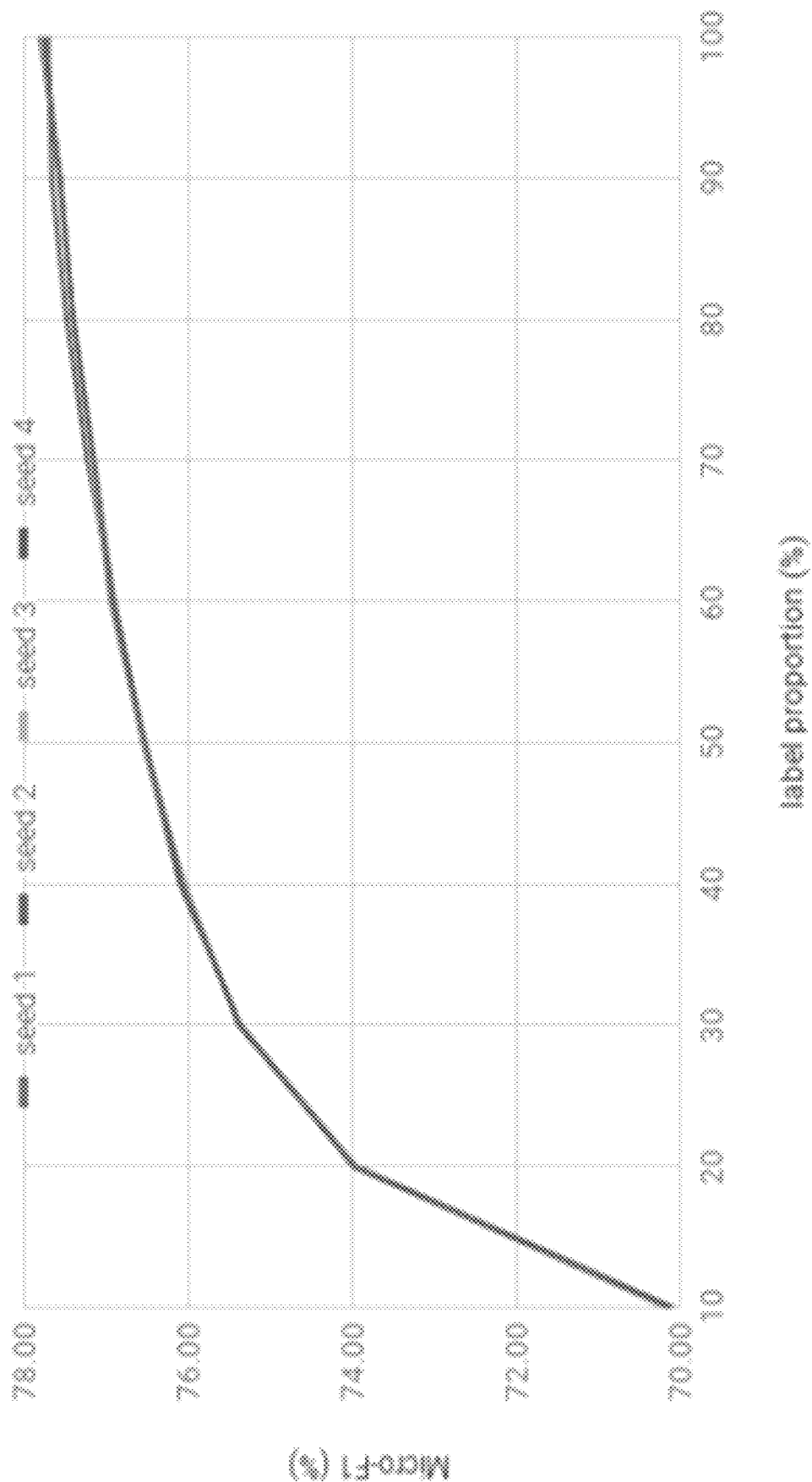
Figure 8E:
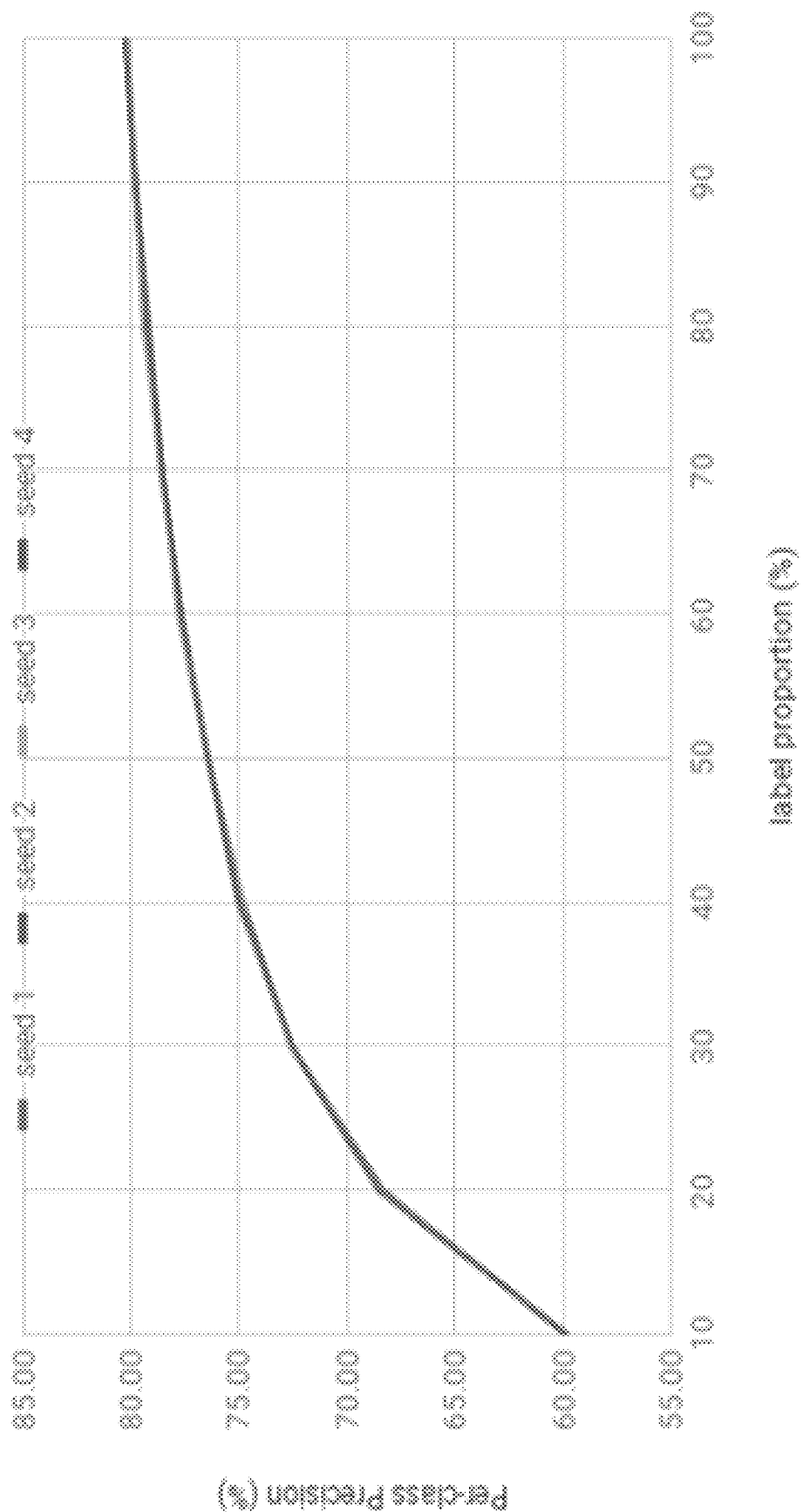
Figure 8F:
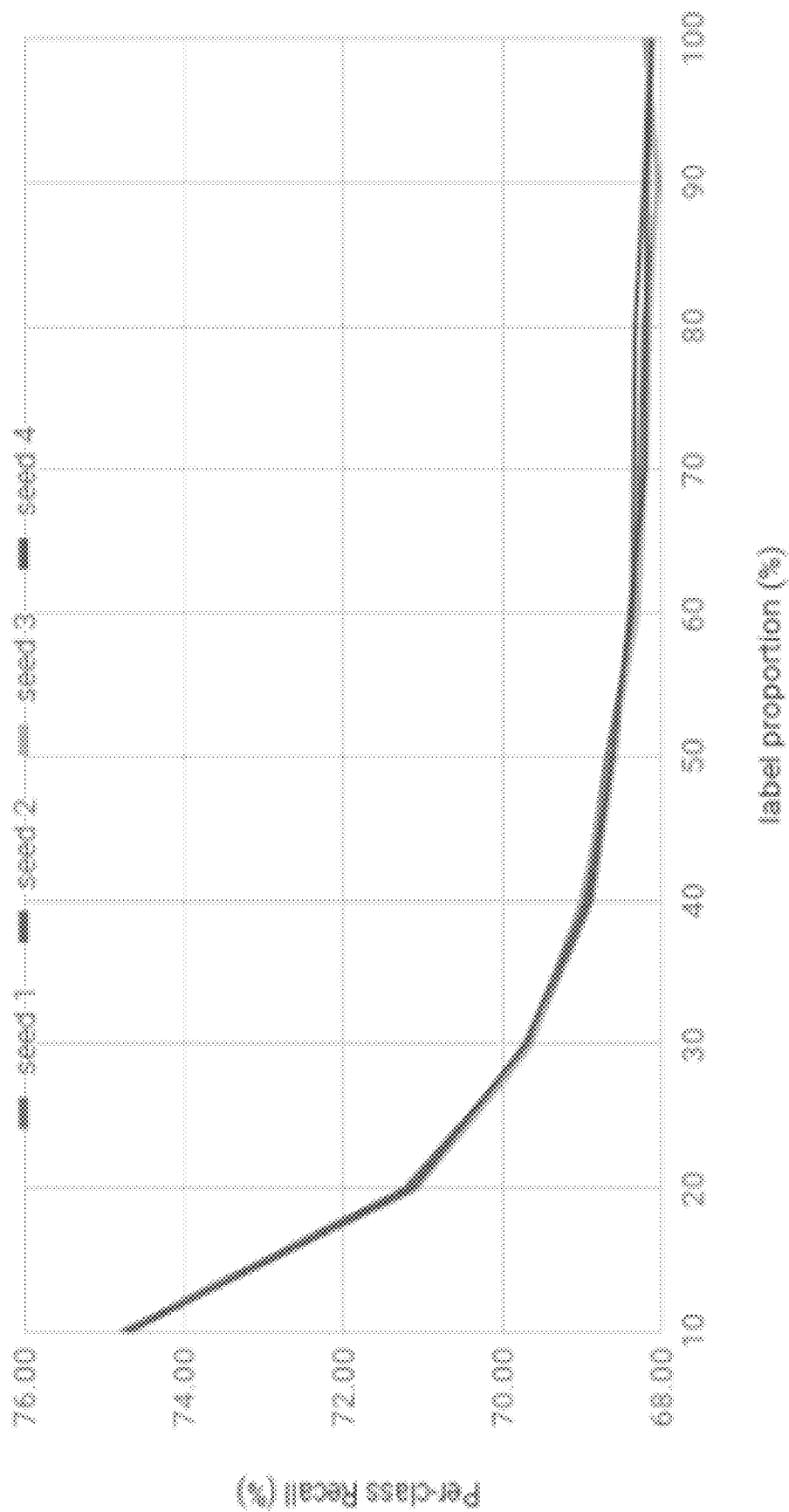
Figure 8H:
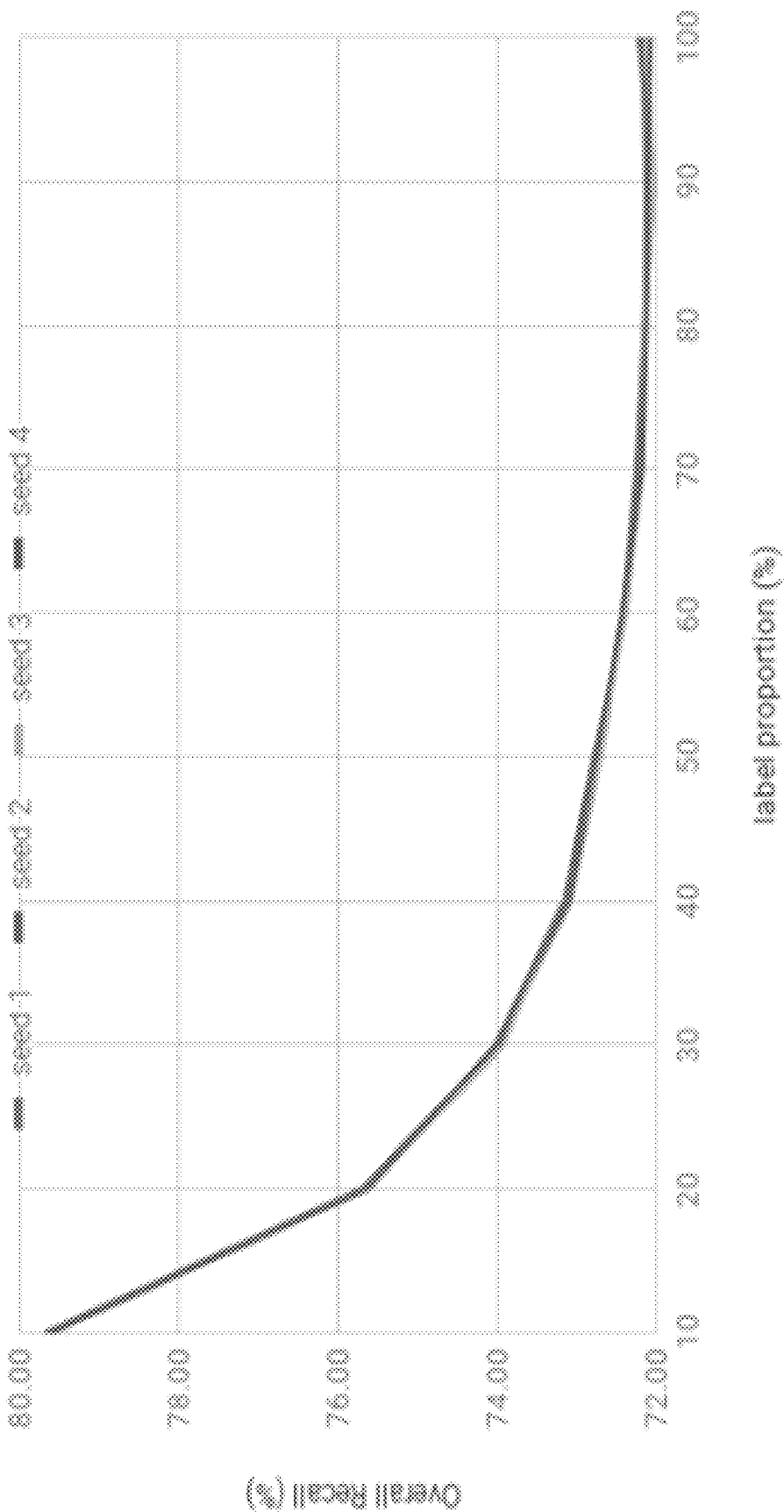

Loss analysis: Applicants analyze the hyper-parameters of the normalization function g (Equation 2) of the partial-BCE on MS COCO val2014. FIG. 7 is a plot showing an analysis of hyper-parameters on MS COCO val2014, according to some embodiments. Normalization value g(0.1).

Figure 6:
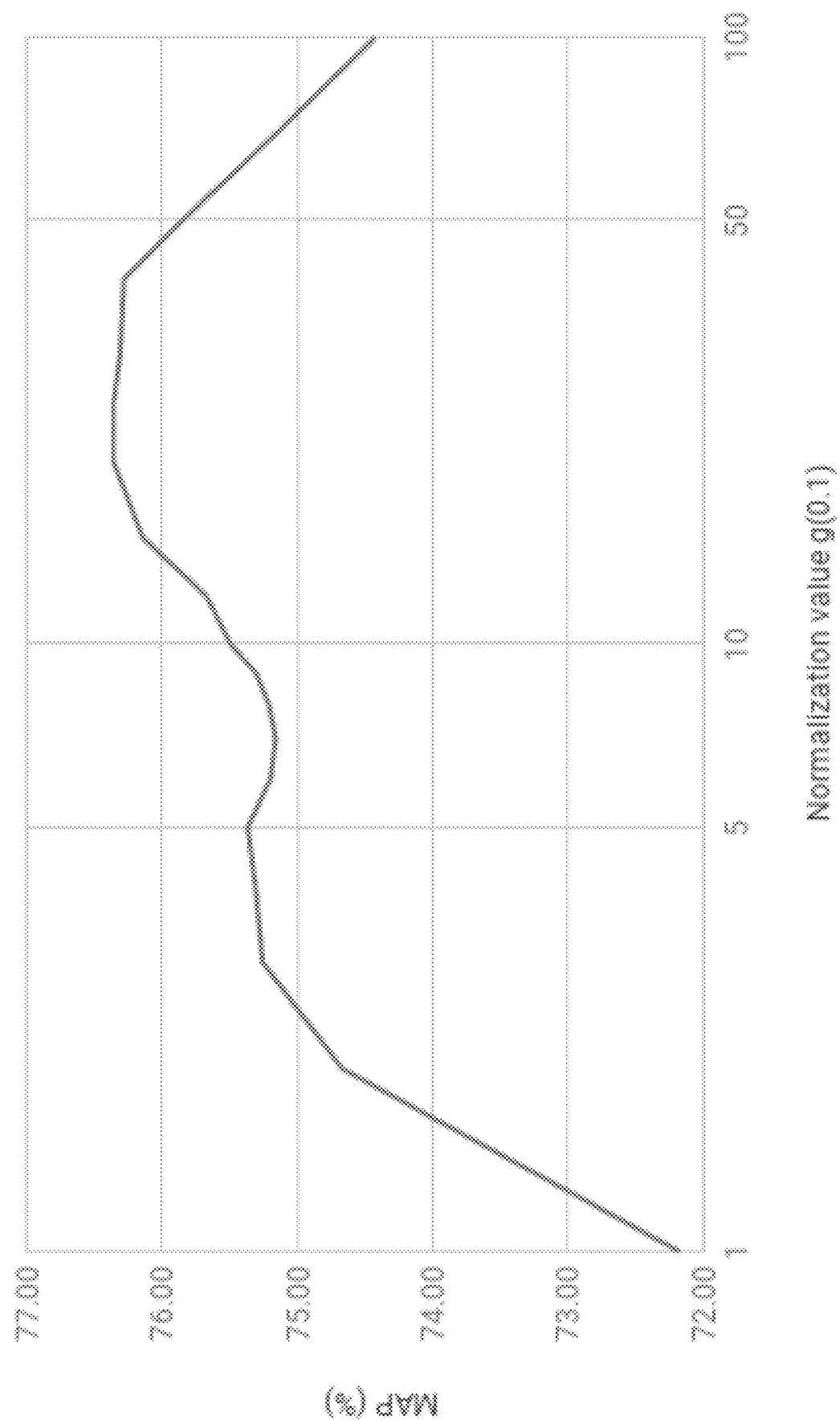
FIG. 6 is a plot showing an analysis of the normalization value for a label proportion of 10% (i.e., g(0.1)) on MS COCO val2014. (x-axis log-scale), according to some embodiments.

Applicants first analyse how to choose the value of the normalization function for a label proportion of 10% i.e., g(0.1) (it is possible to choose another label proportion). Note that for g(0.1)=1, the partial-BCE is equivalent to the BCE and the loss is normalized by the number of categories. This normalization gives the same importance to each category. For g(0.1)=1, the partial-BCE is normalized by the number of known categories for each image. The results are shown in FIG. 6.

Applicants observe that the normalization value g(0.1)=1 is worse than the other values. The best score is obtained for a normalization value around 20. Using a value higher than 50 drops the performances. This experiment validates that normalizes the loss function by the proportion of known labels is better than the standard normalization by the number of categories. Applicants observe similar behavior for other network architectures.

Hyper-parameter γ Given the constraints g(0.1)=5 and g(1)=1, Applicants analyse the impact of the hyper-parameter γ. This hyper-parameter controls the behavior of the normalization with respect to the label proportion. Using a high value (γ=3) is better than a low value (γ=−1) for large label proportion but is slightly worse for small label proportion. Applicants observe that using a normalization that is proportional to the number of known labels (γ=1) works better than using a normalization that is inversely proportional to the number of known labels (γ=−1).

Applicants analyze the labeling strategies introduced above to predict missing labels. Before training epochs 10 and 15, Applicants use the learned classifier to predict some missing labels. Applicants report the results for different metrics on Pascal VOC 2007 validation set with 10% of labels in Table 4. Applicants also report the final proportion of labels, the true positive (TP) and true negative (TN) rates for predicted labels. Additional results are in Table 9.

First, Applicants use a 2 step strategy as a baseline. A learned model on partial (clean) labels to predict all unknown labels. Then a classifier is trained with all the labels. Applicants observe that this strategy decreases the MAP score but increases the score of the other metrics. However the improvement is less important that the curriculum-based strategies. This experiment shows that using all the predicted labels introduced too much label noise which decreases the generalization performance.

For the curriculum-based strategy, Applicants observe that the threshold strategy [a] is better than the proportion strategy [b]. Applicants also note that using a model ensemble [d] does not significantly improve the performances with respect to a single model [a]. Predicting only positive labels [c] is a bad strategy. The Bayesian uncertainty strategy [e] is the best strategy. In particular, Applicants observe that the GNN is important for this strategy because it decreases the label uncertainty. Applicants also observe that the model is robust to the hyper-parameter θ.

Applicants explore a new strategy to learn a multi-label classifier without an exhaustive list of labels per image. The results suggest that using a small subset of clean labels per image is better than existing approaches.

Embodiments of methods, systems, and apparatus are described through reference to the drawings. The following discussion provides many example embodiments of the inventive subject matter.

Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As can be understood, the examples described above and illustrated are intended to be exemplary only.

APPENDIX A.1

Multi-Label Classification with Graph Neural Networks

In this section, Applicants give additional information about the GNN used in some embodiments.

Approach 2 GNN

Input: Convolutional Neural Network Output x

1: Initialize the hidden state of each node V with the output of the convolutional neural network.

$$h_v^0 = [0, \ldots, 0, x_v, 0, \ldots, 0] \forall v \in V \quad (12)$$

2: for t=0 to T−1 do

Update message of each node v∈V based on the hidden states $$m_v^t = \mathcal{M}(\{h_u^t | u \in \Omega_v\}) \quad (13)$$

Update hidden state of each node v 2 V based on the messages $$h_v^{t+1} = \mathcal{F}(h_v^t, m_v^t) \quad (14)$$

end for
Compute the output based on the first and last hidden states $$\bar{y}=s(h_v^0,h_v^T)=h_v^0+h_v^T \quad (15)$$

Output: $\bar{y}$

A.2. Datasets

Applicants performed experiments on large publicly available multilabel datasets: Pascal VOC 2007 [16], MS COCO [35] and NUS-WIDE [11].

Pascal VOC 2007 dataset contains 5k/5k trainval/test images of 20 objects categories.

MS COCO dataset contains 123k images of 80 objects categories. Applicants use the 2014 data split with 83k train images and 41k val images.

NUS-WIDE dataset contains 269,648 images downloaded from Flickr that have been manually annotated with 81 visual concepts.

Applicants follow the experimental protocol in [17] and use 150k randomly sampled images for training and the rest for testing. The results on NUS-WIDE cannot be directly comparable with the other works because the number of total images is different (209,347 in [17], 200, 261 in [34]). The main reason is that some provided URLs are invalid or some images have been deleted from Flickr.

A.3 Multi-Label Metrics

In this section, Applicants introduce the metrics used to evaluate the performances on multi-label datasets.

Zero-one exact match accuracy. This metric considers a prediction correct only if all the labels are correctly predicted:

$$m_{0/1}(\mathcal{D}) = \frac{1}{N}\sum_{i=1}^{N} 1[y^{(i)} = \hat{y}^{(i)}] \quad (16)$$

Where 1[.] is an indicator function.
Per-class precision/recall (PC-P/R).

$$m_{PC-P}(\mathcal{D}) = \frac{1}{C}\sum_{c=1}^{C} \frac{N_c^{correct}}{N_c^{predict}} \quad (17)$$

$$m_{PC-R}(\mathcal{D}) = \frac{1}{C}\sum_{c=1}^{C} \frac{N_c^{correct}}{N_c^{gt}} \quad (18)$$

where $N_c^{correct}$ is the number of correctly predicted images for the c-th label, $N_c^{predict}$ is the number of predicted images, $N_c^{gt}$ is the number of ground-truth images. Note that the per-class measures treat all classes equal regardless of their sample size, so one can obtain a high performance by focusing on getting rare classes right.

Overall precision/recall (OV-P/R). Unlike per-class metrics, the overall metrics treat all samples equal regardless of their classes.

$$m_{OV-P}(\mathcal{D}) = \frac{\sum_{c=1}^{C} N_c^{correct}}{\sum_{c=1}^{C} N_c^{predict}} \quad (19)$$

$$m_{OV-R}(\mathcal{D}) = \frac{\sum_{c=1}^{C} N_c^{correct}}{\sum_{c=1}^{C} N_c^{gt}} \quad (20)$$

Macro-F1 score. The macro-F1 score [61] is the F1 score [44] averaged across all categories.

$$m_{MF1}(\mathcal{D}) = \frac{1}{C}\sum_{c=1}^{C} F_1^c \quad (21)$$

The F1 measure, defined as the harmonic mean of precision and recall, is computed as follows:

$$F_1^c = \frac{2P^c R^c}{P^c + R^c} \quad (22)$$

where the precision (Pc) and the recall (Rc) are calculated as $$P^c = \frac{\sum_{i=1}^{N} 1[y_c^{(i)} = \hat{y}_c^{(i)}]}{\sum_{i=1}^{N} \hat{y}_c^{(i)}} \quad (23)$$

$$R^c = \frac{\sum_{i=1}^{N} 1[y_c^{(i)} = \hat{y}_c^{(i)}]}{\sum_{i=1}^{N} y_c^{(i)}} \quad (24)$$

$y_c^{(i)} \in \{0, 1\}$

Micro-F1. The micro-F1 score [52] is computed using the equation of $F_1^c$ and considering the predictions as a whole $$m_{mF1}(\mathcal{D}) = \frac{2\sum_{c=1}^{C}\sum_{i=1}^{N} 1[y_c^{(i)} = \hat{y}_c^{(i)}]}{\sum_{c=1}^{C}\sum_{i=1}^{N} y_c^{(i)} + \sum_{c=1}^{C}\sum_{i=1}^{N} \hat{y}_c^{(i)}} \quad (25)$$

According to the definition, macro-F1 is more sensitive to the performance of rare categories while micro-F1 is affected more by the major categories.

A.4. Analysis of the Initial Set of Labels

In this section, Applicants analyze the initial set of labels for the partial label scenario. Applicants report the results for 4 random seeds to generate the initial set of label. The experiments are performed on MS COCO val2014 with a ResNet-101 WELDON.

The results are shown in Table 5 and FIGS. 8A-8H for different label proportions. Applicants observe that the model is robust to the initial set of labels for every label proportion and every metric.

FIG. 8A-8H indicate that the results are not sensitive to initial randomization through the noted overlap.

A.5. Analysis of the Labeling Strategies

In this section Applicants analyze the labeling strategies for different network architectures. The results are shown in Table 6.

Figure 9A:
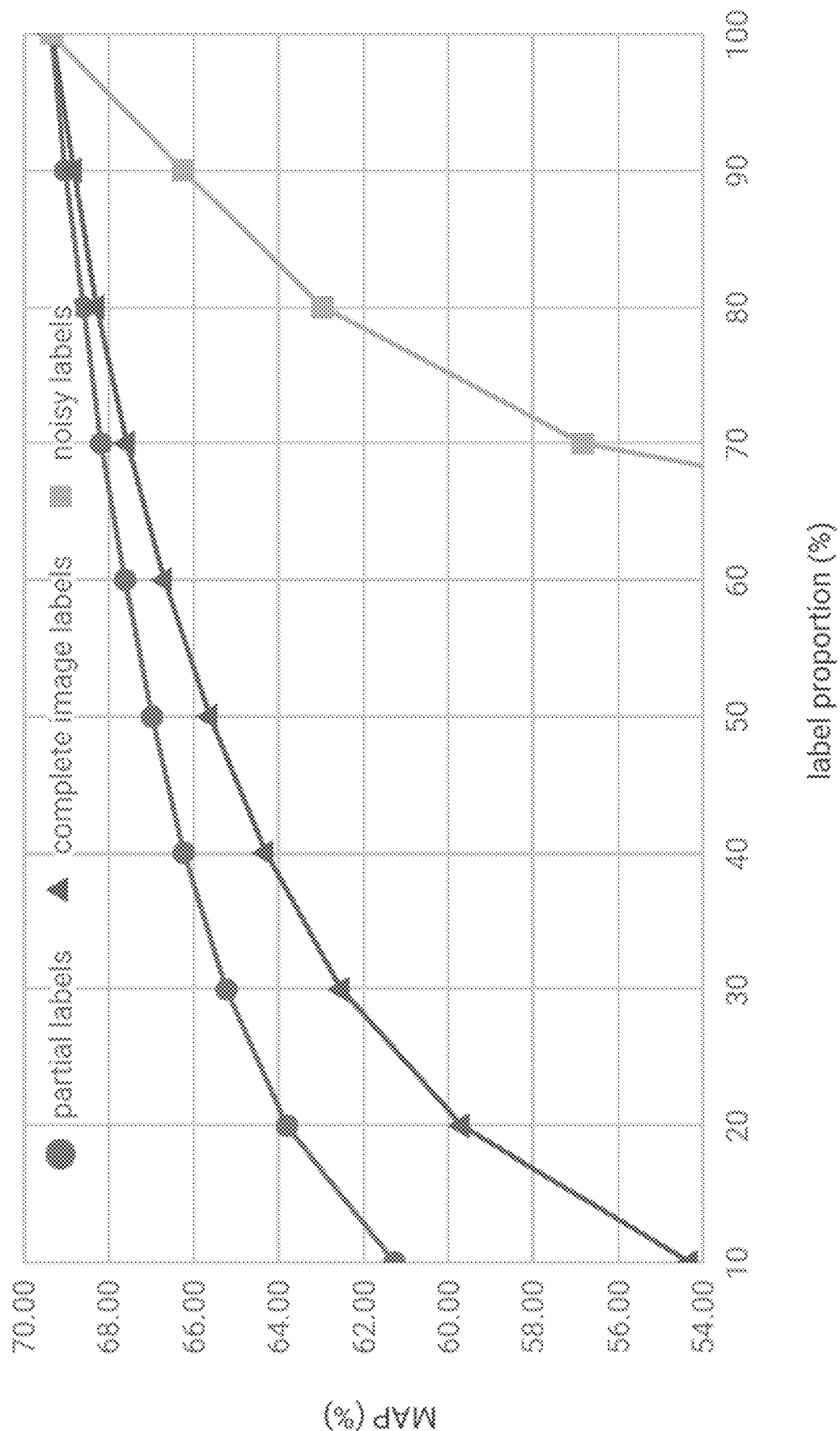
FIGS. 9A-9C are plots showing comparison of the labeling strategies for different label proportions and different architectures on MS COCO val2014, according to some embodiments.
Figure 9B:
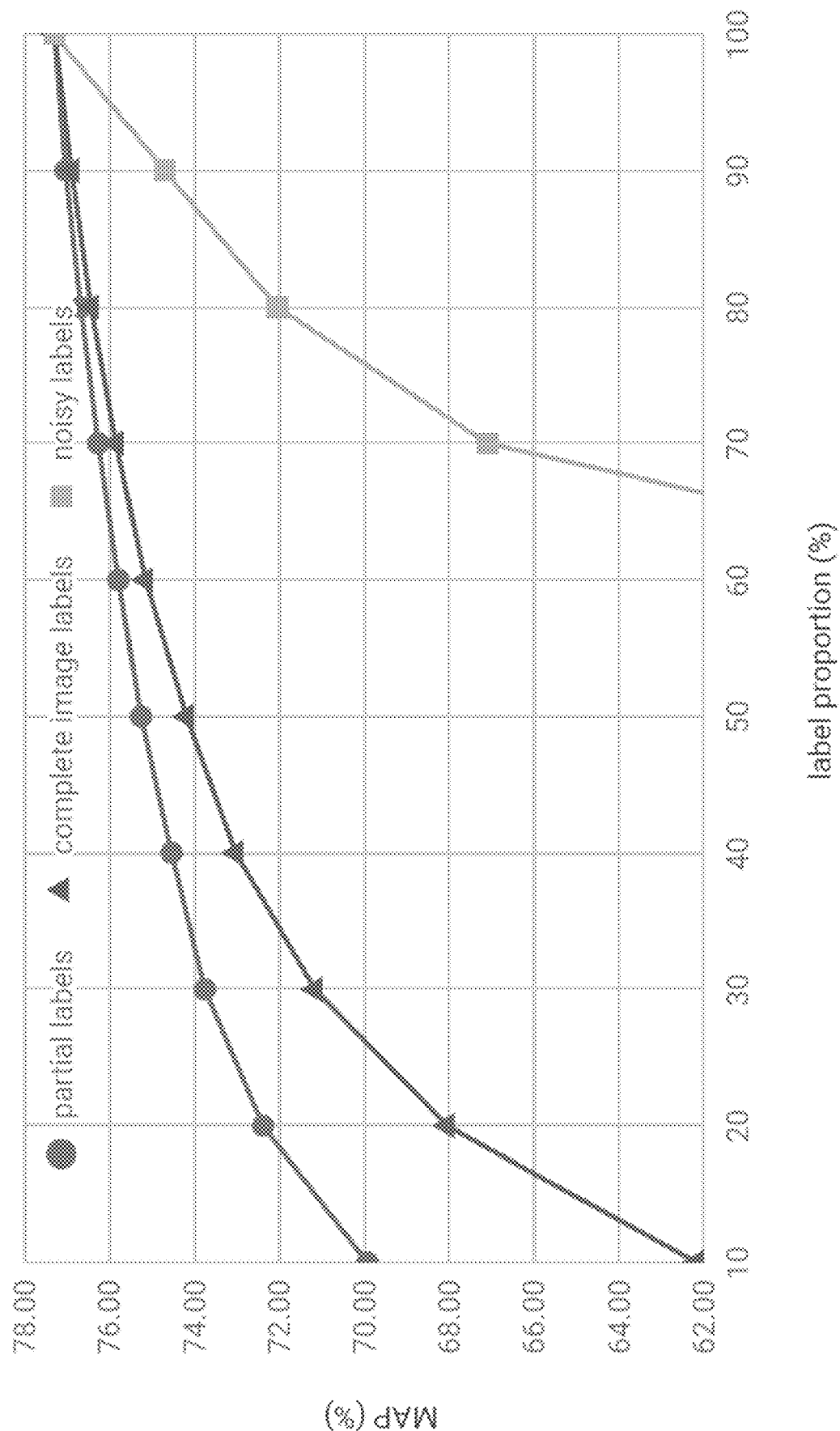
Figure 9C:
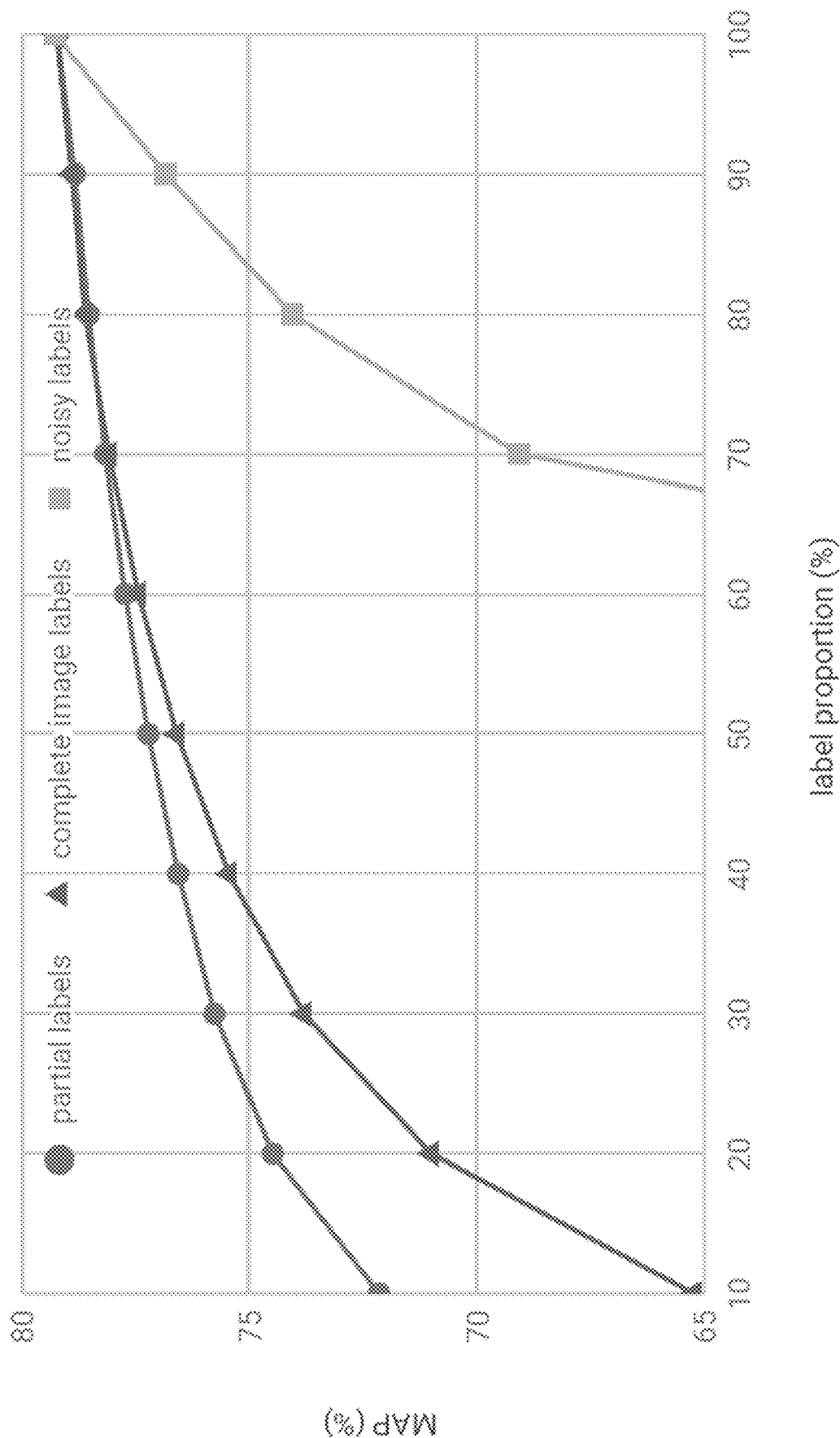
Figure 10A:
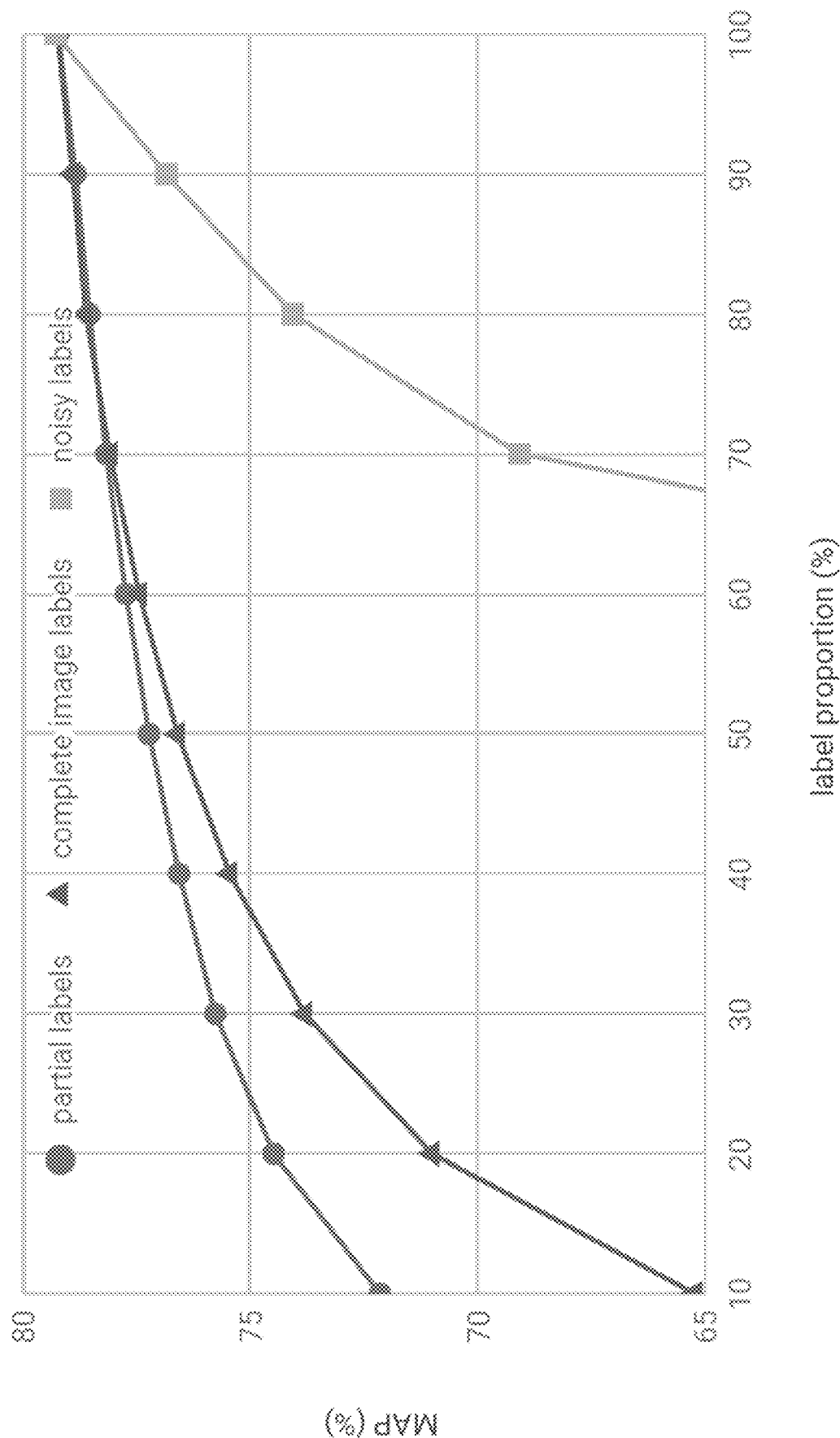
FIGS. 10A-10H are plots showing a comparison of the labeling strategies for different metrics on MS COCO val2014, according to some embodiments.
Figure 10B:
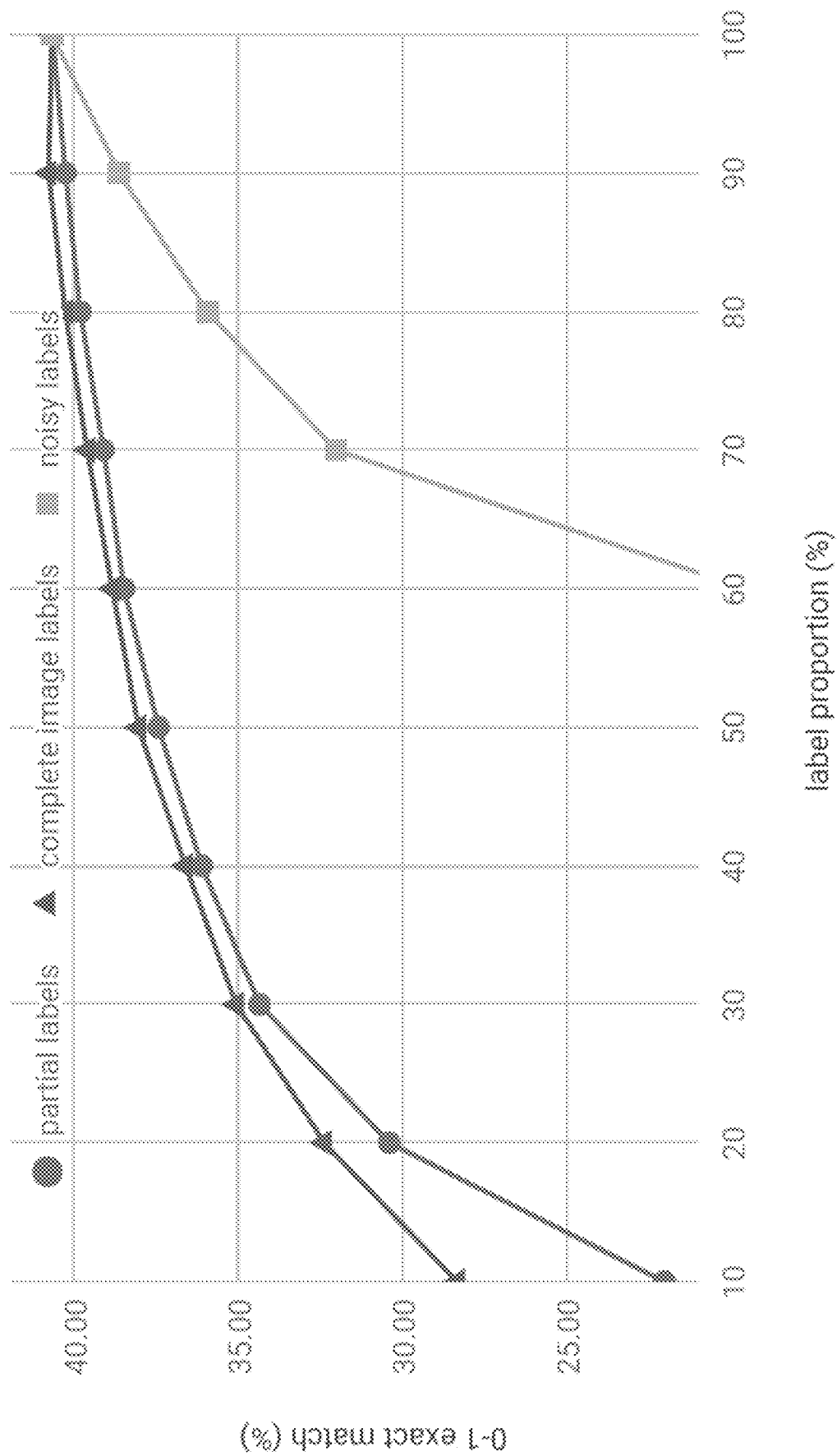
Figure 10C:
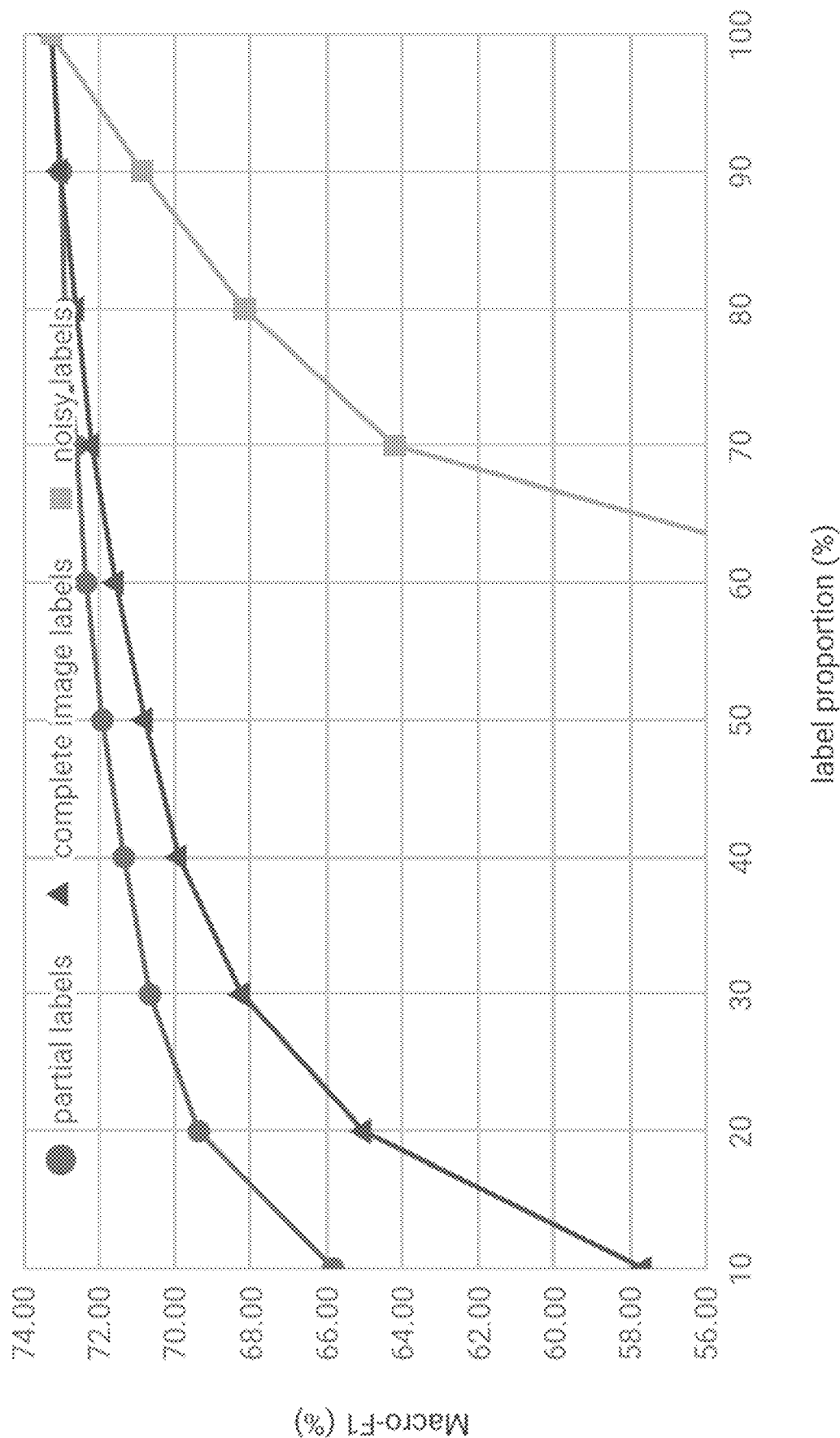
Figure 10D:
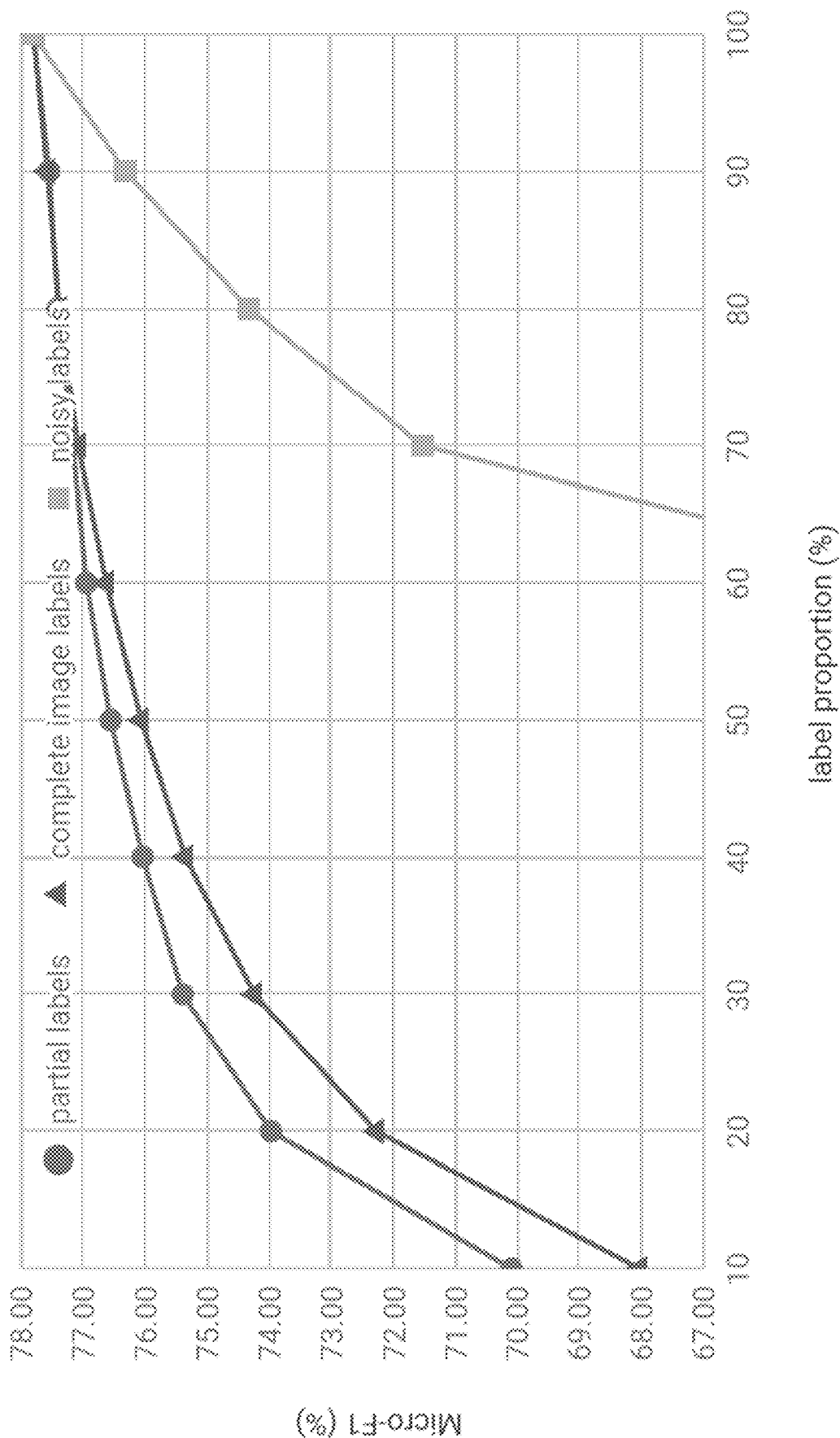
Figure 10E:
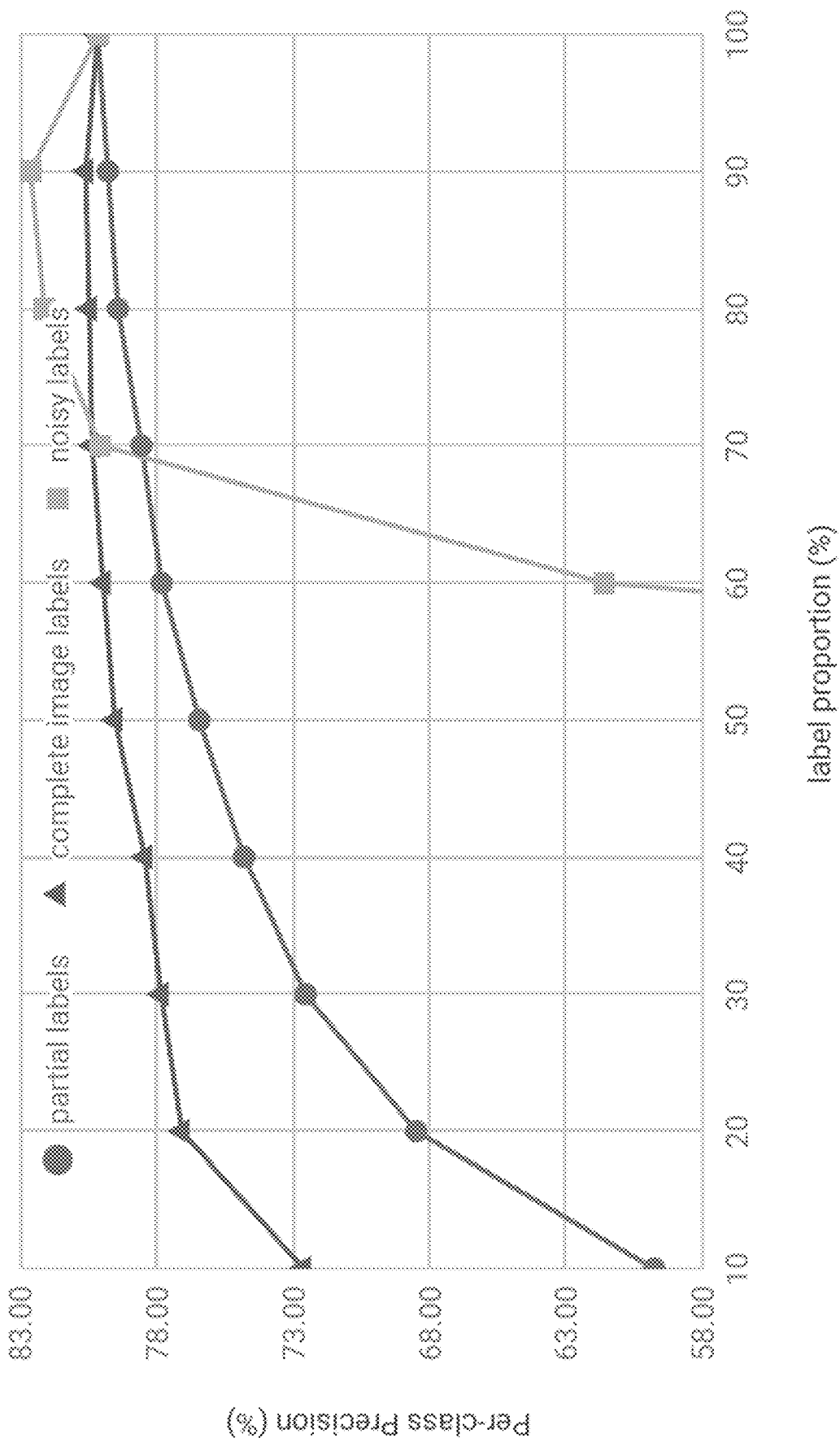
Figure 10F:
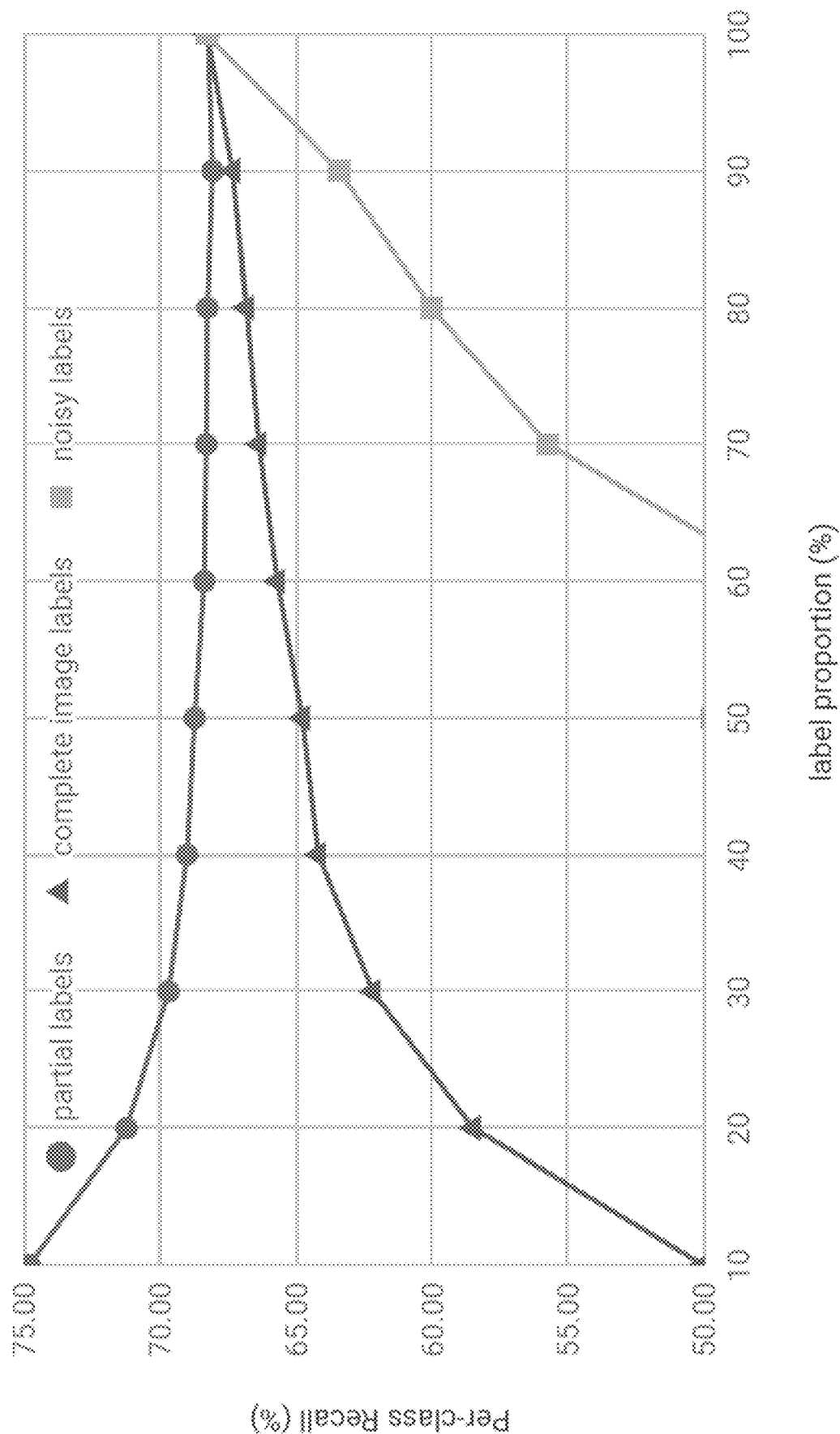
Figure 10G:
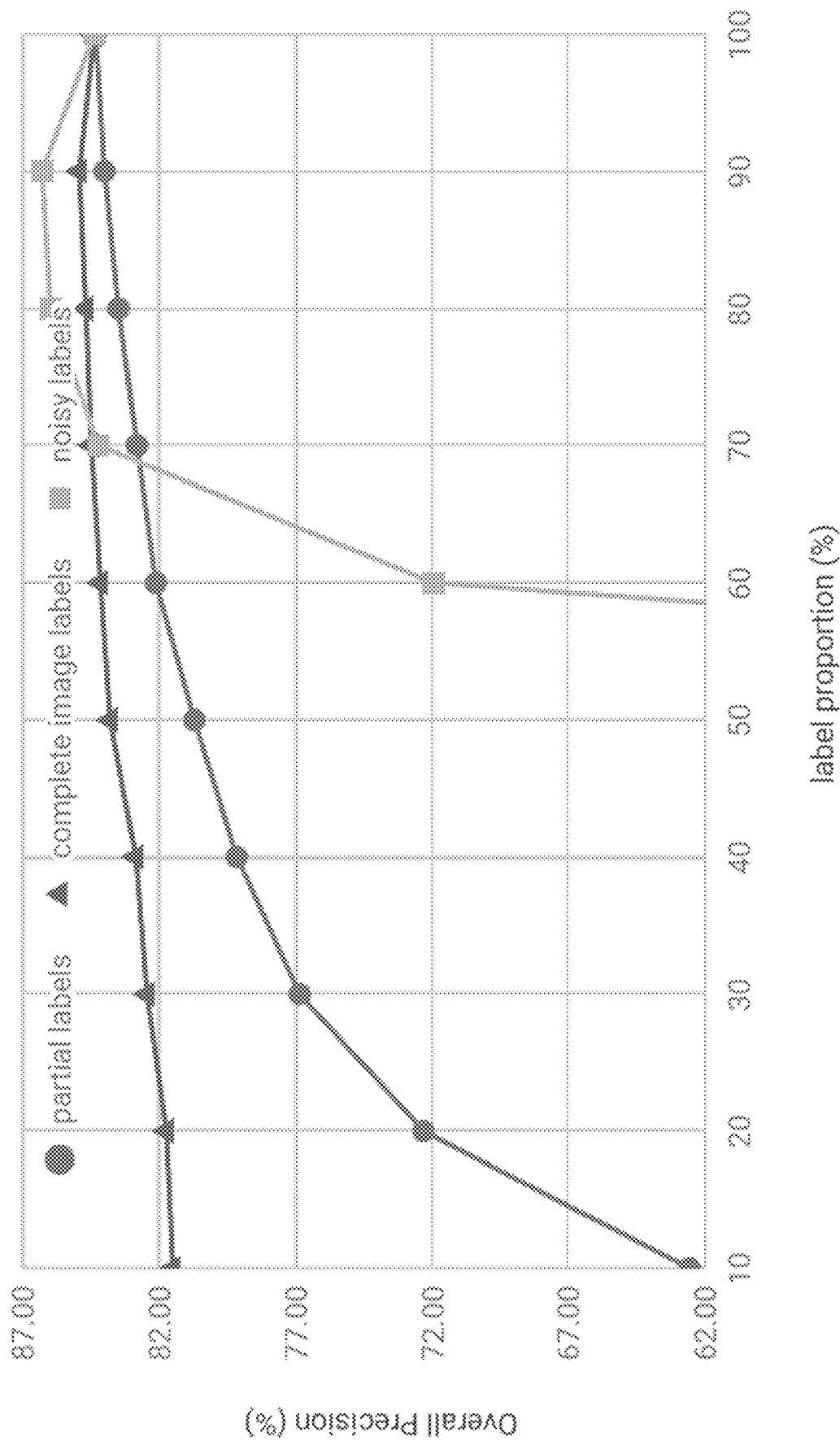
Figure 10H:
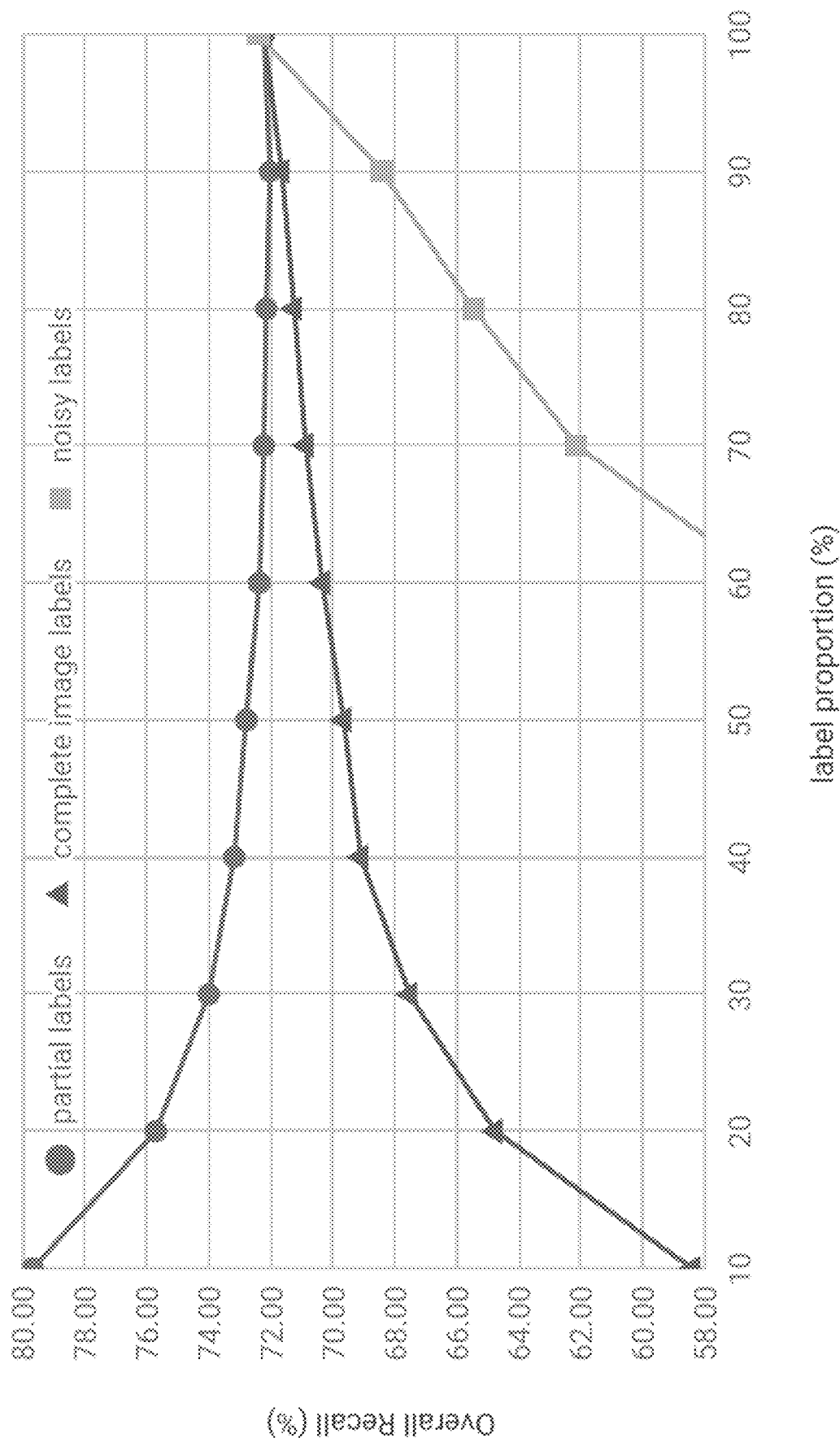
Figure 11A:
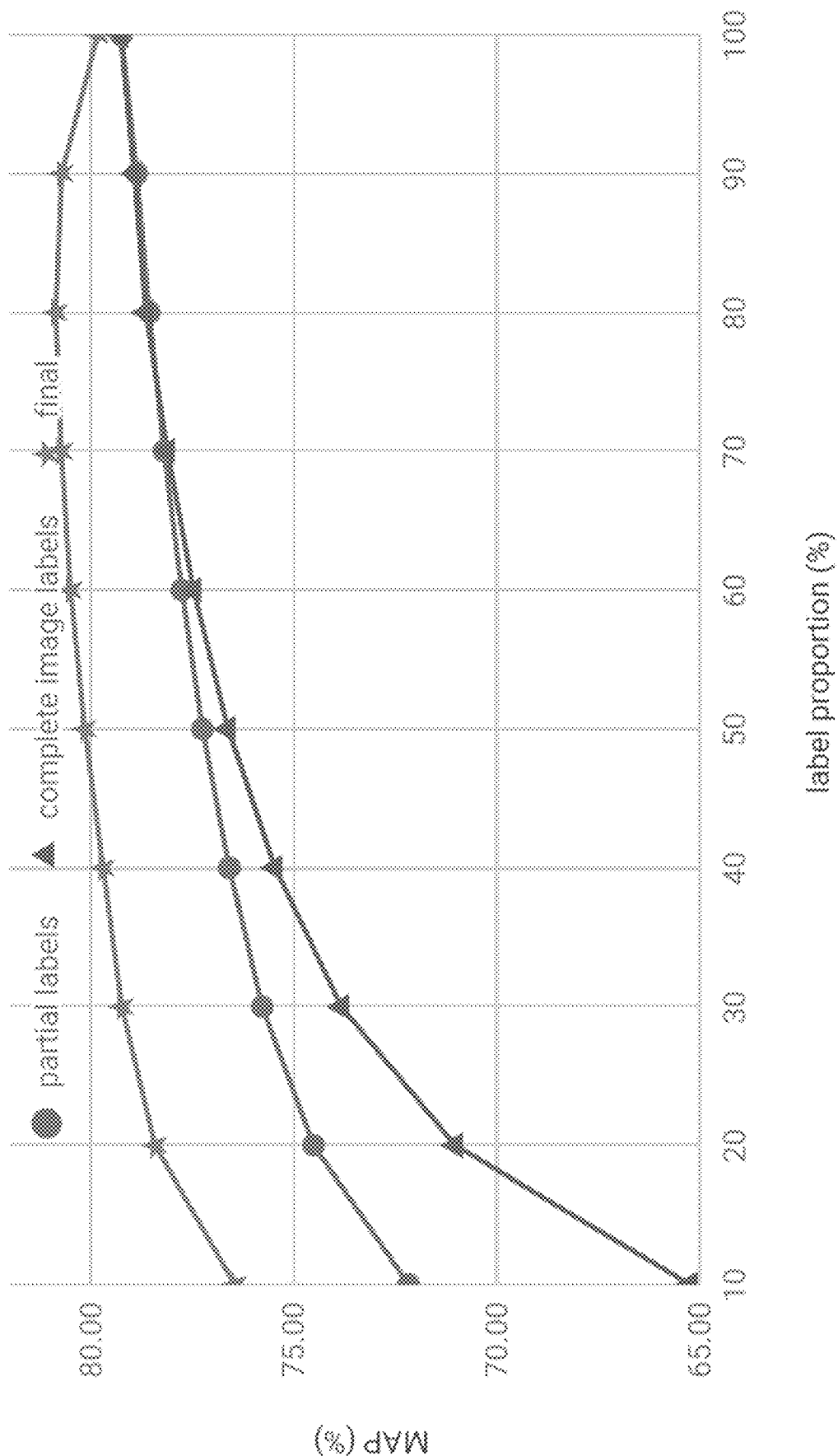
FIGS. 11A-11H are plots showing a comparison of the labeling strategies for different metrics on MS COCO val2014, according to some embodiments.
Figure 11B:
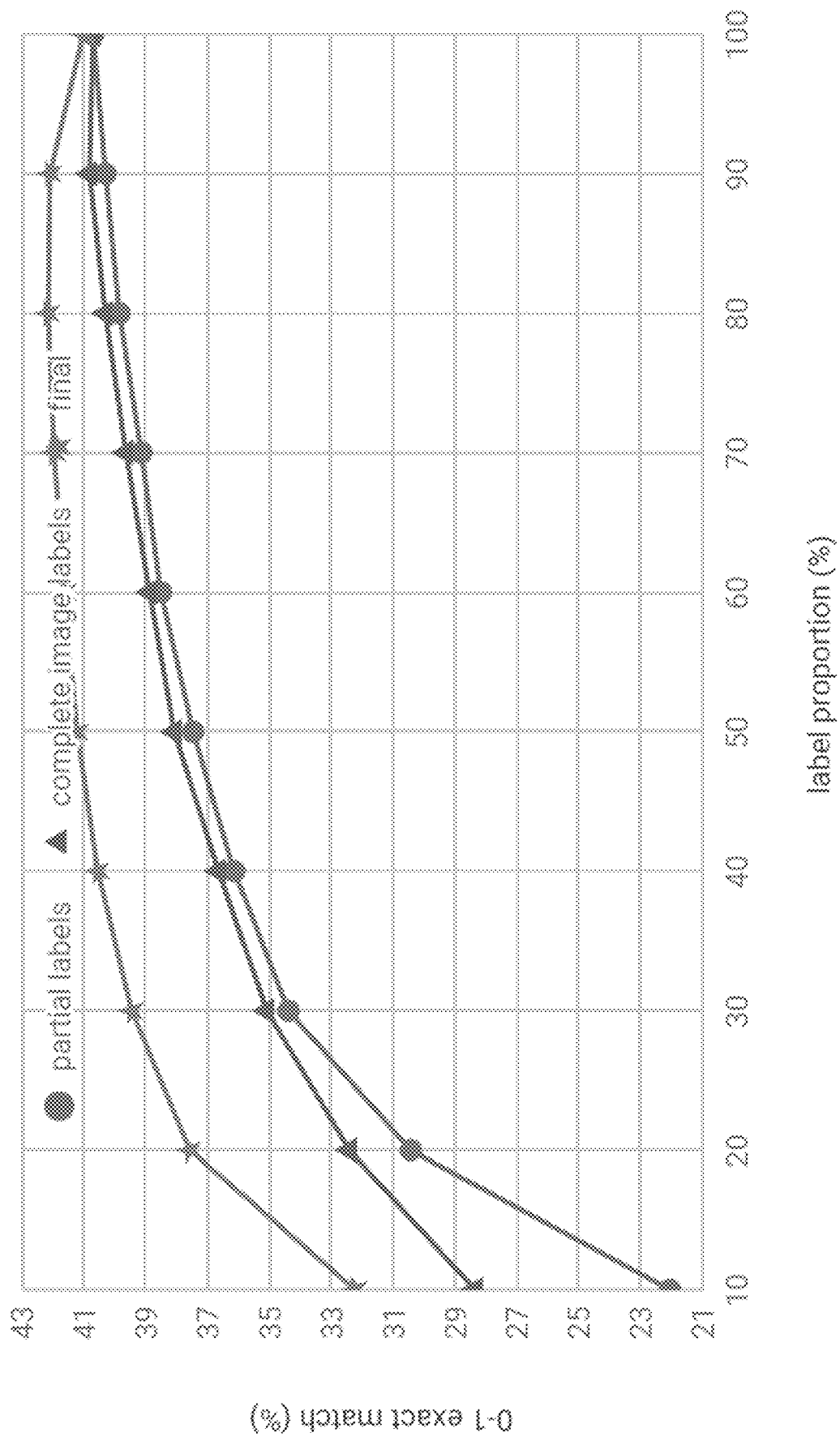
Figure 11C:
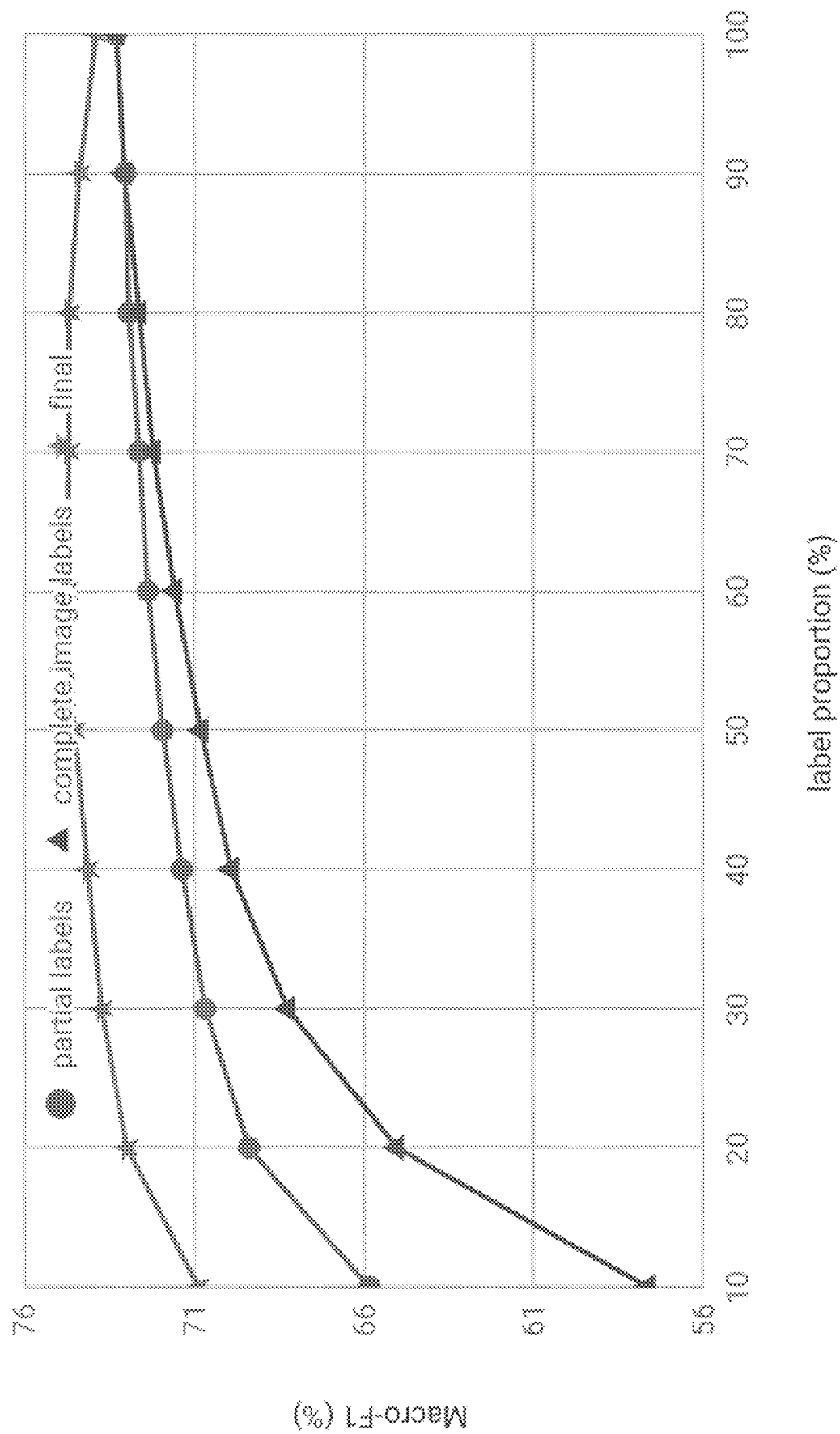
Figure 11D:
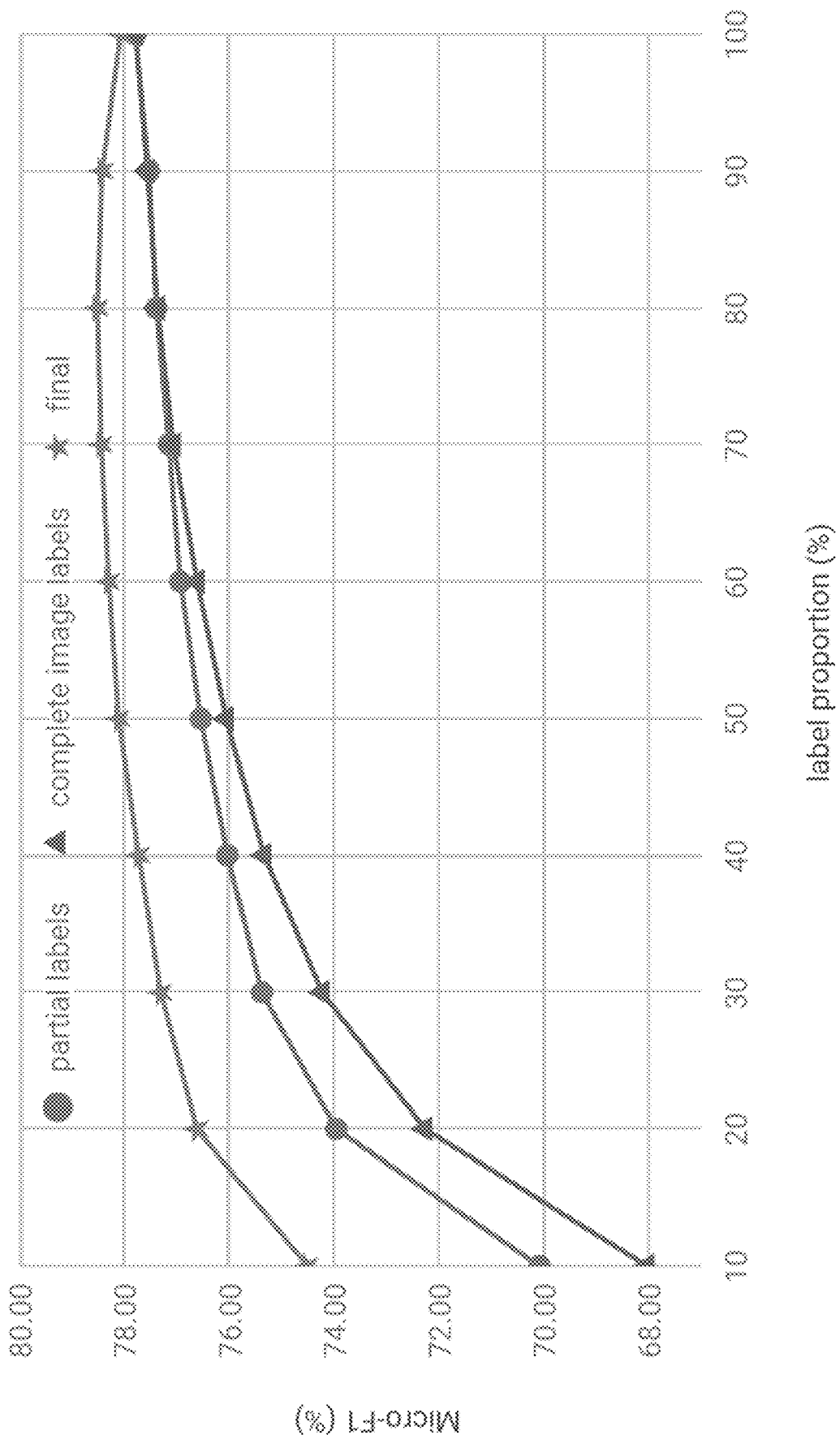
Figure 11E:
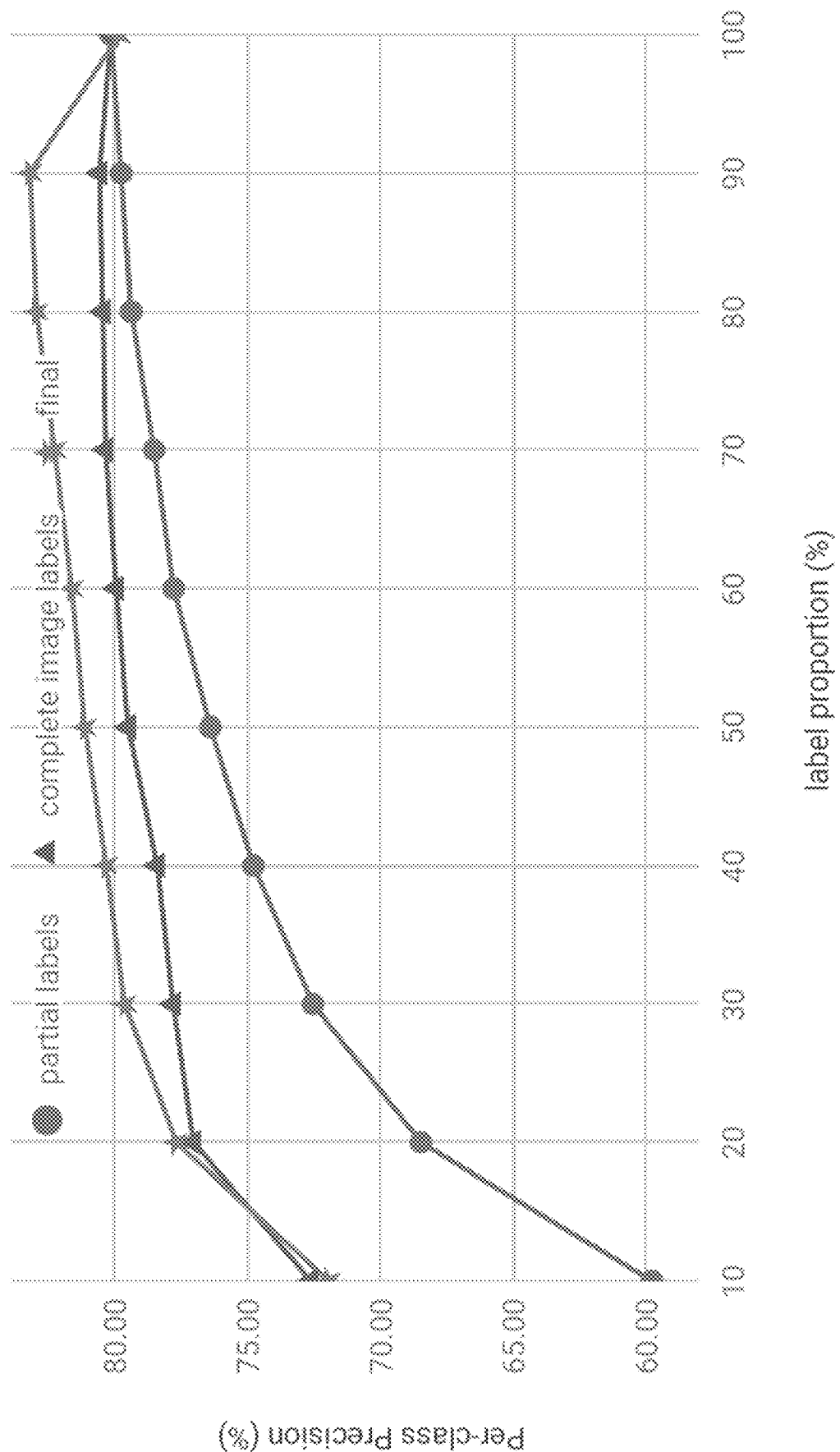
Figure 11F:
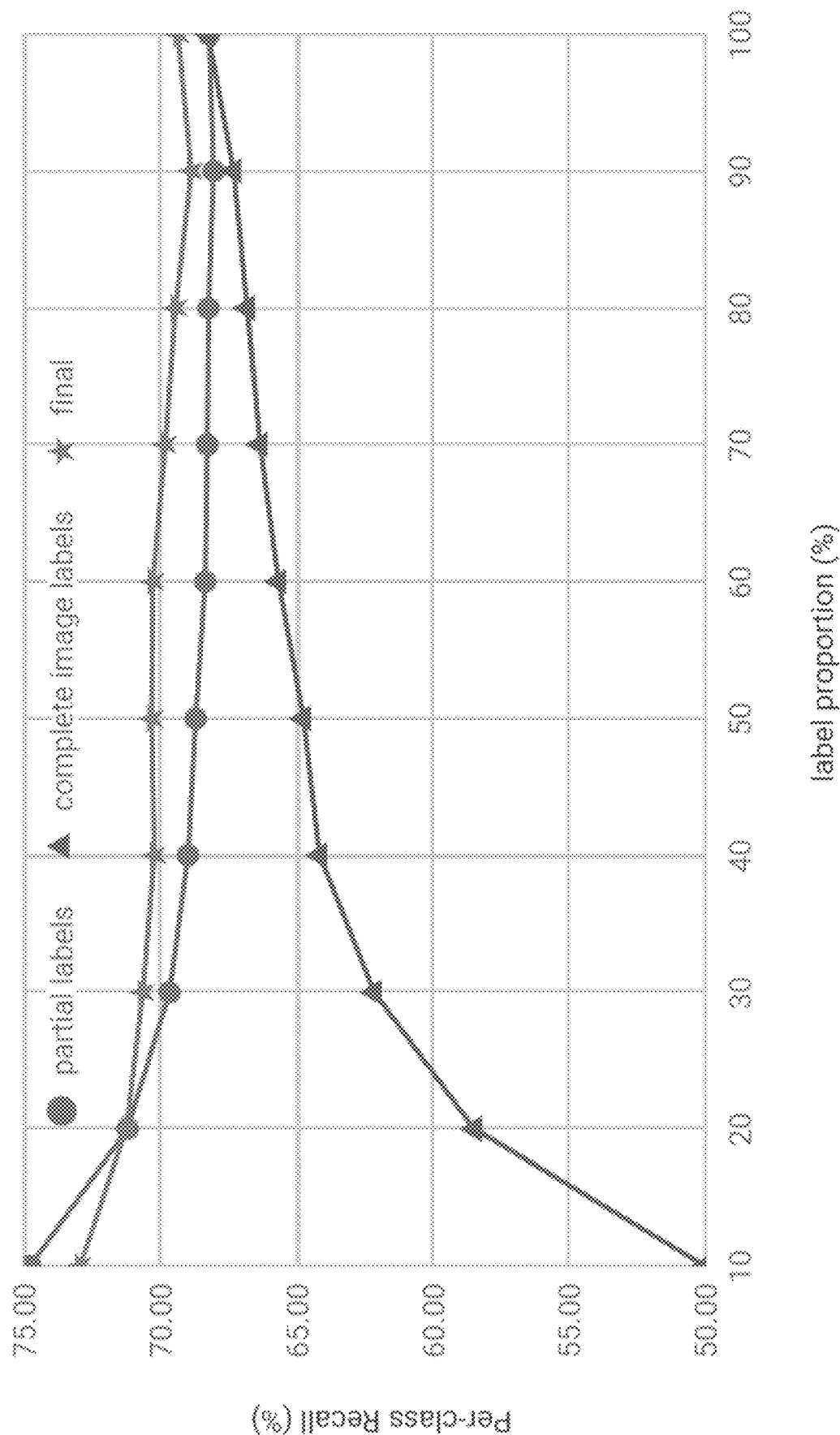
Figure 11G:
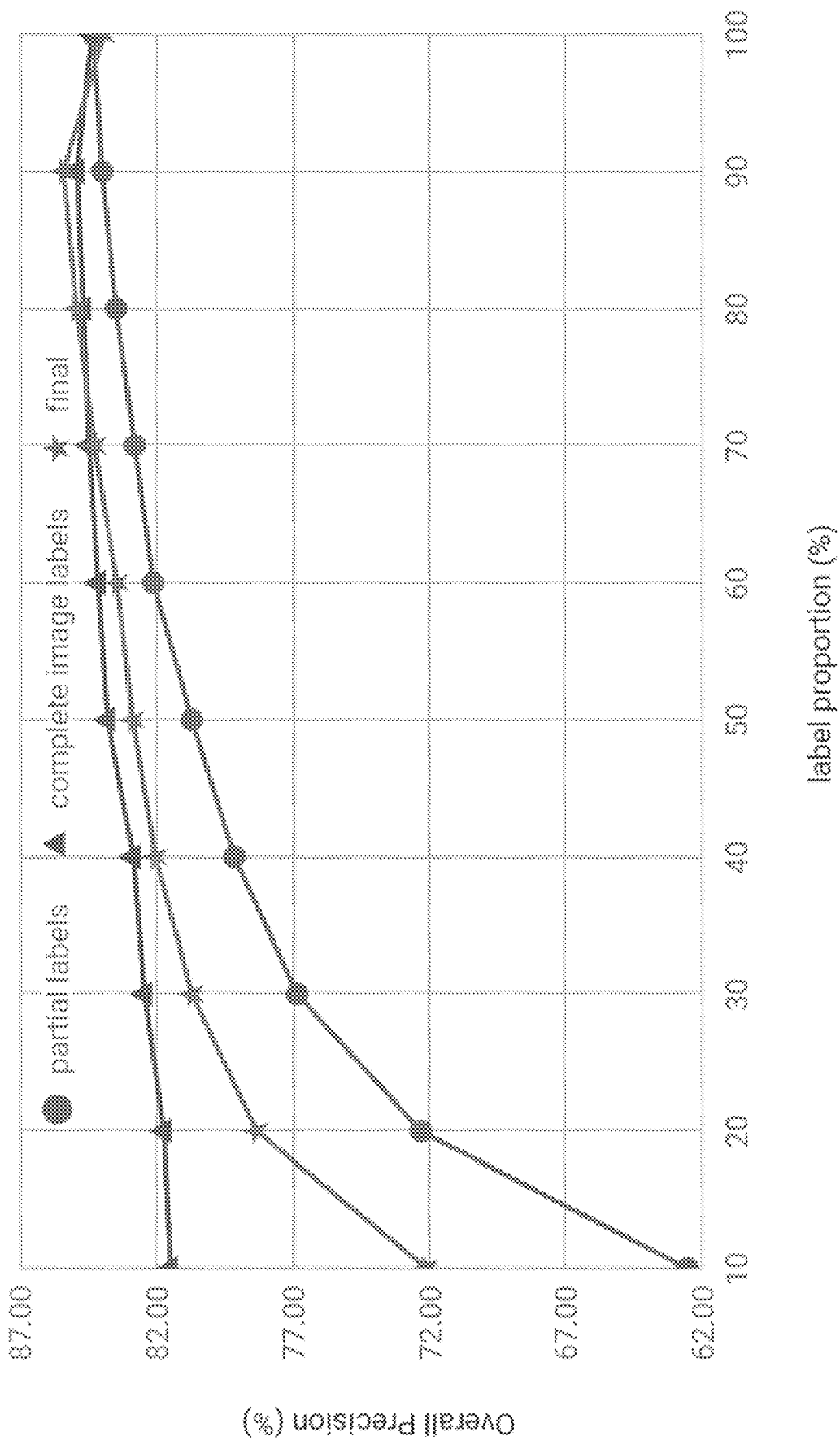
Figure 11H:
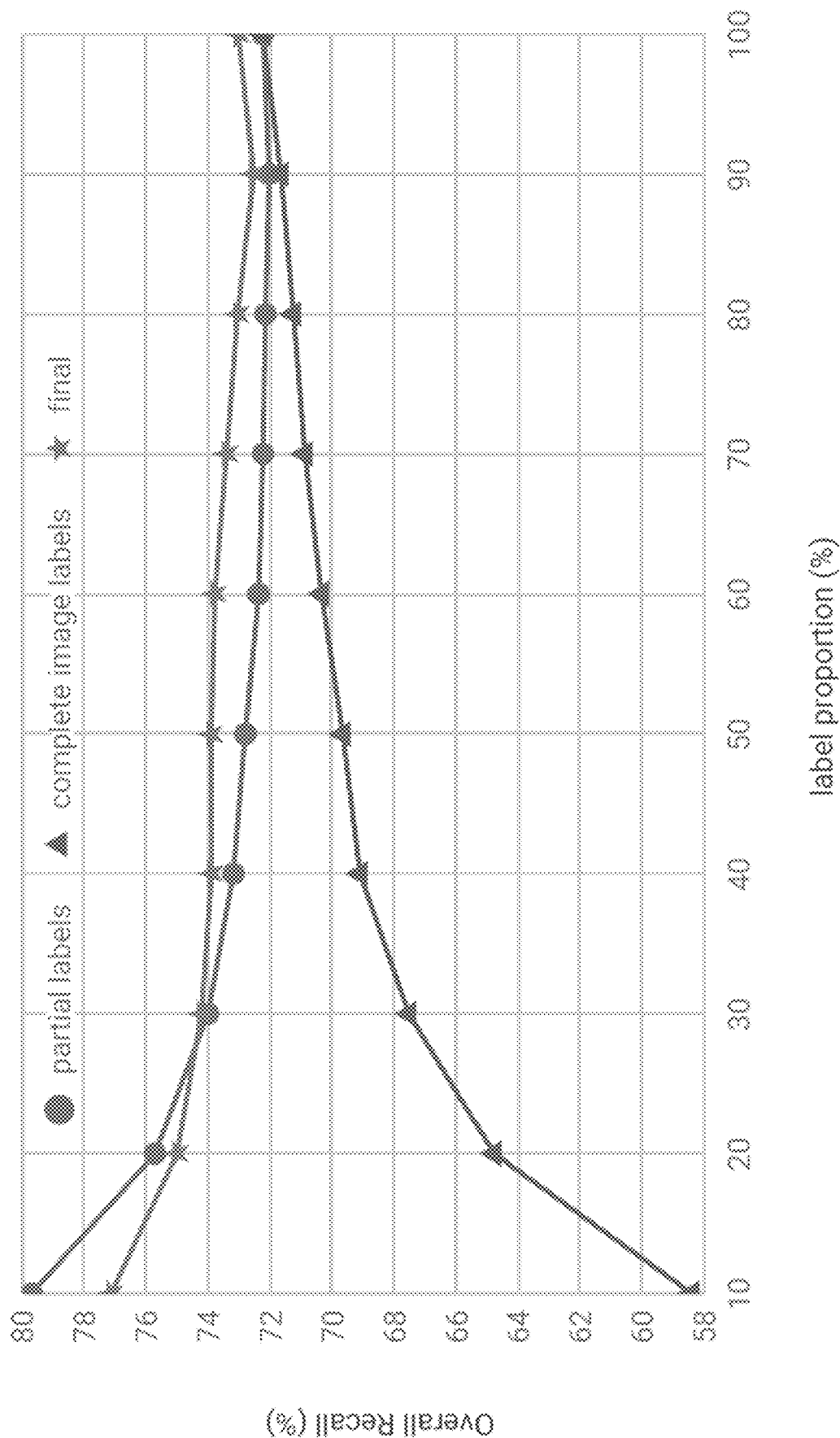

FIGS. 9A-9C are plots showing comparison of the labeling strategies for different label proportions and different architectures on MS COCO val2014, according to some embodiments.

FIGS. 10A-10H are plots showing a comparison of the labeling strategies for different metrics on MS COCO val2014, according to some embodiments.

FIGS. 11A-11H are plots showing a comparison of the labeling strategies for different metrics on MS COCO val2014, according to some embodiments.

Figure 12:
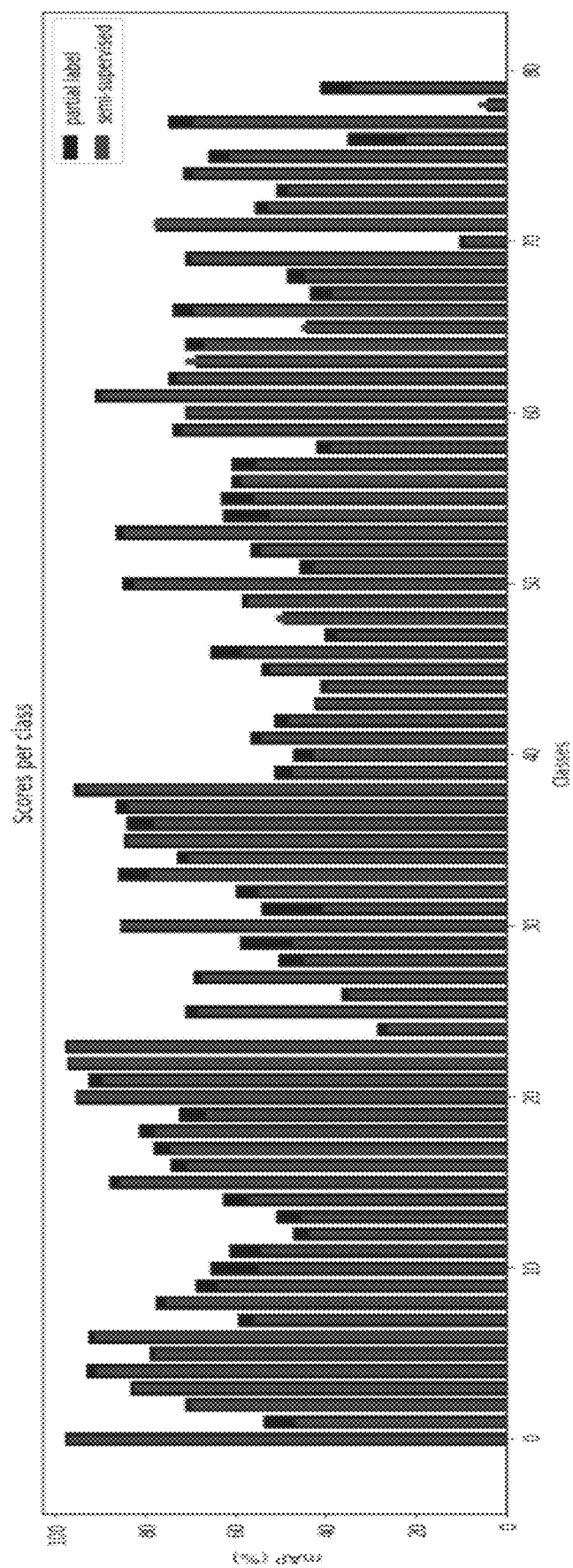
FIG. 12 is a bar chart showing a comparison of semi-supervised and partial labels for each class of MS COCO when 10% of the labels are used, according to some embodiments. The partial labels approach is better than the semi-supervised approach for most of the categories (75/80).
Figure 13A:
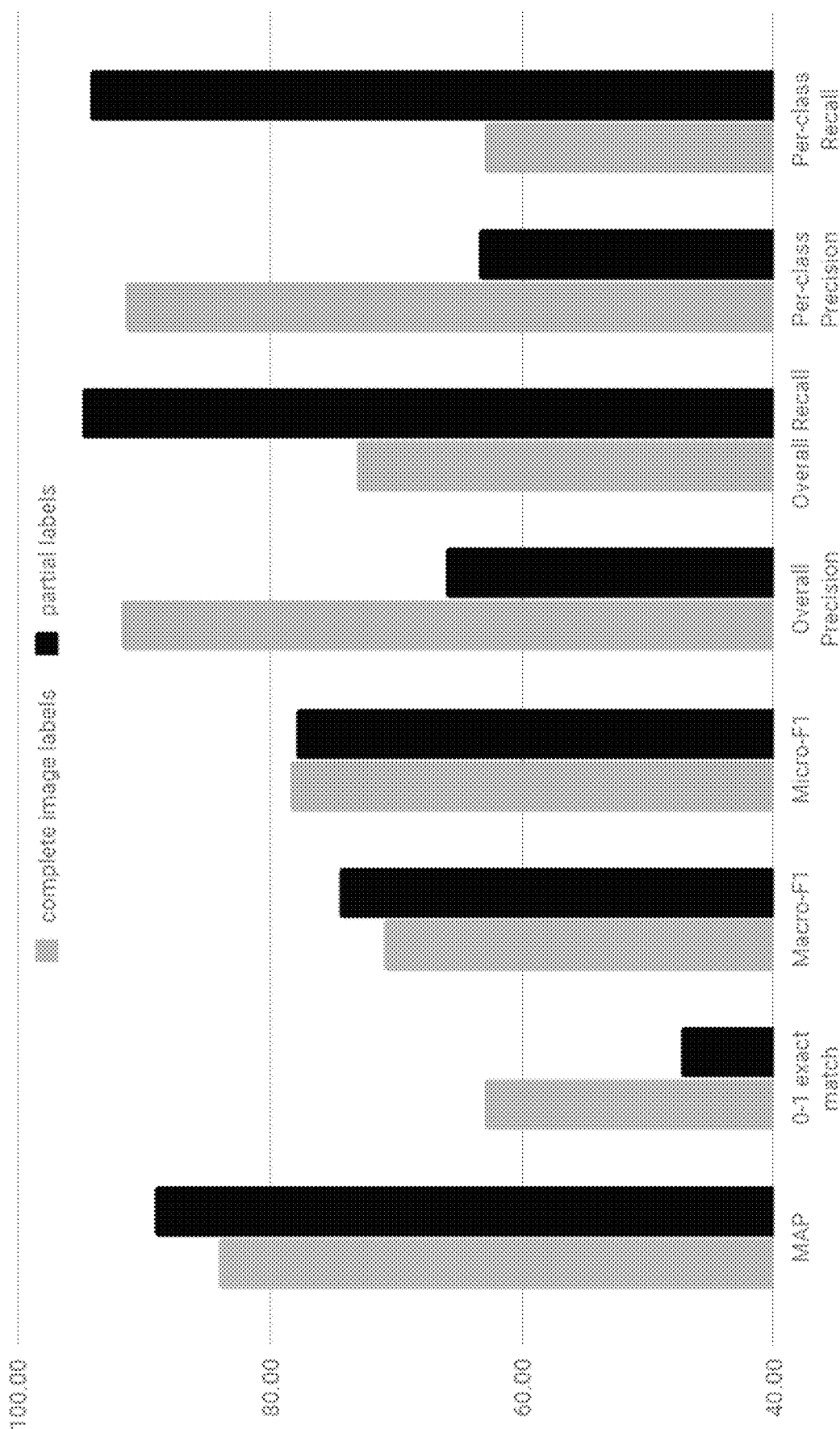
FIGS. 13A-13B are plots showing a comparison of the labeling strategy with 10% of labels, according to some embodiments.
Figure 13B:
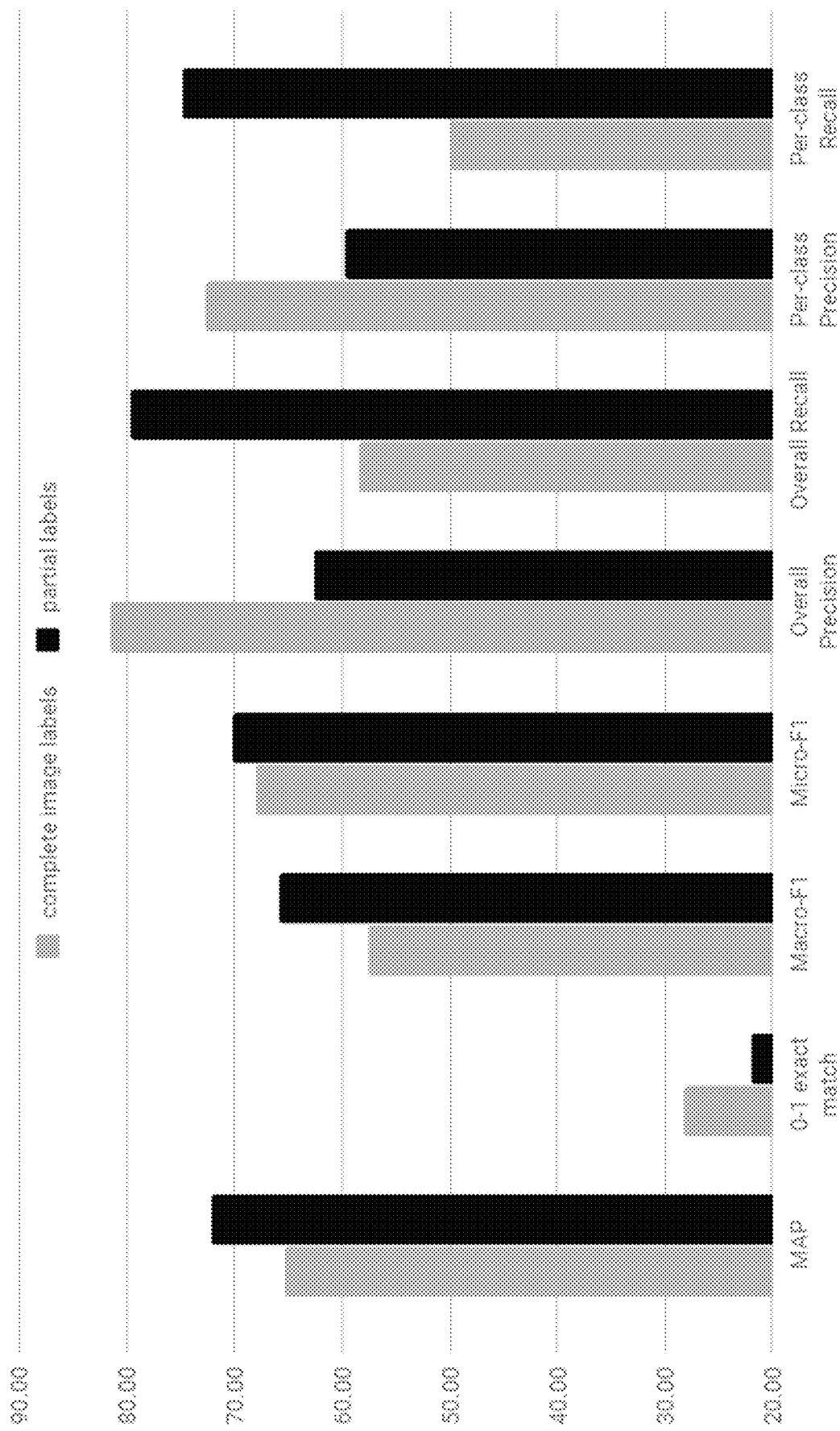
Figure 14A:
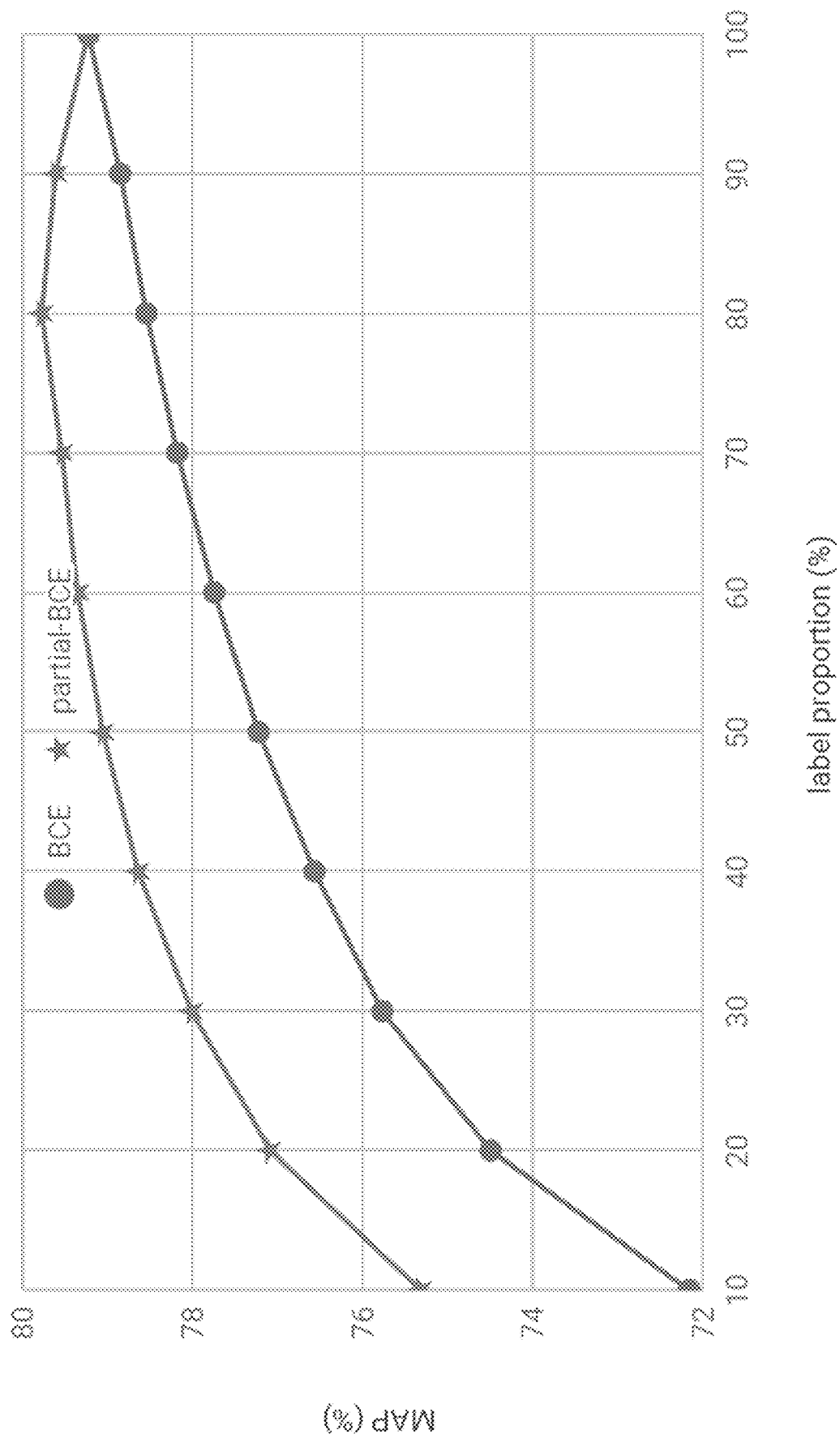
FIGS. 14A-14H are plots showing results for different metrics on MS COCO val2014, according to some embodiments.
Figure 14B:
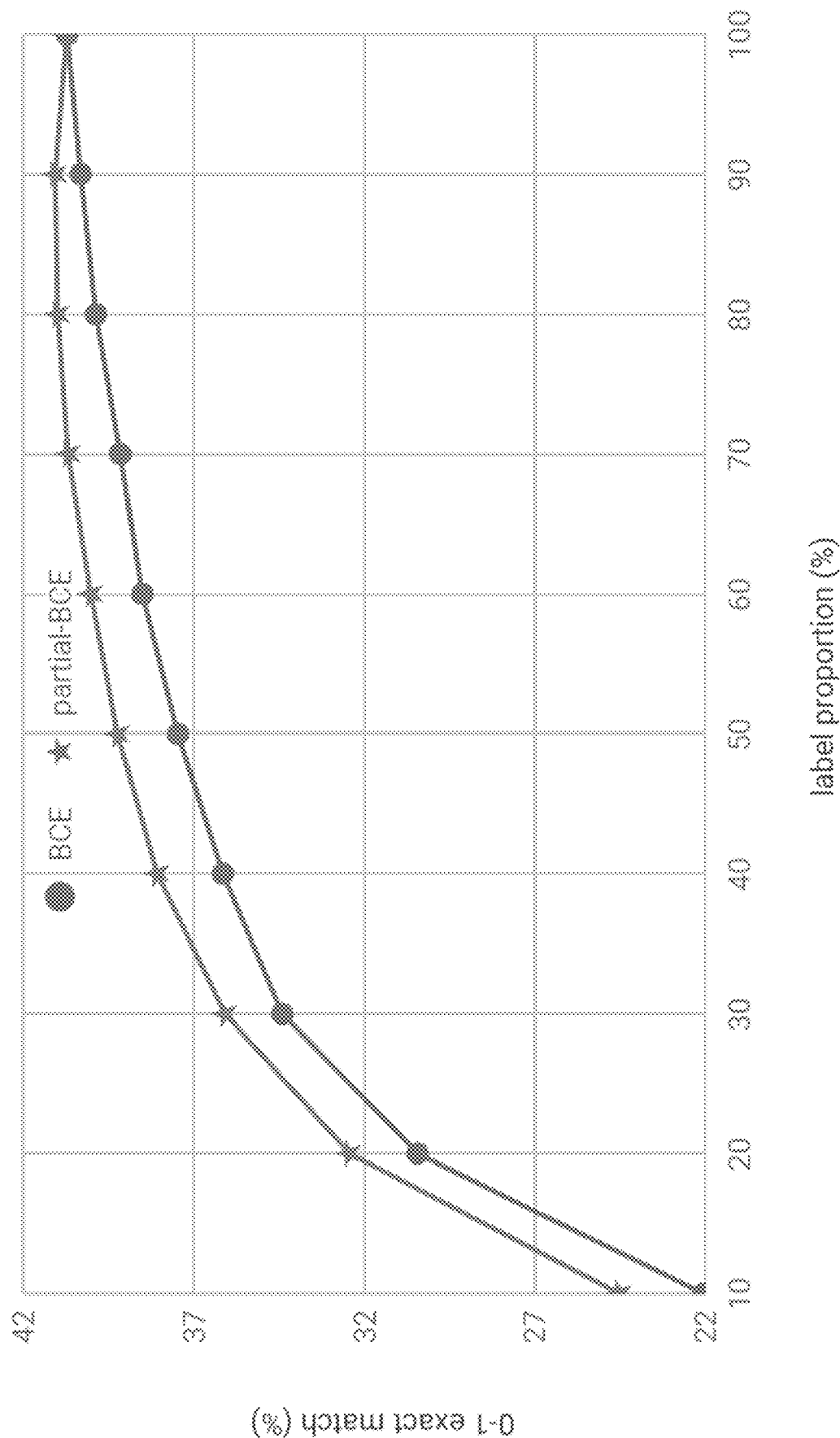
Figure 14C:
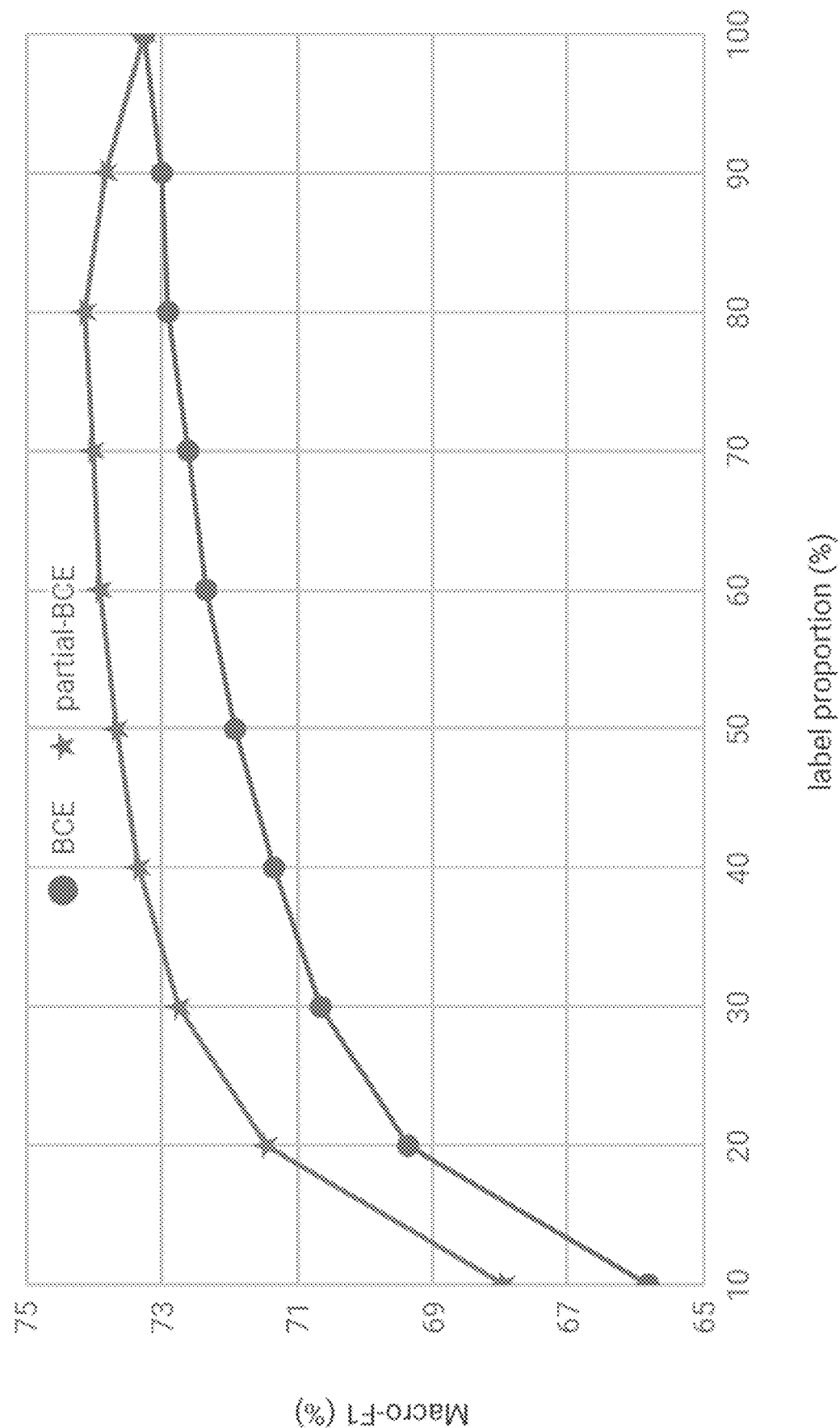
Figure 14D:
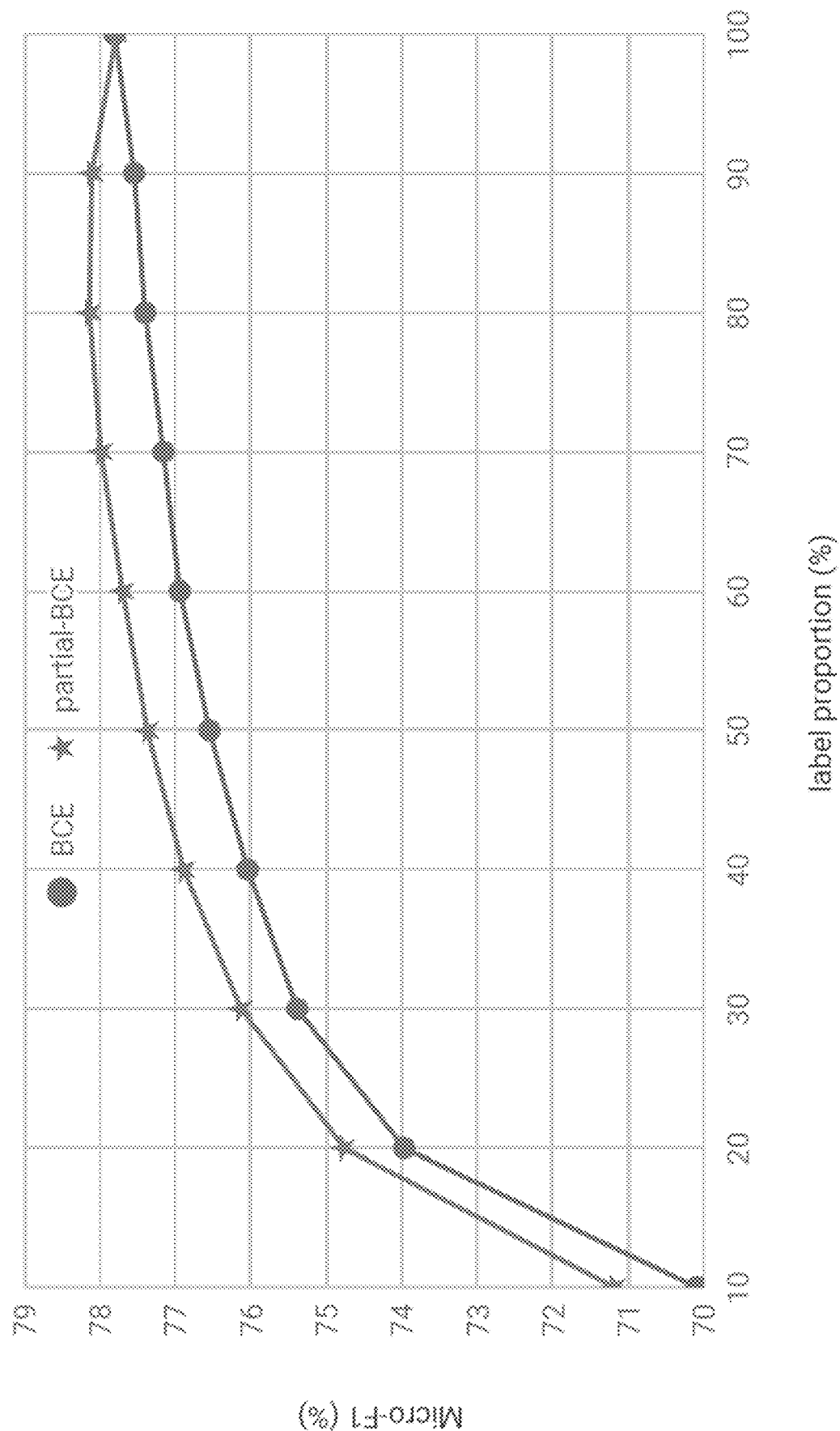
Figure 14E:
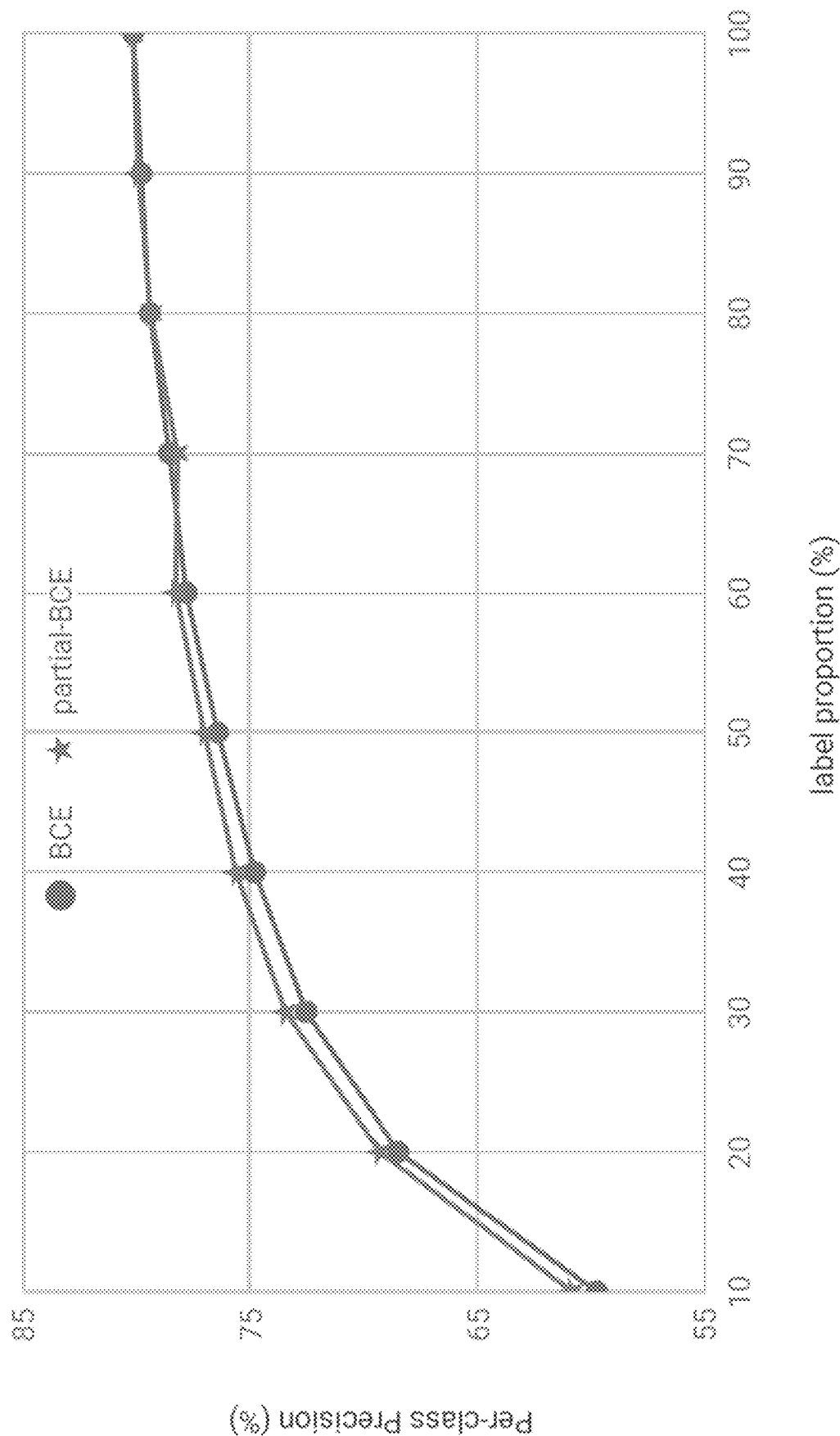
Figure 14F:
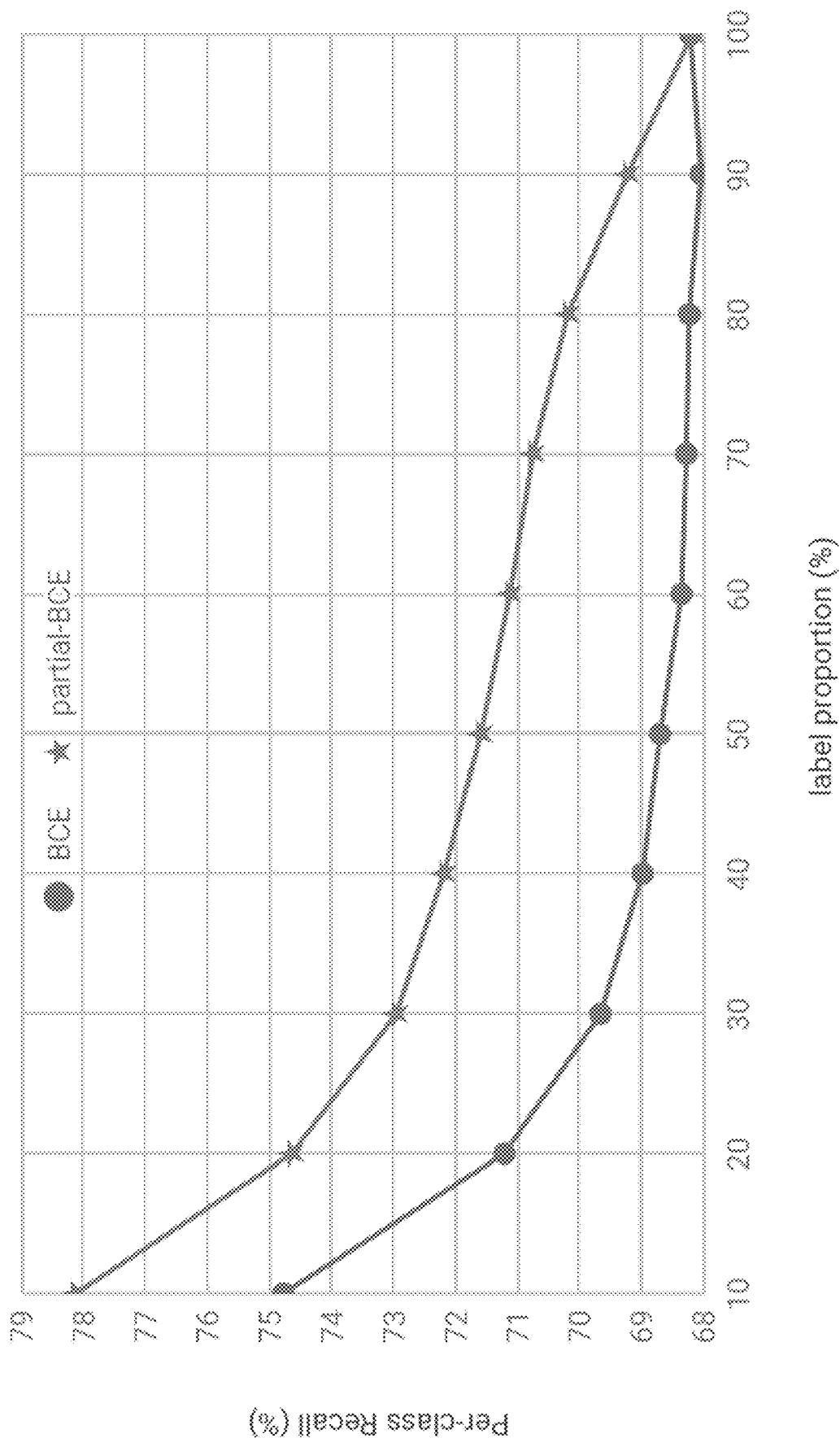
Figure 14G:
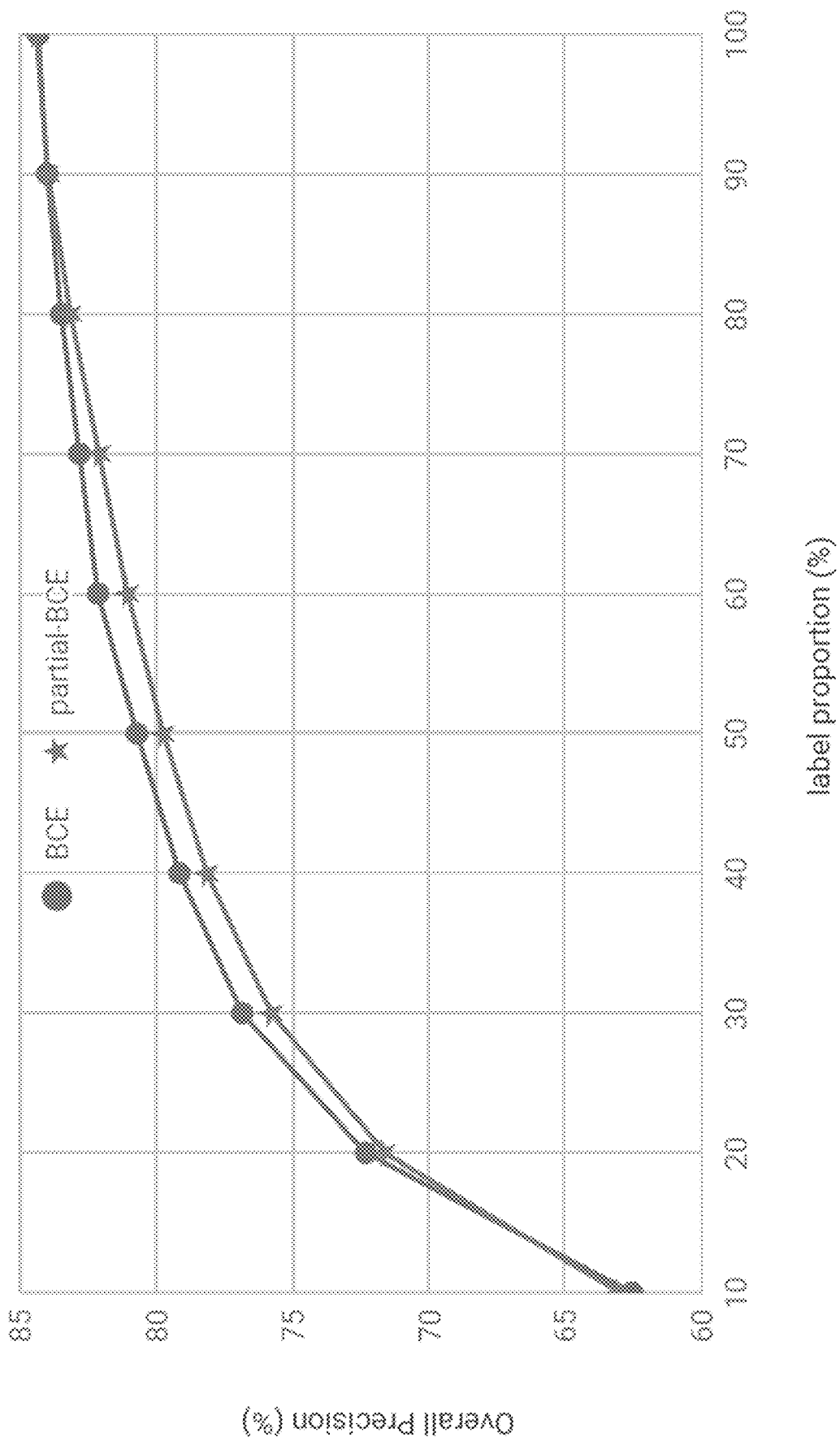
Figure 14H:
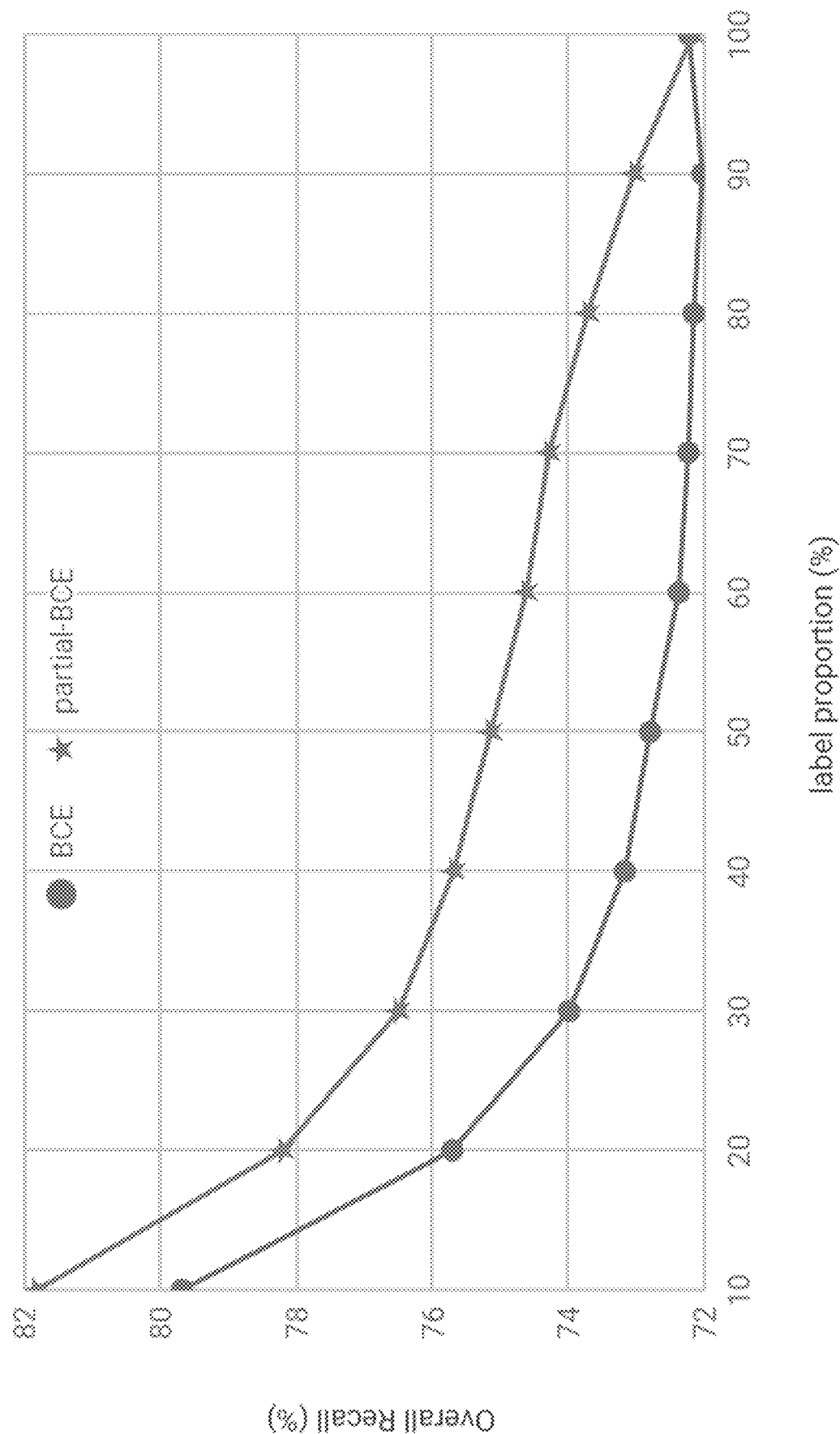
Figure 15C:
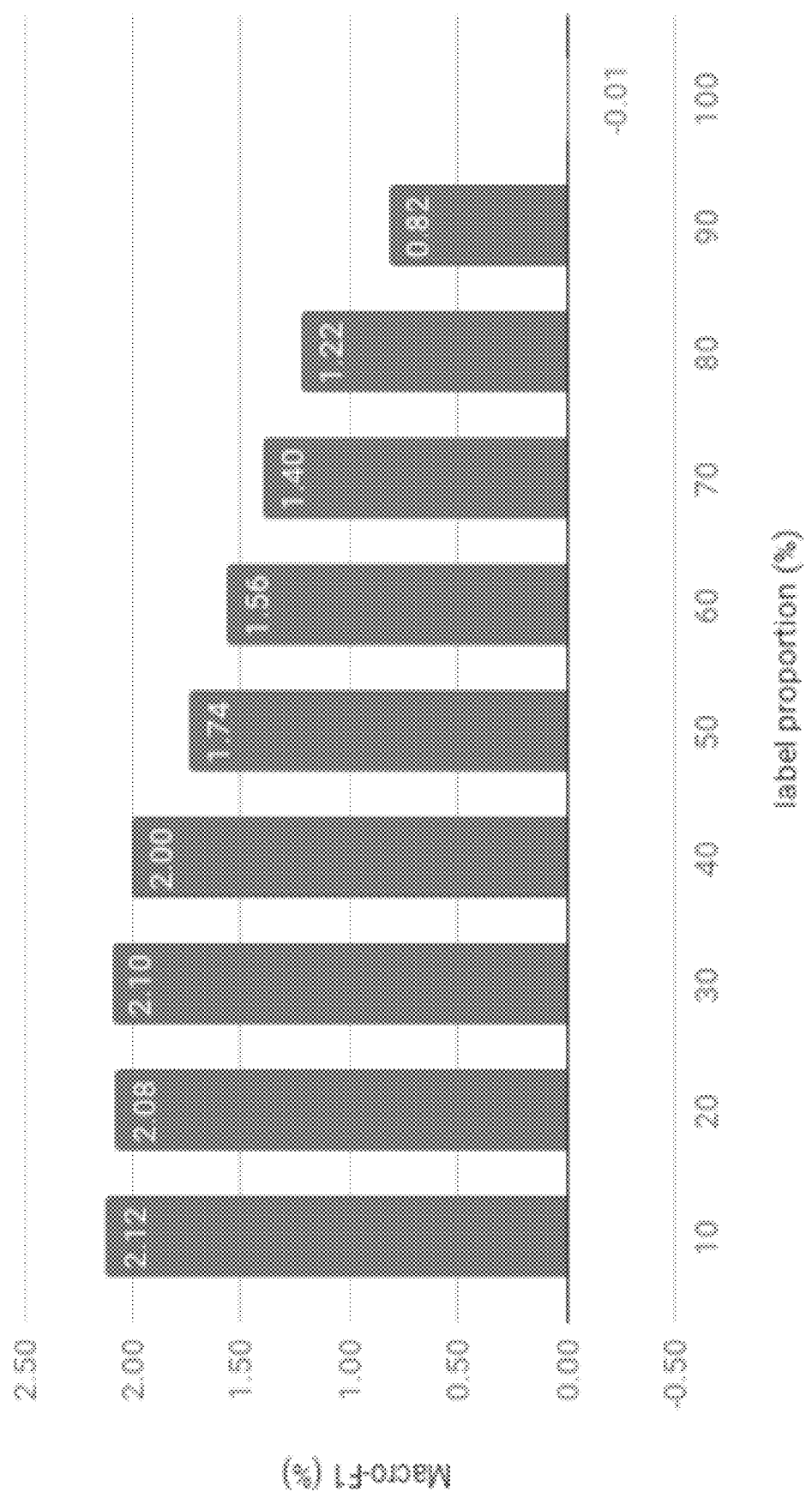
Figure 15D:
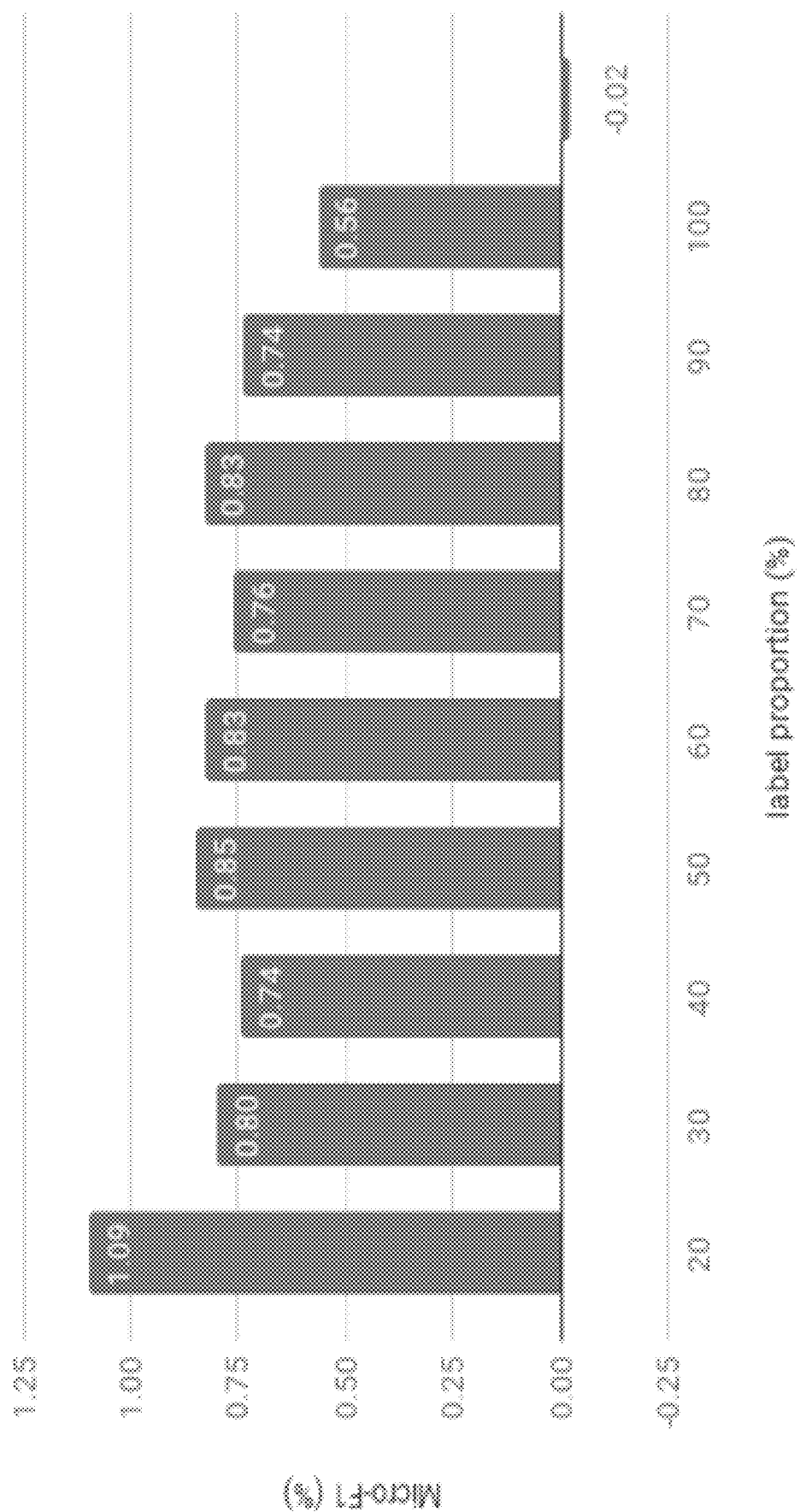
Figure 16A:
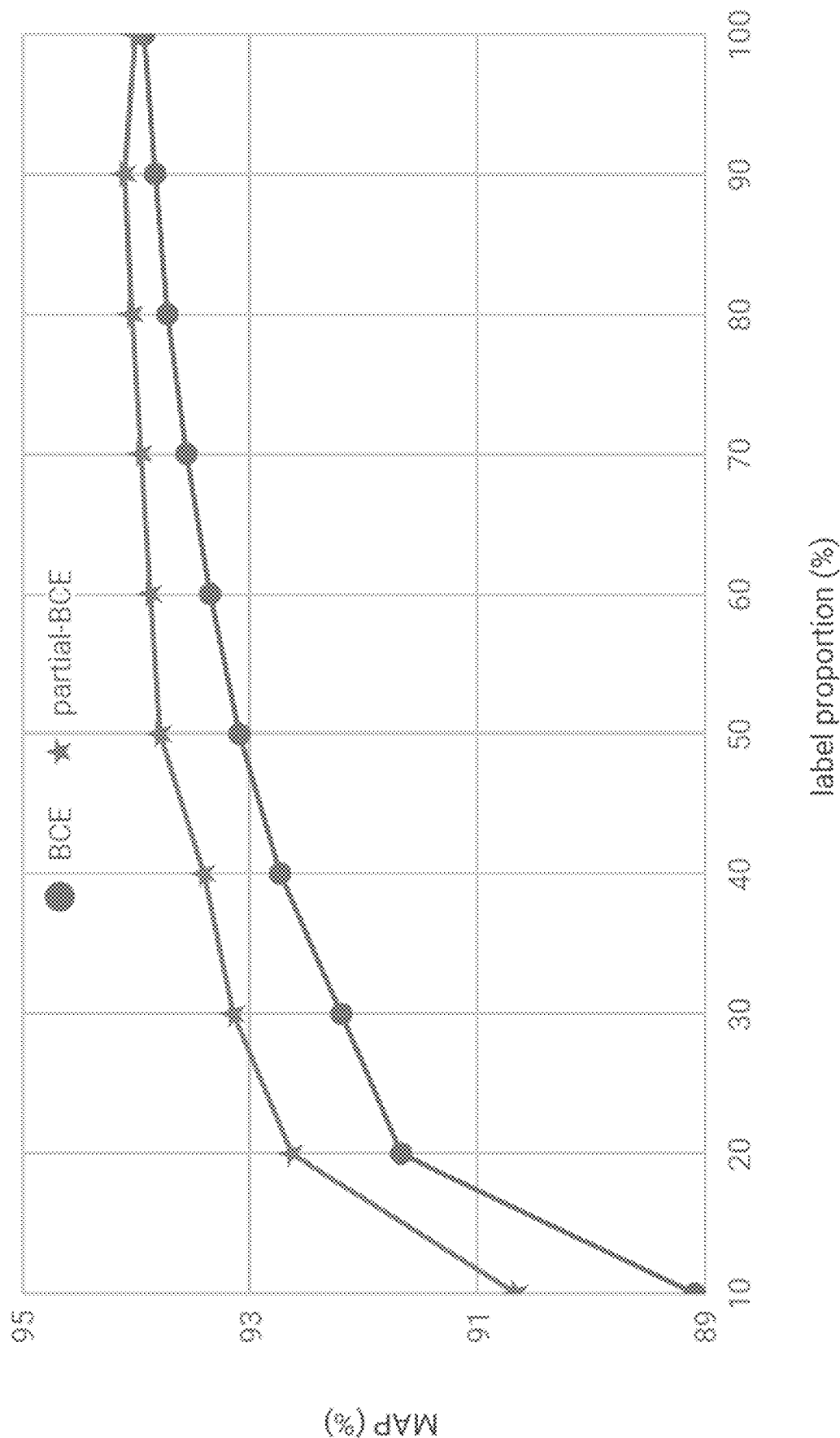
FIGS. 16A-16H are plots showing different metrics on Pascal VOC 2007, according to some embodiments.
Figure 16B:
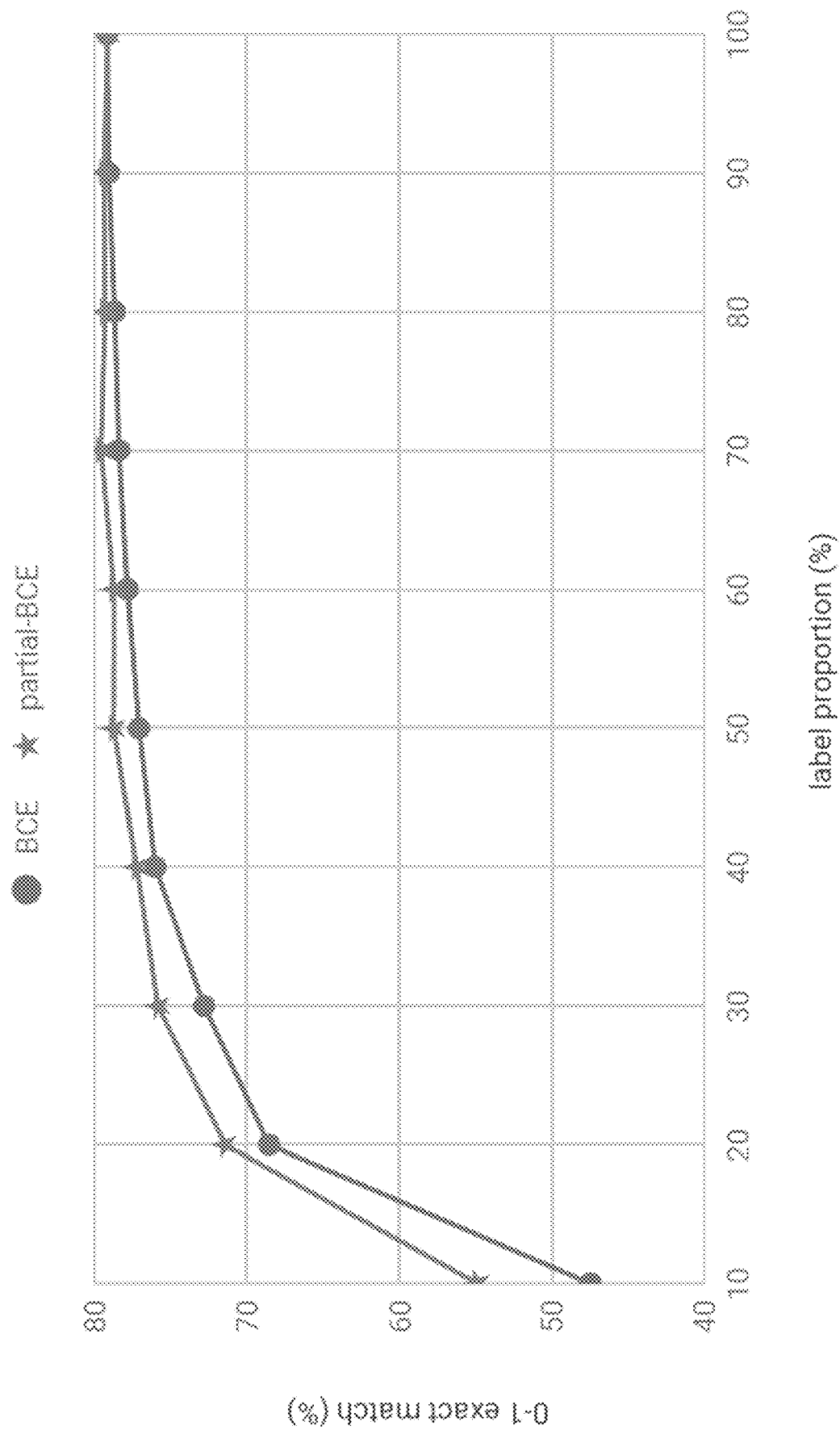
Figure 16C:
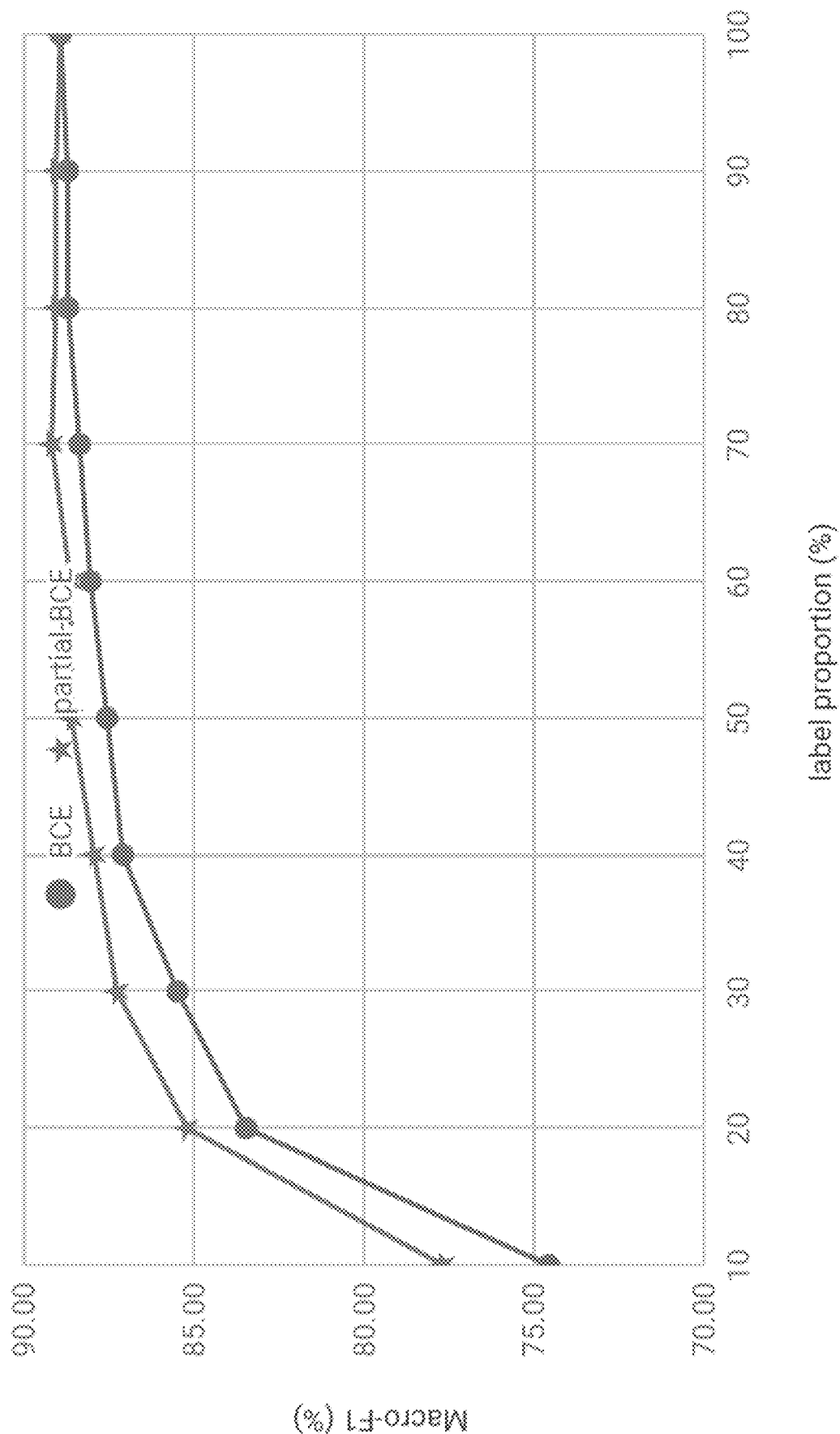
Figure 16D:
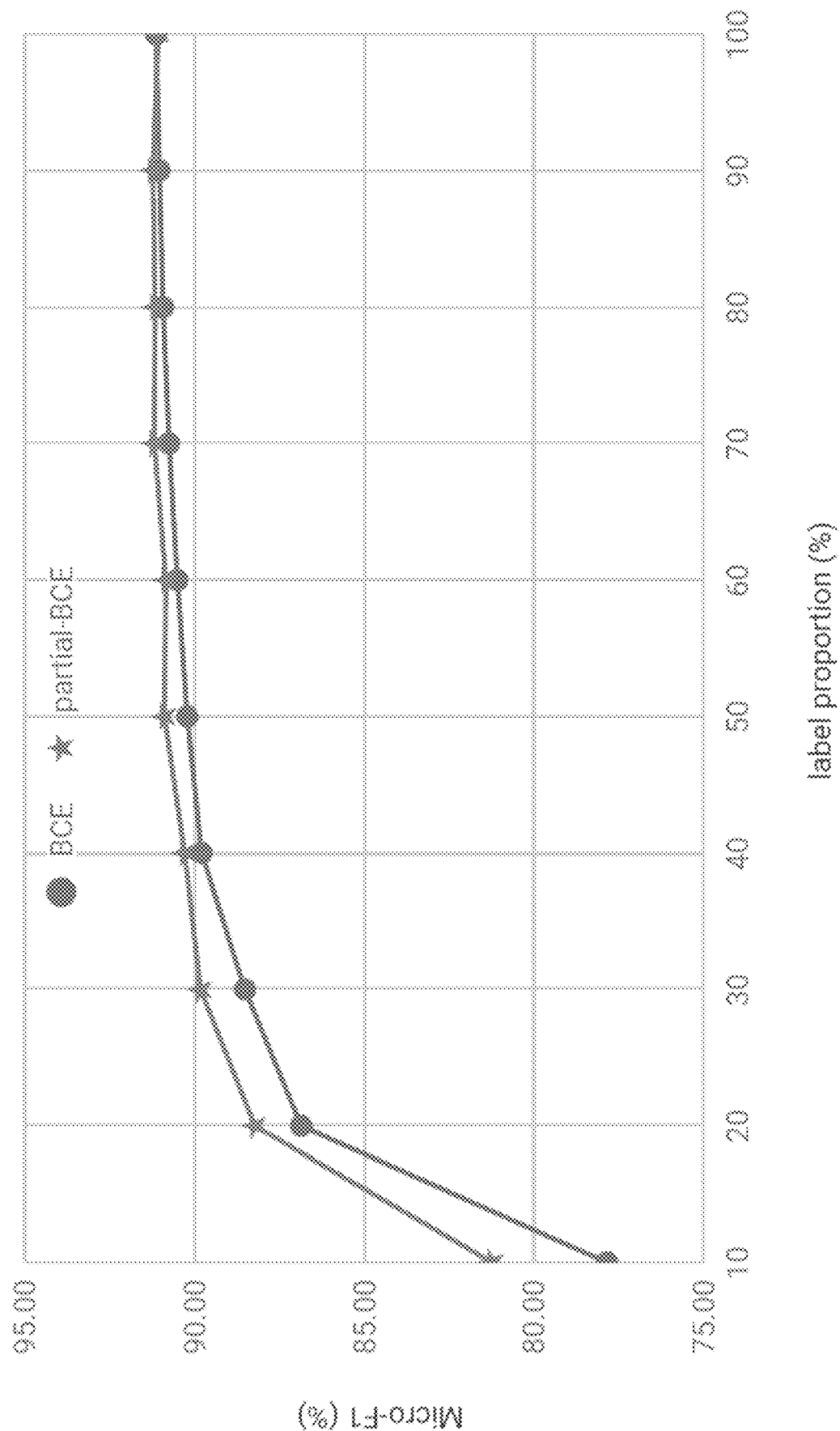
Figure 16E:
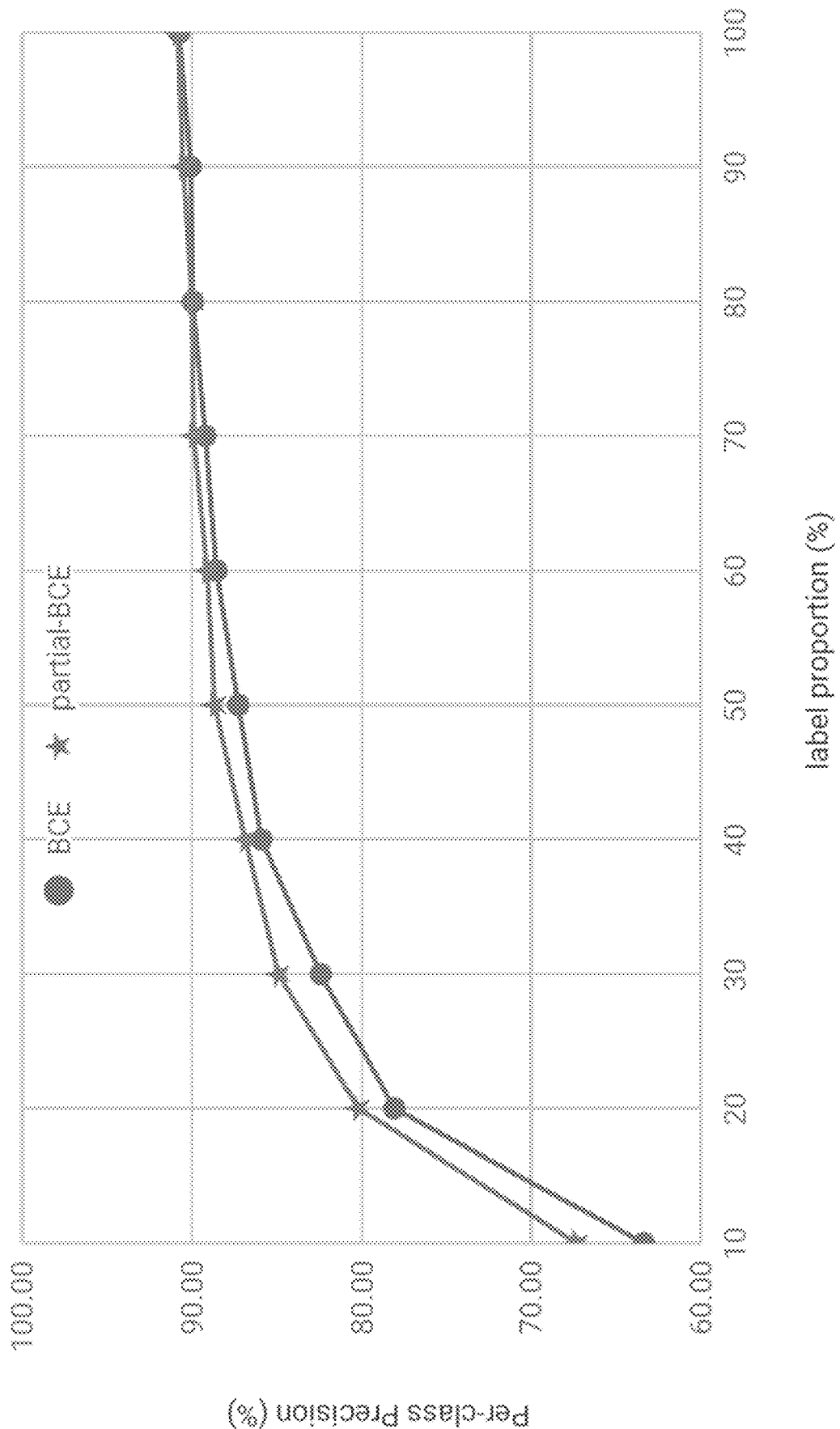
Figure 16F:
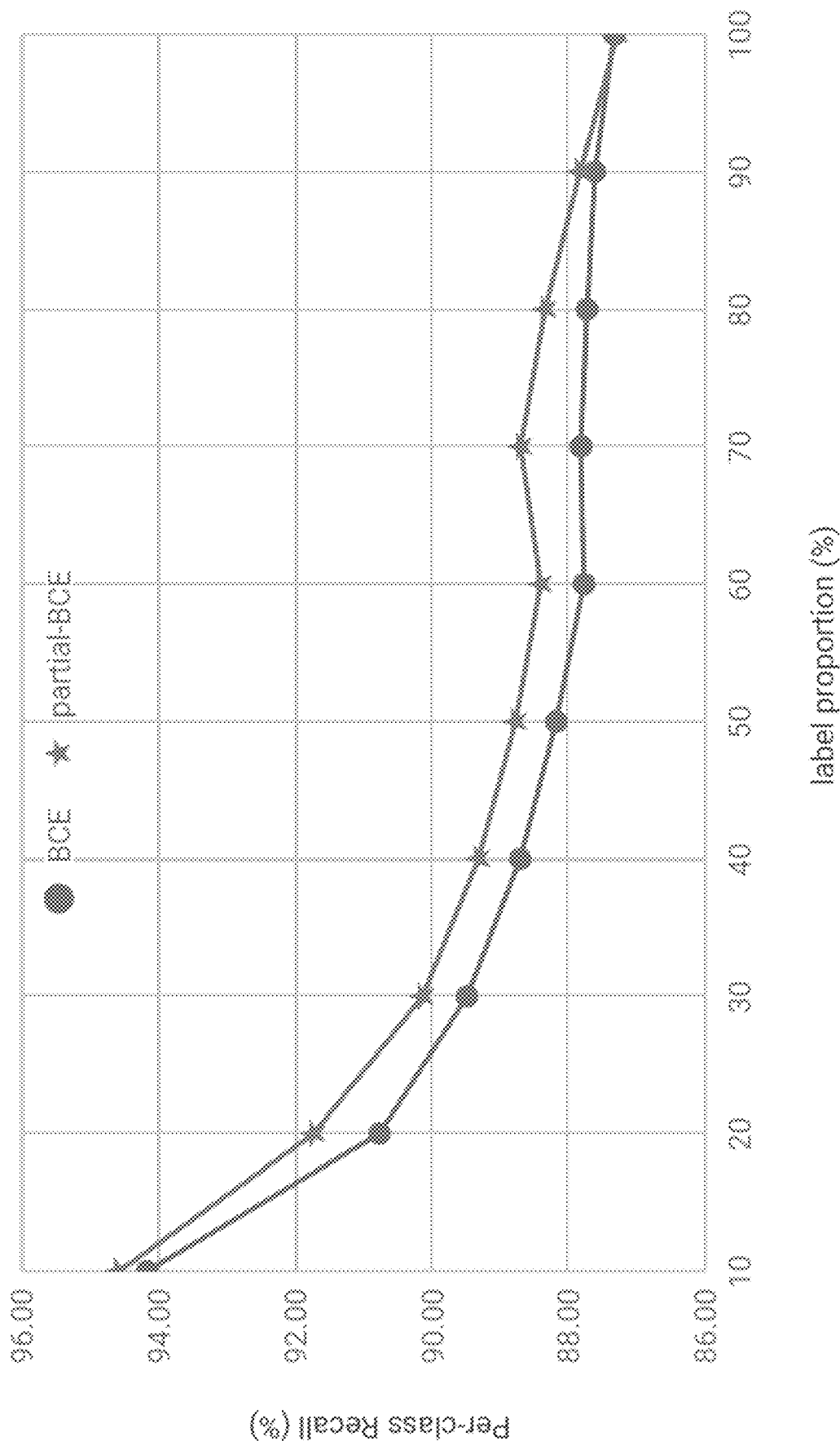
Figure 16G:
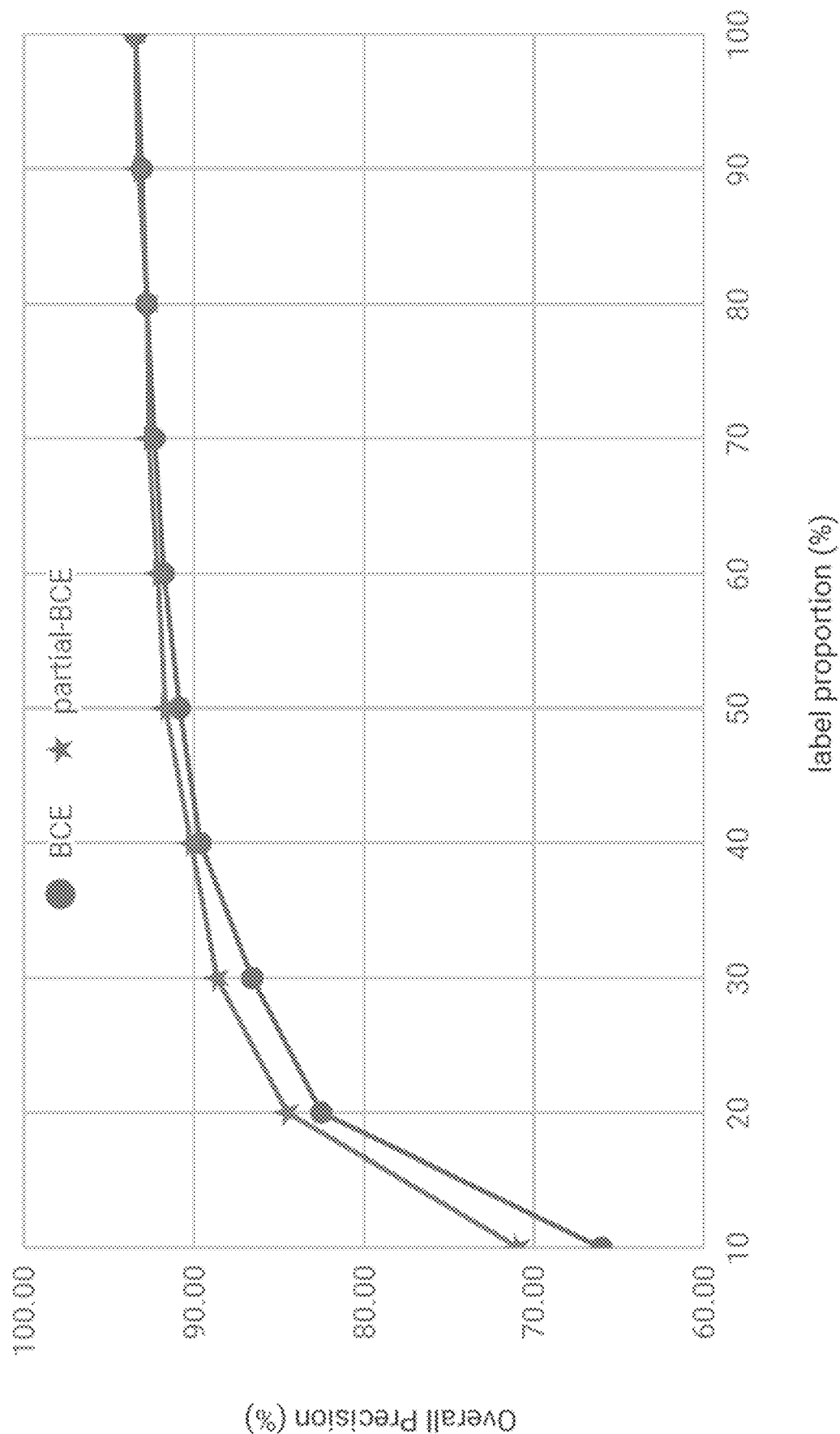
Figure 16H:
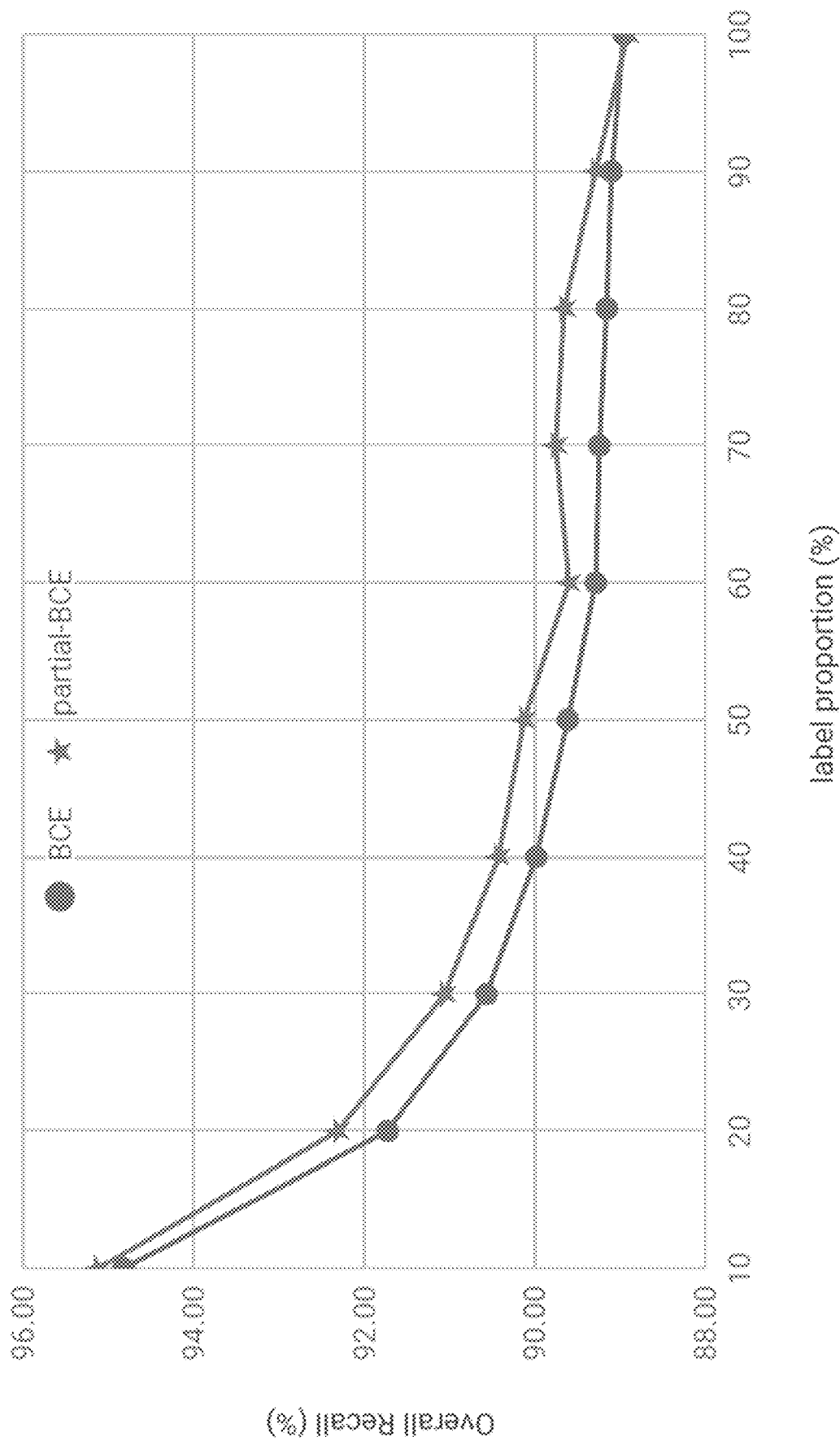
Figure 17A:
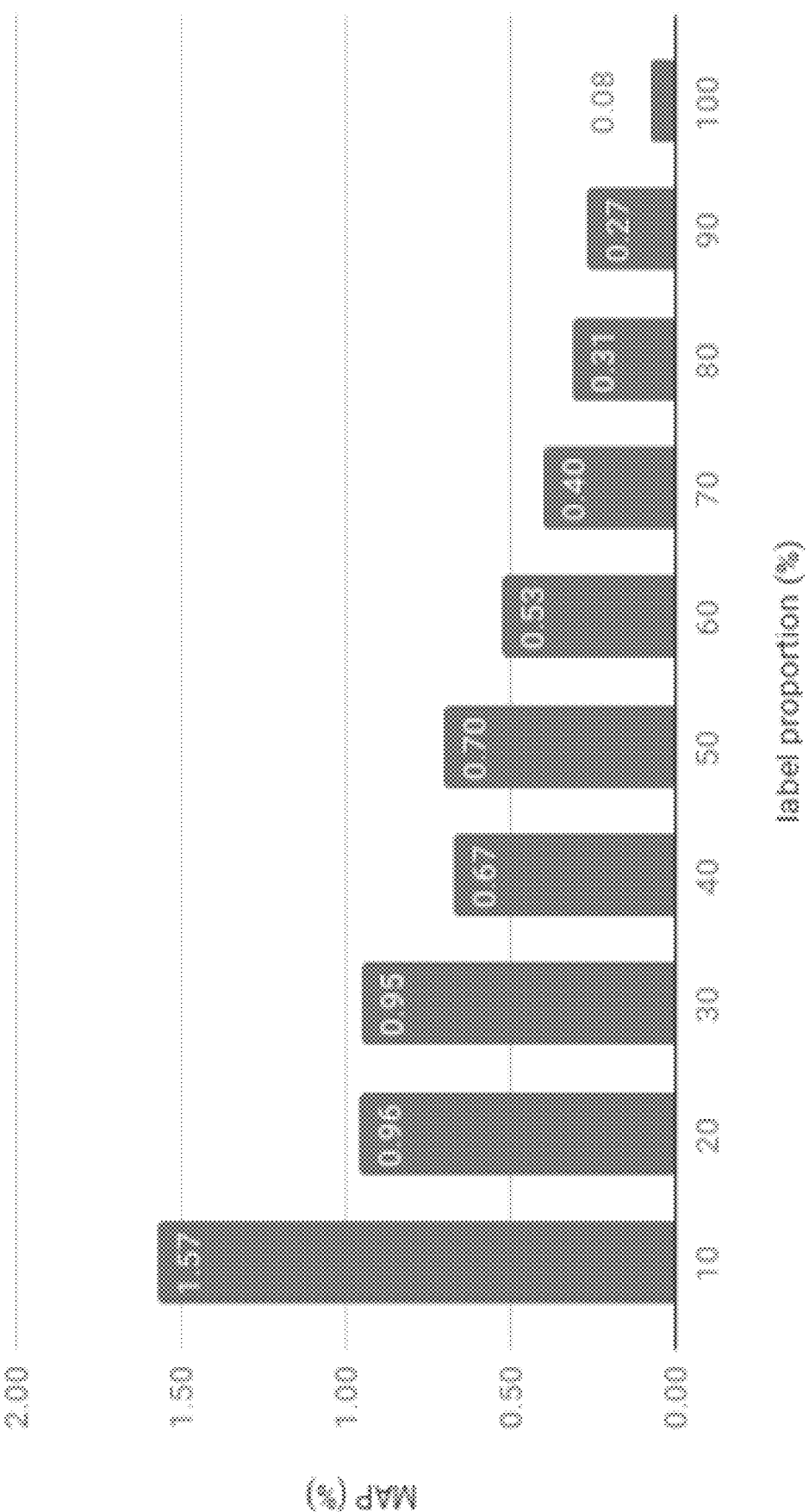
Figure 17D:
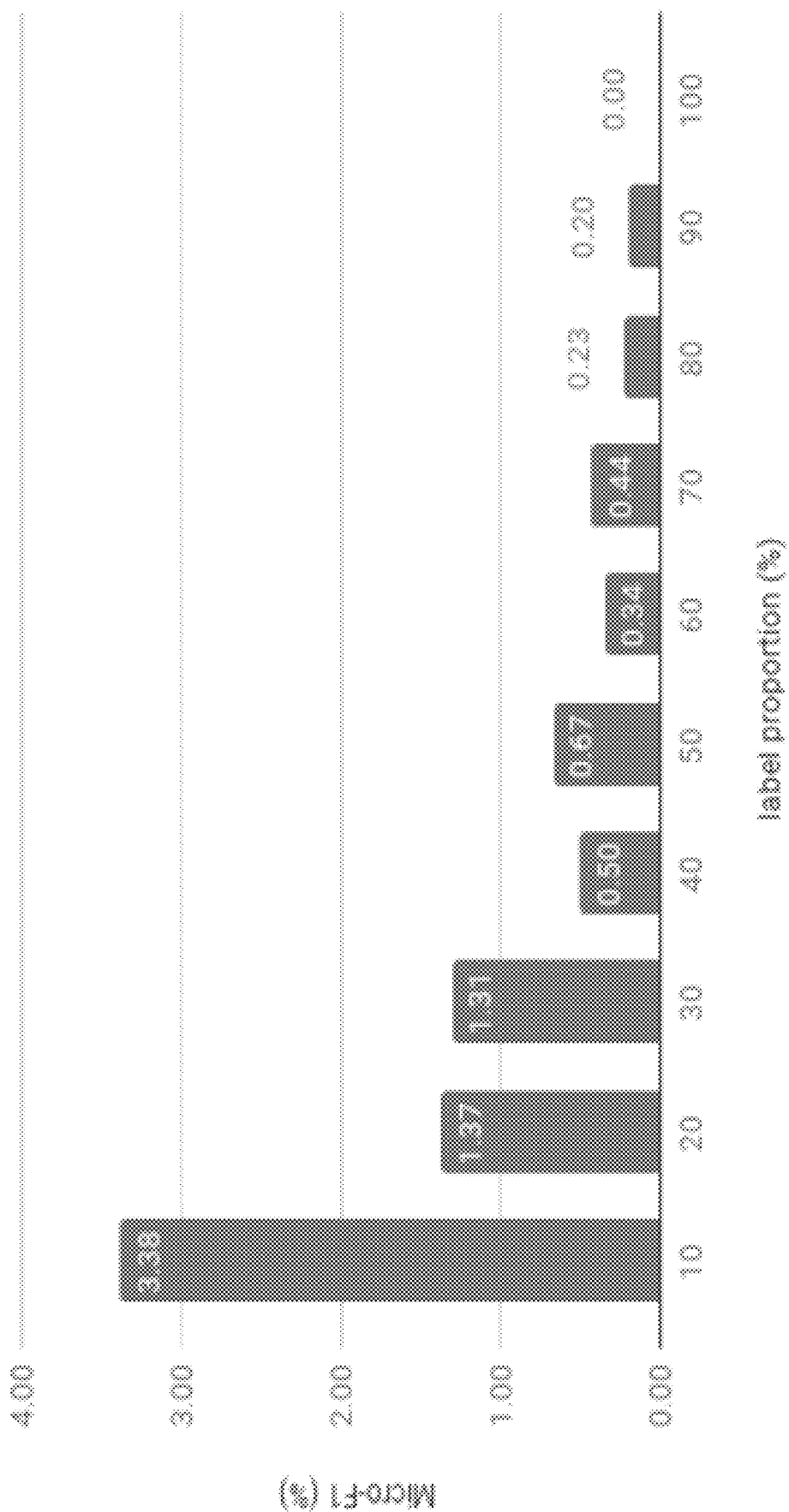
Figure 17F:
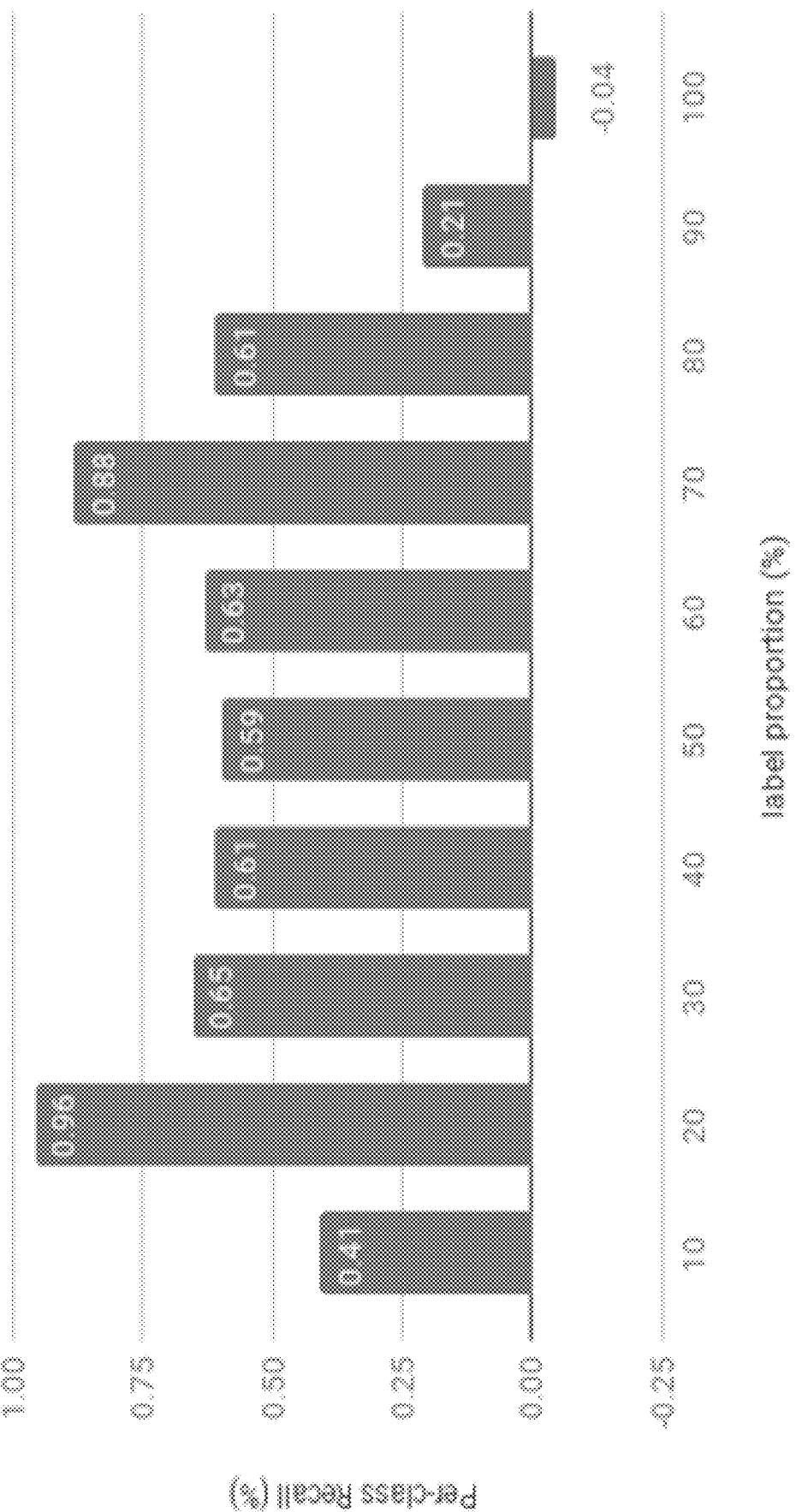

In FIG. 12, Applicants compare the semi-supervised and partial label strategy for 10% of labels on MS COCO val2014. Applicants observe that partial label strategy is better on 75 of the 80 categories. FIGS. 13A-13B are plots showing a comparison of the labeling strategy with 10% of labels, according to some embodiments.

A.6. Comparison of the Loss Functions

In this section, Applicants analyze the performances of the BCE and partial-BCE loss functions for different metrics. The results on MS COCO (resp. Pascal VOC 2007) are shown in FIGS. 14A-14H (resp. FIGS. 16A-16H) and the improvement of the partial-BCE with respect to the BCE is shown in FIGS. 15A-15H (resp. FIGS. 17A-17H).

Applicants observe that the partial-BCE significantly improves the performances for MAP, 0-1 exact match, Macro-F1 and Micro-F1 metrics.

Figure 18:
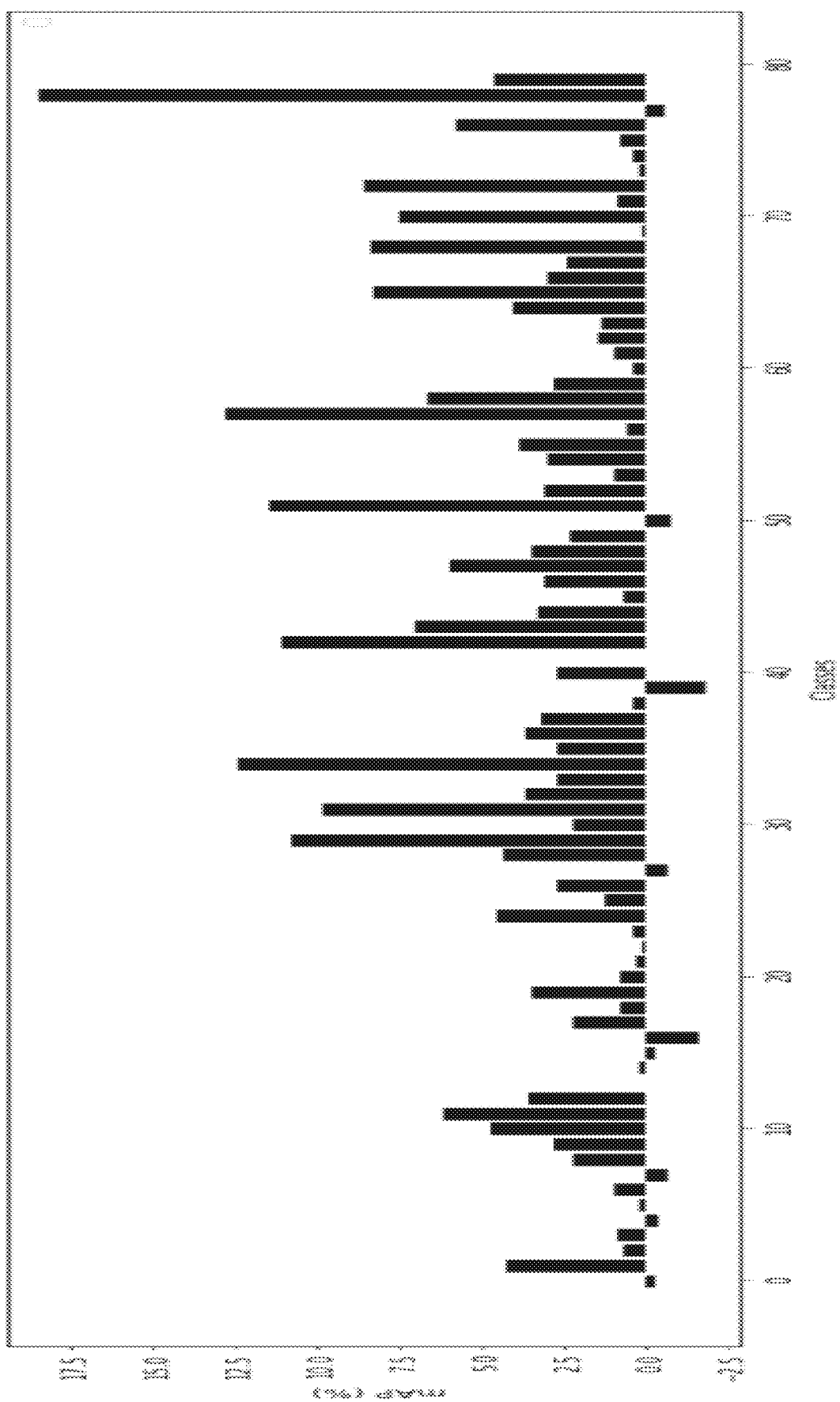
FIG. 18 is a bar chart showing differences of AP performance between the partial-BCE and the BCE loss functions for each category of MS COCO, according to some embodiments. The partial-BCE improves the performances for most of the categories (69/80).
Figure 19A:
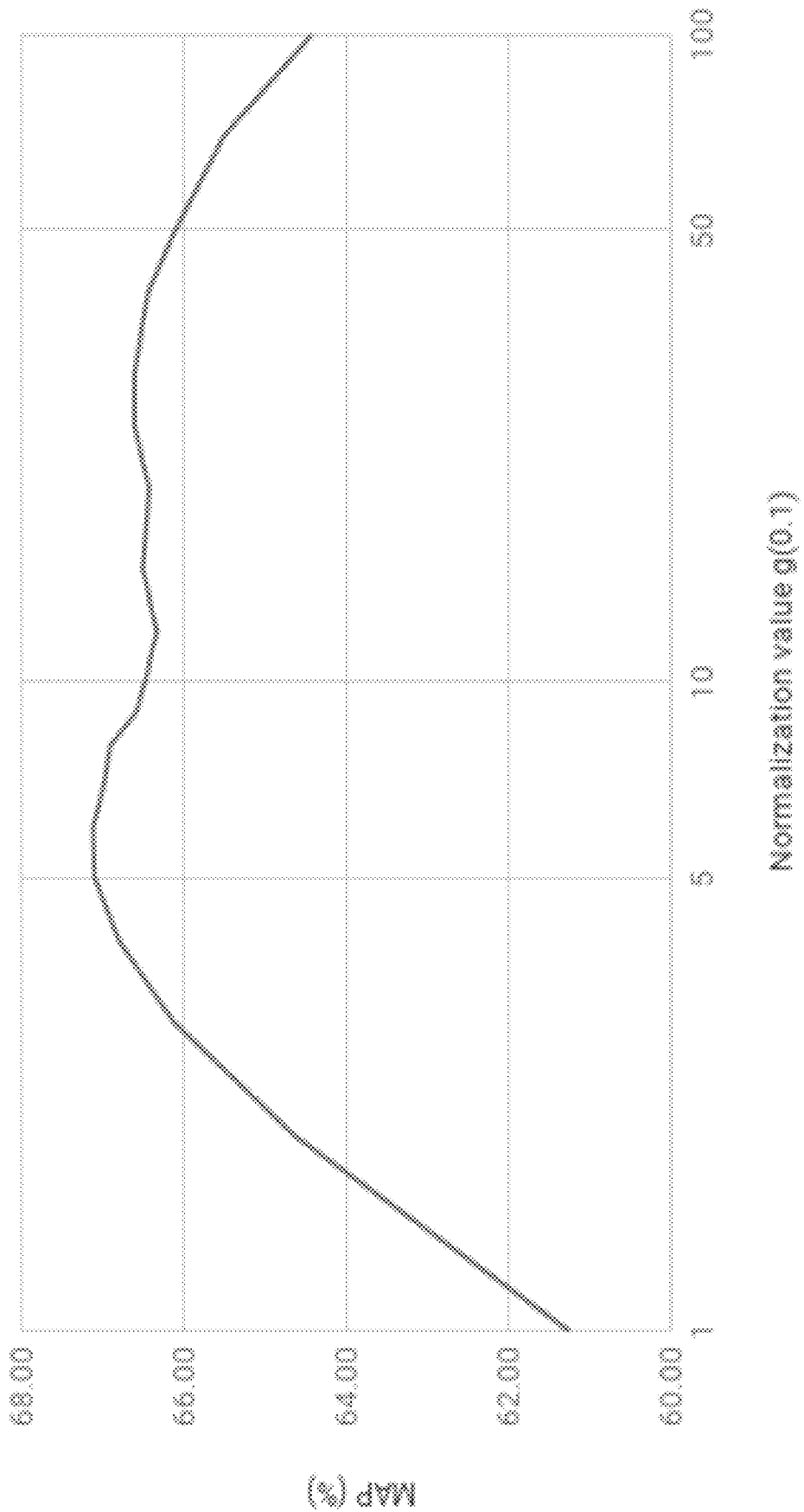
FIGS. 19A-19D are plots showing analysis of the normalization value for 10% of known labels (i.e., g(0.1)) on MS COCO val2014. (x-axis log-scale), according to some embodiments
Figure 19B:
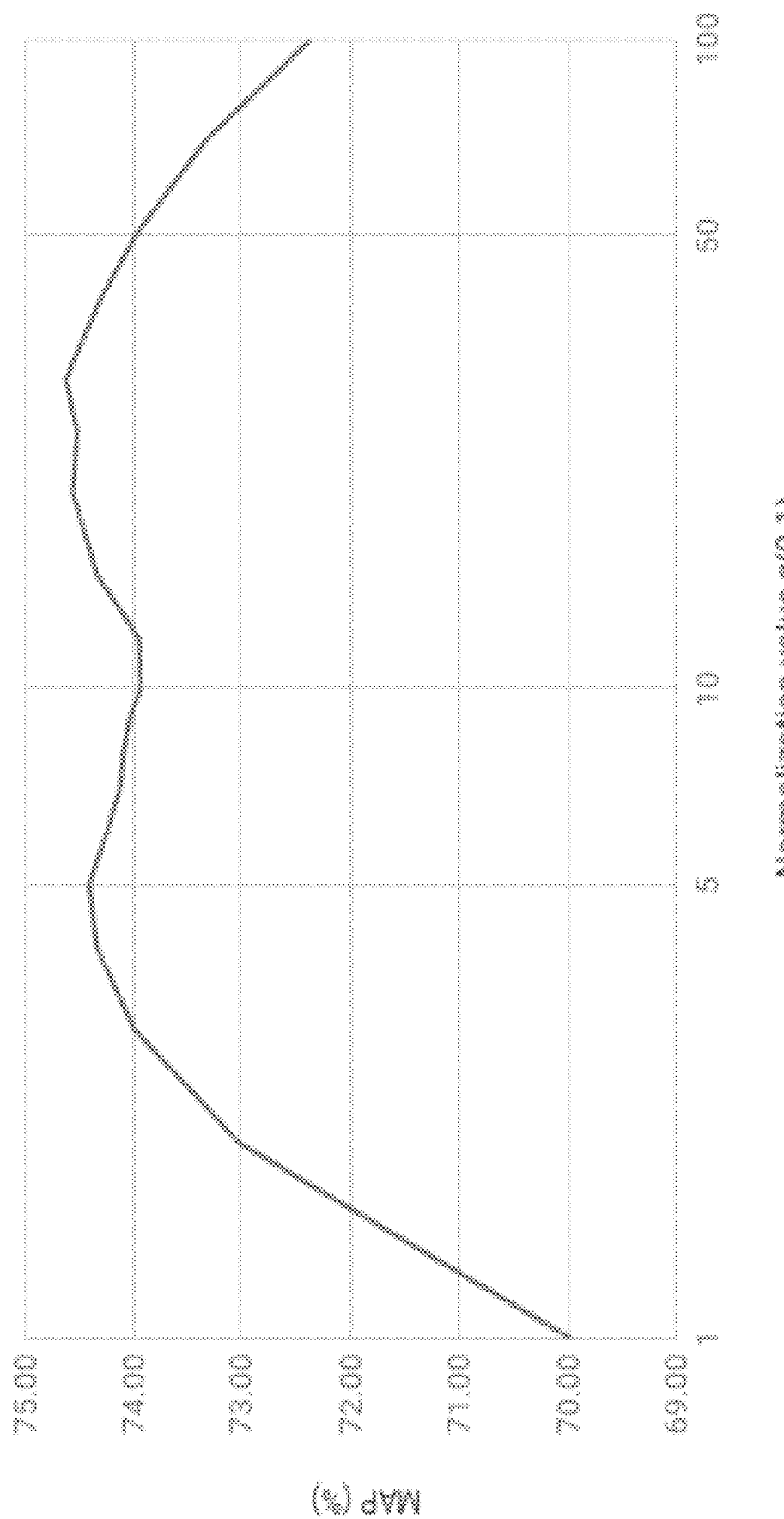
Figure 19C:
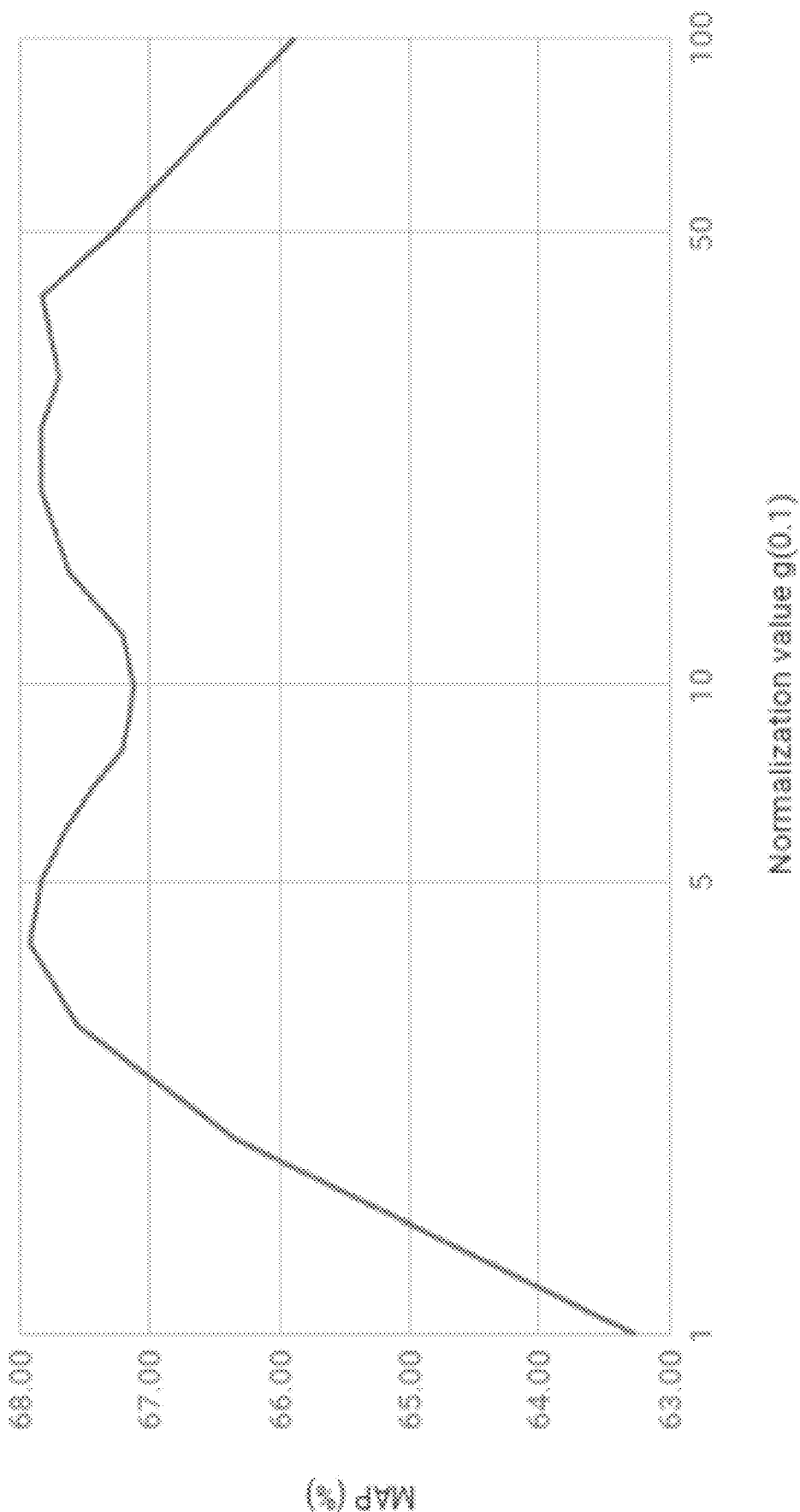
Figure 19D:
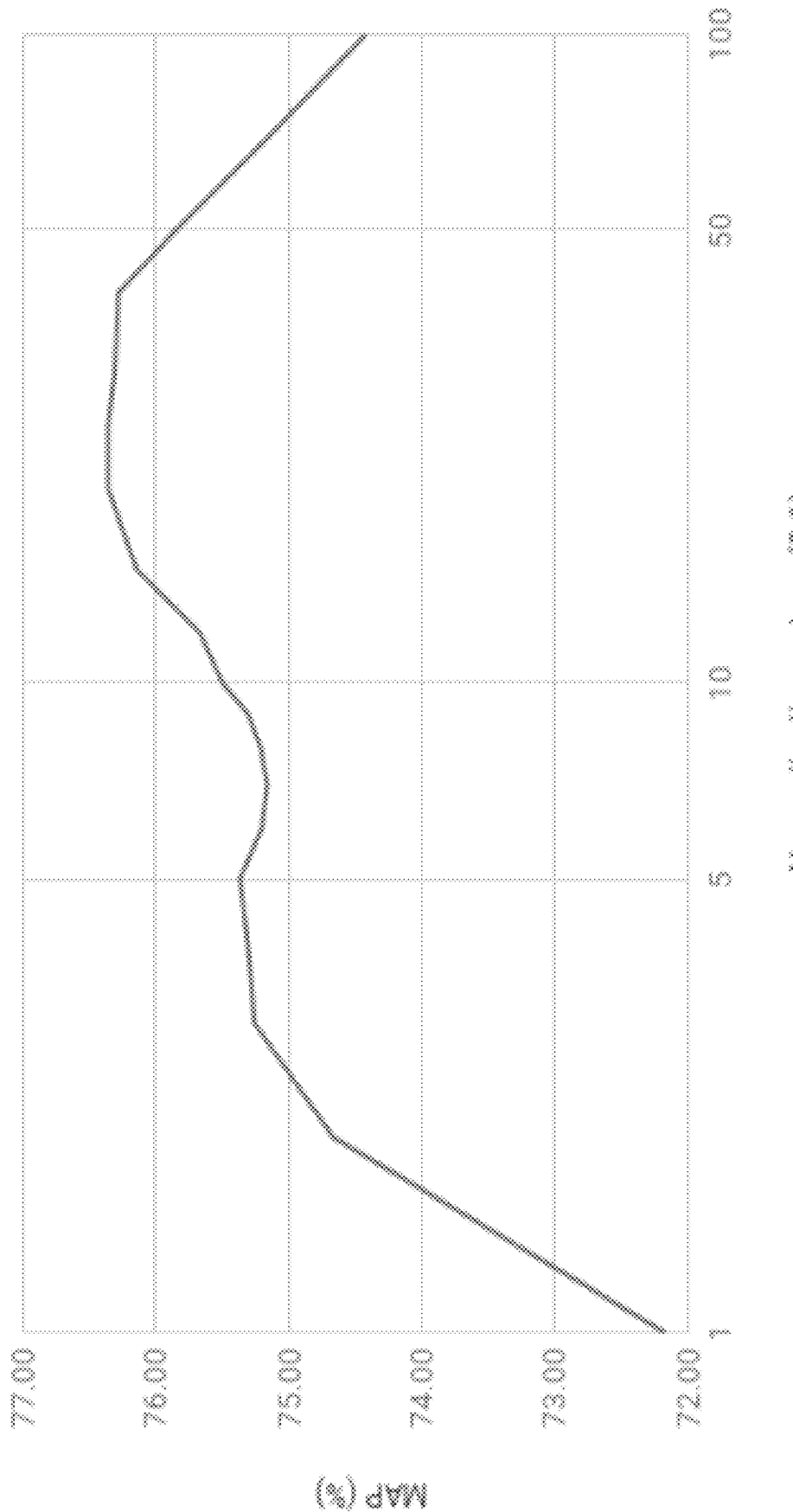

Applicants note that the improvement is bigger when the label proportion is lower. The proposed loss also improves the (overall and per-class) recall for both datasets. On Pascal VOC 2007, it also improves the overall and per-class precision. The AP difference per class on MS COCO is shown in FIG. 18.

A.7. Analysis of the Loss Function

In this section, Applicants analyze the hyper-parameter of the loss function for several network architectures. FIGS. 19A-19D shows the results on MS COCO.

TABLE 5

Analysis of the initial set of labels for the partial label scenario.

| | | | | | label proportion | | | | | |
|---|---|---|---|---|---|---|---|---|---|---|
| metric | 10% | 20% | 30% | 40% | 50% | 60% | 70% | 80% | 90% | 100% |
| MAP | 72.20 ± 0.04 | 74.49 ± 0.02 | 75.77 ± 0.02 | 76.57 ± 0.03 | 77.21 ± 0.01 | 77.73 ± 0.01 | 78.16 ± 0.02 | 78.53 ± 0.03 | 78.85 ± 0.02 | 79.14 ± 0.05 |
| Macro-F1 | 65.84 ± 0.01 | 69.32 ± 0.04 | 70.66 ± 0.02 | 71.37 ± 0.02 | 71.88 ± 0.03 | 72.29 ± 0.04 | 72.61 ± 0.03 | 72.89 ± 0.03 | 73.05 ± 0.06 | 73.24 ± 0.02 |
| Micro-F1 | 70.13 ± 0.04 | 73.97 ± 0.01 | 75.36 ± 0.01 | 76.07 ± 0.03 | 76.54 ± 0.01 | 76.91 ± 0.02 | 77.17 ± 0.04 | 77.42 ± 0.04 | 77.58 ± 0.05 | 77.75 ± 0.04 |
| 0-1 EM | 22.21 ± 0.12 | 30.44 ± 0.03 | 34.26 ± 0.11 | 36.18 ± 0.07 | 37.44 ± 0.05 | 38.46 ± 0.04 | 39.16 ± 0.07 | 39.83 ± 0.12 | 40.34 ± 0.04 | 40.67 ± 0.02 |
| PC-P | 59.82 ± 0.05 | 68.45 ± 0.10 | 72.56 ± 0.03 | 74.88 ± 0.11 | 76.45 ± 0.04 | 77.70 ± 0.07 | 78.59 ± 0.05 | 79.28 ± 0.10 | 79.80 ± 0.02 | 80.22 ± 0.05 |
| PC-R | 74.74 ± 0.04 | 71.14 ± 0.07 | 69.66 ± 0.04 | 68.96 ± 0.06 | 68.64 ± 0.04 | 68.35 ± 0.04 | 68.26 ± 0.07 | 68.23 ± 0.08 | 68.12 ± 0.09 | 68.16 ± 0.04 |
| OV-P | 62.66 ± 0.09 | 72.36 ± 0.06 | 76.81 ± 0.04 | 79.24 ± 0.10 | 80.75 ± 0.06 | 82.01 ± 0.08 | 82.79 ± 0.14 | 83.44 ± 0.10 | 83.94 ± 0.06 | 84.36 ± 0.04 |
| OV-R | 79.62 ± 0.04 | 75.66 ± 0.04 | 73.97 ± 0.05 | 73.14 ± 0.04 | 72.74 ± 0.04 | 72.40 ± 0.03 | 72.21 ± 0.04 | 72.14 ± 0.01 | 72.07 ± 0.05 | 72.15 ± 0.06 |

The results are averaged for 4 seeds on MS COCO val2014.

TABLE 6

Comparison of the labeling strategies for different label proportions and different architectures on MS COCO val2014.

| | | | | | | label proportion | | | | | |
|---|---|---|---|---|---|---|---|---|---|---|---|
| architecture | labels | 10% | 20% | 30% | 40% | 50% | 60% | 70% | 80% | 90% | 100% |
| ResNet-50 | partial | 61.26 | 63.78 | 65.21 | 66.22 | 66.97 | 67.60 | 68.16 | 68.58 | 69.01 | 69.33 |
| | dense | 54.29 | 59.67 | 62.50 | 64.28 | 65.60 | 66.68 | 67.55 | 68.26 | 68.80 | 69.32 |
| | noisy | — | — | — | — | 3.75 | 39.77 | 56.82 | 62.93 | 66.24 | 69.33 |
| ResNet-50 WELDON | partial | 69.91 | 72.37 | 73.74 | 74.53 | 75.25 | 75.77 | 76.25 | 76.66 | 77.02 | 77.28 |
| | dense | 62.16 | 68.04 | 71.14 | 73.01 | 74.17 | 75.14 | 75.83 | 76.42 | 76.88 | 77.28 |
| | noisy | — | — | — | — | 3.73 | 52.99 | 67.08 | 72.03 | 74.69 | 77.29 |
| ResNet-101 WELDON | partial | 72.15 | 74.49 | 75.76 | 76.56 | 77.22 | 77.73 | 78.17 | 78.53 | 78.84 | 79.22 |
| | dense | 65.22 | 71.00 | 73.80 | 75.44 | 76.59 | 77.44 | 78.08 | 78.61 | 78.90 | 79.24 |
| | noisy | — | — | — | — | 3.63 | 53.10 | 69.09 | 74.06 | 76.85 | 79.18 |

TABLE 6-continued

Comparison of the labeling strategies for different label proportions and different architectures on MS COCO val2014.

| architecture | labels | \multicolumn{10}{c|}{label proportion} |
|---|---|---|---|---|---|---|---|---|---|---|---|
| | | 10% | 20% | 30% | 40% | 50% | 60% | 70% | 80% | 90% | 100% |
| ResNeXt-101 WELDON | partial dense noisy | — | — | — | — | | | | | | |

TABLE 7

Single-label (noisy) vs multi-labels (clean).

| dataset | strategy | clean label | noisy label | MAP | 0-1 | M-F1 | m-F1 | PC-P | PC-R | OV-P | OV-R |
|---|---|---|---|---|---|---|---|---|---|---|---|
| VOC 2007 | clean | 100 | 0 | 93.93 | 79.16 | 88.90 | 91.12 | 90.72 | 87.34 | 93.40 | 88.95 |
| | noisy+ | 97.1 | 2.9 | 90.94 | 62.21 | 78.11 | 78.62 | 95.41 | 68.64 | 97.20 | 66.00 |
| | partial 10% | 10 | 0 | 89.09 | 47.46 | 74.55 | 77.84 | 63.35 | 94.16 | 66.02 | 94.81 |
| MS COCO | clean | 100 | 0 | 79.22 | 40.69 | 73.26 | 77.80 | 80.16 | 68.21 | 84.31 | 72.23 |
| | noisy+ | 97.6 | 2.4 | 71.60 | 20.28 | 38.62 | 33.72 | 91.76 | 28.17 | 97.34 | 20.39 |
| | partial 10% | 10 | 0 | 72.15 | 22.04 | 65.82 | 70.09 | 59.76 | 74.78 | 62.56 | 79.68 |
| NUS-WIDE | clean | 100 | 0 | 54.88 | 42.29 | 51.88 | 71.15 | 58.54 | 49.33 | 73.83 | 68.66 |
| | noisy+ | 98.6 | 1.4 | 47.44 | 36.07 | 18.83 | 28.53 | 59.71 | 13.95 | 83.72 | 17.19 |
| | partial 10% | 10 | 0 | 51.14 | 25.98 | 51.36 | 65.52 | 41.80 | 69.23 | 53.62 | 84.19 |

Clean (resp. noisy) label means the percentage of clean (resp. noisy) labels in the training set. Noisy+ means that there is only one positive label per image.

A.8. Comparison to Existing Model

Applicants compare models of some embodiments with the APG-Graph model [60] that models structured semantic correlations between images. However, this model does not allow to fine-tune the convolutional neural network. Most of the existing models are not scalable and do not allow experiments on large-scale dataset like MS COCO and NUSWIDE.

TABLE 8

Analysis of the loss function and the GNN on MS COCO val2014.

| loss | \multicolumn{10}{c|}{label proportion} |
|---|---|---|---|---|---|---|---|---|---|---|
| | 10% | 20% | 30% | 40% | 50% | 60% | 70% | 80% | 90% | 100% |
| BCE | 72.15 | 74.49 | 75.76 | 76.56 | 77.22 | 77.73 | 78.17 | 78.53 | 78.84 | 79.22 |
| partial-BCE | 75.31 | 77.08 | 78.00 | 78.63 | 79.05 | 79.34 | 79.53 | 79.77 | 79.60 | 79.22 |
| GNN + partial-BCE | 75.82 | 77.42 | 78.30 | 78.98 | 79.45 | 79.92 | 80.14 | 80.47 | 80.34 | 79.80 |

TABLE 9

Analysis of the relabeling strategy on Pascal VOC 2007 val set.

| Relabeling | MAP | 0-1 | Macro-F1 | Micro-F1 | label proportion | TP | TN |
|---|---|---|---|---|---|---|---|
| 2 steps (no curriculum) | −1.49 | 6.42 | 2.32 | 1.99 | 100 | 82.78 | 96.40 |
| score proportion θ = 0.1 | 0.45 | −1.20 | −0.28 | −0.68 | 26.70 | 99.28 | 99.19 |
| score proportion θ = 0.2 | 0.36 | 0.20 | 0.70 | 0.10 | 42.09 | 98.35 | 99.33 |
| score proportion θ = 0.3 | 0.28 | 0.91 | 1.09 | 0.37 | 55.63 | 97.82 | 99.38 |
| score proportion θ = 0.4 | 0.55 | 2.95 | 2.33 | 1.28 | 67.41 | 96.87 | 99.38 |
| score proportion θ = 0.5 | 0.22 | 4.02 | 2.76 | 1.74 | 77.40 | 95.52 | 99.30 |
| score proportion θ = 0.6 | 0.41 | 6.17 | 3.63 | 2.52 | 85.37 | 93.16 | 99.15 |
| score proportion θ = 0.7 | 0.35 | 7.49 | 3.83 | 3.07 | 91.69 | 89.40 | 98.81 |
| score proportion θ = 0.8 | 0.17 | 8.40 | 3.70 | 3.25 | 96.24 | 84.40 | 98.10 |
| score threshold θ = 1 | 0.00 | 11.31 | 3.71 | 4.25 | 97.87 | 82.47 | 97.84 |
| score threshold θ = 2 | 0.34 | 11.15 | 4.33 | 4.26 | 95.29 | 85.00 | 98.50 |
| score threshold θ = 5 | −0.31 | 5.02 | 2.60 | 1.83 | 70.98 | 96.56 | 99.44 |
| Ensemble score threshold θ = 1 | 0.31 | 10.16 | 3.61 | 3.94 | 97.84 | 82.12 | 97.76 |
| Ensemble score threshold θ = 2 | 0.23 | 11.31 | 4.16 | 4.33 | 95.33 | 84.80 | 98.53 |
| Ensemble score threshold θ = 5 | 0.27 | 3.78 | 2.38 | 1.53 | 70.77 | 96.56 | 99.44 |

TABLE 9-continued

Analysis of the relabeling strategy on Pascal VOC 2007 val set.

| Relabeling | MAP | 0-1 | Macro-F1 | Micro-F1 | label proportion | TP | TN |
|---|---|---|---|---|---|---|---|
| Positive only - score threshold θ = 1 | −1.61 | −31.75 | −18.07 | −18.92 | 16.79 | 36.42 | — |
| Positive only - score threshold θ = 2 | −0.80 | −21.31 | −10.93 | −12.08 | 14.71 | 47.94 | — |
| Positive only - score threshold θ = 5 | 0.31 | −4.58 | −1.92 | −2.23 | 12.01 | 79.07 | — |
| Bayesian uncertainty threshold θ = 0.1 | 0.36 | 2.71 | 1.91 | 1.22 | 19.45 | 38.15 | 99.97 |
| Bayesian uncertainty threshold θ = 0.2 | 0.30 | 10.76 | 4.87 | 4.66 | 57.03 | 62.03 | 99.65 |
| Bayesian uncertainty threshold θ = 0.3 | 0.59 | 12.07 | 5.11 | 4.95 | 79.74 | 68.96 | 99.23 |
| Bayesian uncertainty threshold θ = 0.4 | 0.43 | 10.99 | 4.88 | 4.46 | 90.51 | 70.77 | 98.57 |
| Bayesian uncertainty threshold θ = 0.5 | 0.45 | 10.08 | 3.93 | 3.78 | 94.79 | 74.73 | 98.00 |
| No GNN | | | | | | | |
| Bayesian uncertainty threshold θ = 0.1 | 0.26 | 1.84 | 1.36 | 0.64 | 22.63 | 25.71 | 99.98 |
| Bayesian uncertainty threshold θ = 0.2 | 0.29 | 8.49 | 4.05 | 3.66 | 60.32 | 48.39 | 99.82 |
| Bayesian uncertainty threshold θ = 0.3 | 0.34 | 10.15 | 4.37 | 3.72 | 77.91 | 61.15 | 99.24 |
| Bayesian uncertainty threshold θ = 0.4 | 0.30 | 9.05 | 4.17 | 3.37 | 87.80 | 68.56 | 98.70 |
| Bayesian uncertainty threshold θ = 0.5 | 0.26 | 8.32 | 3.83 | 3.05 | 92.90 | 70.96 | 98.04 |

TP (resp. TM) means true positive (resp. true negative). For the strategy labeling only positive labels, we report the label accuracy instead of the TP rate.

Figure 20:
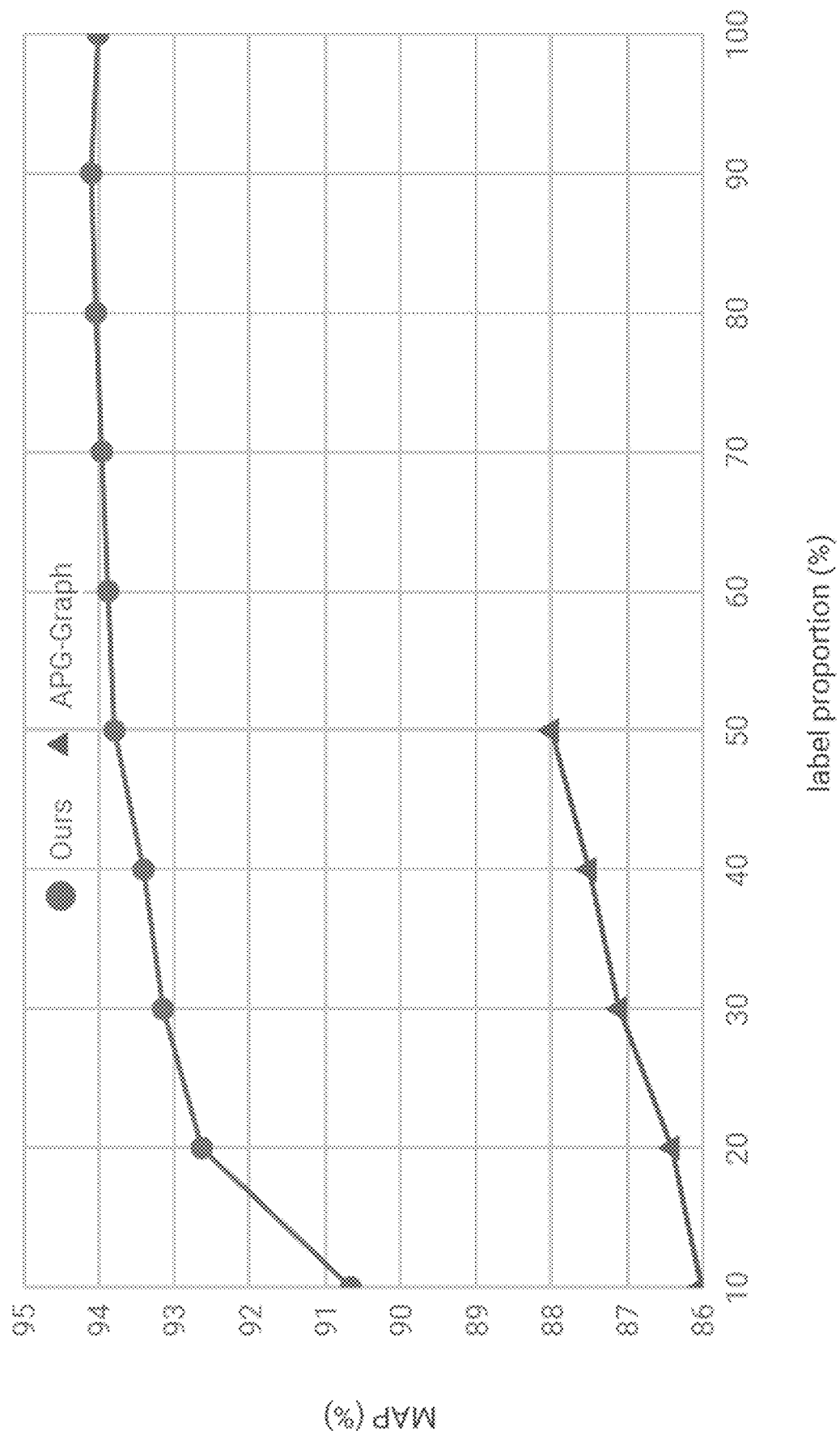
FIG. 20 is a plot showing a comparison with missing label models, according to some embodiments.

FIG. 20 is a plot showing a comparison with missing label models, according to some embodiments.

Figure 21:
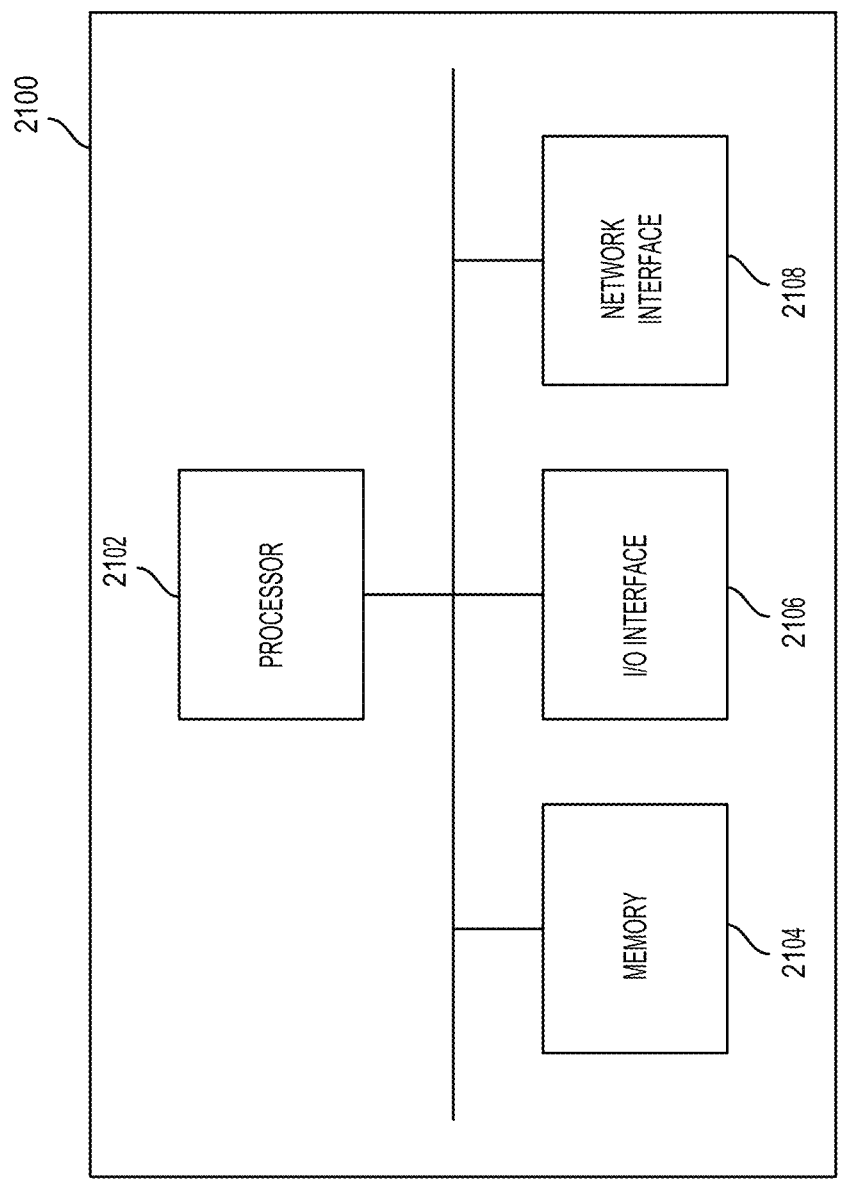
FIG. 21 is an example computing diagram, according to some embodiments.

FIG. 21 is a schematic diagram of a computing device 2100 such as a server. As depicted, the computing device includes at least one processor 2102, memory 21021, at least one I/O interface 2106, and at least one network interface 2108.

Processor 2102 may be an Intel or AMD x86 or x64, PowerPC, ARM processor, or the like. Memory 2104 may include a suitable combination of computer memory that is located either internally or externally such as, for example, random-access memory (RAM), read-only memory (ROM), compact disc read-only memory (CDROM).

Each I/O interface 2106 enables computing device 2100 to interconnect with one or more input devices, such as a keyboard, mouse, camera, touch screen and a microphone, or with one or more output devices such as a display screen and a speaker.

Each network interface 2108 enables computing device 2100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

REFERENCES

[1] R. A. Baeza-Yates and B. Ribeiro-Neto. Modern Information Retrieval. 1999. 5

[2] Y. Bengio, J. Louradour, R. Collobert, and J. Weston. Curriculum learning. In International Conference on Machine Learning (ICML), 2009. 2, 3, 4

[3] S. S. Bucak, R. Jin, and A. K. Jain. Multi-label learning with incomplete class assignments. In IEEE Conference on Computer Vision and Pattern Recognition (CVPR), 2011. 2

[4] R. S. Cabral, F. Torre, J. P. Costeira, and A. Bernardino. Matrix Completion for Multi-label Image Classification. In Advances in Neural Information Processing Systems (NIPS), 2011. 2

[5] A. Carlson, J. Betteridge, B. Kisiel, B. Settles, E. R. H. Jr., and T. M. Mitchell. Toward an Architecture for Never-Ending Language Learning. In Conference on Artificial Intelligence (AAAI), 2010. 3

[6] O. Chapelle, B. Schlkopf, and A. Zien. Semi-Supervised Learning. 2010. 2, 6

[7] X. Chen, A. Shrivastava, and A. Gupta. Neil: Extracting visual knowledge from web data. In IEEE International Conference on Computer Vision (ICCV), 2013. 3

[8] X. Chen, A. Shrivastava, and A. Gupta. Enriching visual knowledge bases via object discovery and segmentation. In IEEE Conference on Computer Vision and Pattern Recognition (CVPR), 2014. 3

[9] K. Cho, B. van Merrienboer, D. Bandanau, and Y. Bengio. On the properties of neural machine translation: Encoderdecoder approaches. In Eighth Workshop on Syntax, Semantics and Structure in Statistical Translation (SSST-8), 2014. 4

[10] H.-M. Chu, C.-K. Yeh, and Y.-C. Frank Wang. Deep Generative Models for Weakly-Supervised Multi-Label Classification. In European Conference on Computer Vision (ECCV), 2018. 2

[11] T.-S. Chua, J. Tang, R. Hong, H. Li, Z. Luo, and Y. Zheng. NUS-WIDE: A Real-world Web Image Database from National University of Singapore. In ACM International Conference on Image and Video Retrieval (CIVR), 2009. 5, 12

[12] T. Cour, B. Sapp, and B. Taskar. Learning from Partial Labels. Journal of Machine Learning Research (JMLR), 2011. 2

[13] J. Deng, O. Russakovsky, J. Krause, M. S. Bernstein, A. Berg, and L. Fei-Fei. Scalable Multi-label Annotation. In Proceedings of the SIGCHI Conference on Human Factors in Computing Systems, 2014. 1, 2

[14] T. Durand, T. Mordan, N. Thome, and M. Cord. WILDCAT: Weakly Supervised Learning of Deep convolutional neural networks for Image Classification, Pointwise Localization and Segmentation. In IEEE Conference on Computer Vision and Pattern Recognition (CVPR), 2017. 1

[15] T. Durand, N. Thome, and M. Cord. Exploiting Negative Evidence for Deep Latent Structured Models. In IEEE Transactions on Pattern Analysis and Machine Intelligence (TPAMI), 2018. 5

[16] M. Everingham, S. M. A. Eslami, L. Van Gool, C. K. I. Williams, J. Winn, and A. Zisserman. The Pascal Visual Object Classes Challenge: A Retrospective. International Journal of Computer Vision (IJCV), 2015. 5, 12

[17] Y. Gong, Y. Jia, T. Leung, A. Toshev, and S. Ioffe. Deep Convolutional Ranking for Multilabel Image Annotation. In International Conference on Learning Representations (ICLR), 2014. 5, 12

[18] M. Gori, G. Monfardini, and F. Scarselli. A new model for learning in graph domains. In IEEE International Joint Conference on Neural Networks (IJCNN), 2005. 4

[19] S. Guo, W. Huang, H. Zhang, C. Zhuang, D. Dong, M. R. Scott, and D. Huang. CurriculumNet: Weakly Supervised Learning from Large-Scale Web Images. In European Conference on Computer Vision (ECCV), 2018. 3

[20] K. He, X. Zhang, S. Ren, and J. Sun. Deep residual learning for image recognition. In IEEE Conference on Computer Vision and Pattern Recognition (CVPR), 2016. 1, 5

[21] S. Ioffe and C. Szegedy. Batch Normalization: Accelerating Deep Network Training by Reducing Internal Covariate Shift. In International Conference on Machine Learning (ICML), 2015. 4

[22] F. V. Jensen and T. D. Nielsen. Bayesian Networks and Decision Graphs. 2007. 2

[23] L. Jiang, D. Meng, Q. Zhao, S. Shan, and A. G. Hauptmann. Self-Paced Curriculum Learning. In Conference on Artificial Intelligence (AAAI), 2015. 3, 4

[24] L. Jiang, Z. Zhou, T. Leung, L.-J. Li, and L. Fei-Fei. Mentor-Net: Learning Data-Driven Curriculum for Very Deep Neural Networks on Corrupted Labels. In International Conference on Machine Learning (ICML), 2018. 3

[25] A. Joulin, L. van der Maaten, A. Jabri, and N. Vasilache. Learning visual features from large weakly supervised data. In European Conference on Computer Vision (ECCV), 2016. 2

[26] A. Kapoor, R. Viswanathan, and P. Jain. Multilabel classification using bayesian compressed sensing. In Advances in Neural Information Processing Systems (NIPS), 2012. 2

[27] A. Kendall and Y. Gal. What uncertainties do we need in bayesian deep learning for computer vision? In Advances in Neural Information Processing Systems (NIPS), 2017. 5

[28] D. P. Kingma and M. Welling. Auto-Encoding Variational Bayes. In International Conference on Learning Representations (ICLR), 2014. 2

[29] S. Kornblith, J. Shlens, and Q. V. Le. Do Better ImageNet Models Transfer Better? 2018. 3

[30] A. Krizhevsky, I. Sutskever, and G. Hinton. ImageNet Classification with Deep Convolutional Neural Networks. In Advances in Neural Information Processing Systems (NIPS), 2012. 1

[31] M. P. Kumar, B. Packer, and D. Koller. Self-paced learning for latent variable models. In Advances in Neural Information Processing Systems (NIPS), 2010. 3, 4, 5

[32] L. J. Li, G. Wang, and L. Fei-Fei. OPTIMOL: automatic Online Picture collecTion via Incremental MOdel Learning. In IEEE Conference on Computer Vision and Pattern Recognition (CVPR), 2007. 3

[33] W. Li, L. Wang, W. Li, E. Agustsson, J. Berent, A. Gupta, R. Sukthankar, and L. Van Gool. WebVision Challenge: Visual Learning and Understanding With Web Data. In arXiv 1705.05640, 2017.1, 6

[34] Y. Li, Y. Song, and J. Luo. Improving Pairwise Ranking for Multi-label Image Classification. In IEEE Conference on Computer Vision and Pattern Recognition (CVPR), 2017. 12

[35] T.-Y. Lin, M. Maire, S. Belongie, L. Bourdev, R. Girshick, J. Hays, P. Perona, D. Ramanan, C. L. Zitnick, and P. Dollr. Microsoft COCO: Common Objects in Context. 2014. 1, 5, 12

[36] C. Liu, B. Zoph, J. Shlens, W. Hua, L.-J. Li, L. Fei-Fei, A. Yuille, J. Huang, and K. Murphy. Progressive Neural Architecture Search. In European Conference on Computer Vision (ECCV), 2018.

[37] D. Mahajan, R. Girshick, V. Ramanathan, K. He, M. Paluri, Y. Li, A. Bharambe, and L. van der Maaten. Exploring the Limits of Weakly Supervised Pretraining. In European Conference on Computer Vision (ECCV), 2018. 1, 2, 6

[38] Minmin Chen and Alice Zheng and Kilian Weinberger. Fast image tagging. In International Conference on Machine Learning (ICML), 2013. 2

[39] T. Mitchell, W. Cohen, E. Hruschka, P. Talukdar, J. Betteridge, A. Carlson, B. Dalvi, M. Gardner, B. Kisiel, J. Krishnamurthy, N. Lao, K. Mazaitis, T. Mohamed, N. Nakashole, E. Platanios, A. Ritter, M. Samadi, B. Settles, R. Wang, D. Wijaya, A. Gupta, X. Chen, A. Saparov, M. Greaves, and J. Welling. Never-Ending Learning. In Conference on Artificial Intelligence (AAAI), 2015. 3

[40] M. Oquab, L. Bottou, I. Laptev, and J. Sivic. Learning and Transferring Mid-Level Image Representations using Convolutional Neural Networks. In IEEE Conference on Computer Vision and Pattern Recognition (CVPR), 2014. 1, 5

[41] M. Oquab, L. Bottou, I. Laptev, and J. Sivic. Is Object Localization for Free?—Weakly-Supervised Learning With Convolutional Neural Networks. In IEEE Conference on Computer Vision and Pattern Recognition (CVPR), 2015. 1

[42] A. Paszke, S. Gross, S. Chintala, G. Chanan, E. Yang, Z. De-Vito, Z. Lin, A. Desmaison, L. Antiga, and A. Lerer.

Automatic differentiation in pytorch. In Advances in Neural Information Processing Systems (NIPS), 2017. 5
[43] H. Pham, M. Y. Guan, B. Zoph, Q. V. Le, and J. Dean. Faster Discovery of Neural Architectures by Searching for Paths in a Large Model. In International Conference on Learning Representations (ICLR), 2018. 1
[44] C. J. V. Rijsbergen. Information Retrieval. 1979. 12
[45] O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet large scale visual recognition challenge. International Journal of Computer Vision (IJCV), 2015. 1
[46] F. Scarselli, M. Gori, A. C. Tsoi, M. Hagenbuchner, and G. Monfardini. The graph neural network model. IEEE Transactions on Neural Networks, 2009. 4
[47] P. Stock and M. Cisse. ConvNets and ImageNet Beyond Accuracy: Understanding Mistakes and Uncovering Biases. In European Conference on Computer Vision (ECCV), 2018. 1
[48] C. Sun, M. Paluri, R. Collobert, R. Nevatia, and L. Bourdev. ProNet: Learning to Propose Object-Specific Boxes for Cascaded Neural Networks. In IEEE Conference on Computer Vision and Pattern Recognition (CVPR), 2016. 1
[49] C. Sun, A. Shrivastava, S. Singh, and A. Gupta. Revisiting Unreasonable Effectiveness of Data in Deep Learning Era. In IEEE International Conference on Computer Vision (ICCV), 2017. 1, 2, 6
[50] Y.-Y. Sun, Y. Zhang, and Z.-H. Zhou. Multi-label Learning with Weak Label. In Conference on Artificial Intelligence (AAAI), 2010. 2
[51] C. Szegedy, S. Ioffe, V. Vanhoucke, and A. Alemi. Inceptionv4, inception-resnet and the impact of residual connections on learning. In Conference on Artificial Intelligence (AAAI), 2017. 1
[52] L. Tang, S. Rajan, and V. K. Narayanan. Large scale multilabel classification via metalabeler. In WWW, 2009. 5, 13
[53] G. Tsoumakas and I. Katakis. Multi-label classification: An overview. International Journal of Data Warehousing and Mining (IJDWM), 2007. 2
[54] A. Vandat. Toward robustness against label noise in training deep discriminative neural networks. In Advances in Neural Information Processing Systems (NIPS), 2017. 1
[55] D. Vasisht, A. Damianou, M. Varma, and A. Kapoor. Active Learning for Sparse Bayesian Multilabel Classification. In ACM SIGKDD International Conference on Knowledge Discovery and Data Mining, 2014. 2
[56] Q. Wang, B. Shen, S. Wang, L. Li, and L. Si. Binary Codes Embedding for Fast Image Tagging with Incomplete Labels. In European Conference on Computer Vision (ECCV), 2014. 2
[57] B. Wu, S. Lyu, and B. Ghanem. ML-MG: Multi-Label Learning With Missing Labels Using a Mixed Graph. In IEEE International Conference on Computer Vision (ICCV), 2015. 2, 3
[58] S. Xie, R. Girshick, P. Dollr, Z. Tu, and K. He. Aggregated Residual Transformations for Deep Neural Networks. In IEEE Conference on Computer Vision and Pattern Recognition (CVPR), 2017. 1
[59] M. Xu, R. Jin, and Z.-H. Zhou. Speedup Matrix Completion with Side Information: Application to Multi-Label Learning. In Advances in Neural Information Processing Systems (NIPS), 2013. 2
[60] H. Yang, J. T. Zhou, and J. Cai. Improving Multi-label Learning with Missing Labels by Structured Semantic Correlations. In European Conference on Computer Vision (ECCV), 2016. 2, 3, 14
[61] Y. Yang. An evaluation of statistical approaches to text categorization. 1999. 5, 12
[62] H.-F. Yu, P. Jain, P. Kar, and I. S. Dhillon. Large-scale Multilabel Learning with Missing Labels. In International Conference on Machine Learning (ICML), 2014. 2
[63] C. Zhang, S. Bengio, M. Hardt, B. Recht, and O. Vinyals. Understanding deep learning requires rethinking generalization. In International Conference on Learning Representations (ICLR), 2017. 1, 2
[64] B. Zhou, A. Khosla, A. Lapedriza, A. Oliva, and A. Torralba. Learning Deep Features for Discriminative Localization. In IEEE Conference on Computer Vision and Pattern Recognition (CVPR), 2016. 1
[65] B. Zoph, V. Vasudevan, J. Shlens, and Q. V. Le. Learning transferable architectures for scalable image recognition. In IEEE Conference on Computer Vision and Pattern Recognition (CVPR), 2018. 1

What is claimed is:

1. A system for training a convolutional neural network for machine learning with multi-label training data having partial annotations including known labels and unknown labels, the system comprising:
a data storage maintaining the convolutional neural network for machine learning with the multi-label training data;
a processor configured to:
weight each training example of a plurality of training examples in respect to its label proportion;
establish a partial binary cross-entropy loss function that normalizes a loss by a proportion of the known labels relative to a total of a number of the known labels and the unknown labels, based at least on the relation:

$$\ell(x, y) = \frac{g(p_y)}{C} \sum_{c=1}^{C} \mathbb{1}_{[y_c=1]} \log\left(\frac{1}{1+\exp(-x_c)}\right) + \mathbb{1}_{[y_c=-1]} \log\left(\frac{\exp(-x_c)}{1+\exp(-x_c)}\right) \quad (1)$$

wherein x is a matrix output of a deep convolutional neural network for an object;
wherein y is a matrix of labels of a training set;
wherein $p_y \in [0,1]$ is the proportion of known labels relative to the total number of the known labels and the unknown labels in y;
wherein g is a normalization function with respect to the label proportion;
wherein C is a number of categories for the labels in y;
wherein $y_c=1$ is defined as category c being present for the object;
wherein $y_c=-1$ is defined as category c being absent for the object; and
train the convolutional neural network using the partial binary cross-entropy loss function in conjunction with the plurality of training examples to iteratively tune one or more weightings between interconnected nodes of the convolutional neural network to minimize the loss function.

2. The system of claim 1, wherein the processor is further configured to:
generate a new data set of multi-label training data having a combination of the known labels and a plurality of inferred labels, wherein the inferred labels are generated using the convolutional neural network.

3. The system of claim 2, wherein the new data set includes metadata associated with the inferred labels indicating that the inferred labels are inferred.

4. The system of claim 3, wherein the metadata includes a plurality of confidence scores generated by the convolutional neural network during training for each corresponding inferred label of the inferred labels, the plurality of confidence scores utilized during downstream training to indicate a level of reliability for the corresponding inferred label.

5. The system of claim 1, wherein the processor is further configured to:
receive a new data set;
provide the new data set to the trained neural network for processing, the trained neural network generating a set of logits, each logit corresponding to a set of output categories; and
determine, from the set of logits, a predicted output category based at least on a selected output category of the set of output categories having a greatest logit relative to other logits of the set of logits.

6. The system of claim 1, comprising:
a data storage maintaining the convolutional neural network for machine learning with the multi-label training data and a graph neural network adapted for modelling interactions between categories of the convolutional neural network;
the processor configured to:
generate the graph neural network wherein the input data is a graph G={V, E}, where V is a set of nodes of the graph, and E is a set of edges of the graph, where for each node v∈V, an input feature vector $x_v$ and its hidden representation describing the node's state at time step t are denoted by $h_v^t$, and where $\Omega v$ denotes a set of neighboring nodes of v;
wherein each node uses information from the node's neighbors to update its hidden state; and
wherein the update is decomposed into two steps: a message update and a hidden state update.

7. The system of claim 1, wherein the processor is configured to:
iteratively label unlabelled labels of the multi-label training data with one or more inferred labels generated using the trained neural network and a self-paced model adapted for optimizing an objective function based at least on the relation:

$$\min_{w \in \mathbb{R}^d, v \in \{0,1\}^{N \times C}} J(w, v) = \beta \|w\|^2 + G(v; \theta) + \frac{1}{N}\sum_{i=1}^{N}\frac{1}{C}\sum_{c=1}^{C} v_{ic}\ell_c(f_w(\mathcal{I}^{(i)}), y_c^{(i)}) \quad (7)$$

wherein $l_c$ is the loss for category c and $v_i \in \{0, 1\}^C$ is a vector to represent the selected labels for the i-th sample;
wherein $v_{ic}=1$ is defined as the c-th label of the i-th example being selected (resp. unselected);
wherein $v_{ic}=0$ is defined as the c-th label of the i-th example being unselected; and
wherein the function G defines a curriculum, parameterized by θ, the curriculum defining a learning approach based on first improving the convolutional neural network using lower difficulty labels.

8. The system of claim 7, wherein the curriculum training includes determining a difficulty level for each unlabelled label.

9. The system of claim 8, wherein a Bayesian uncertainty strategy is used as the learning approach, where variance of classification scores of pairs of category examples from the multi-label training data is used to estimate the difficulty level corresponding to an unlabelled label.

10. The system of claim 9, wherein the difficulty level of an unlabelled label is utilized in establishing a confidence score associated with an inferred label generated from the corresponding unlabelled label.

11. A method for training a convolutional neural network for machine learning with multi-label training data having partial annotations including known labels and unknown labels, the method comprising:
maintaining the convolutional neural network for machine learning with the multi-label training data;
weighting each training example of a plurality of training examples in respect to its label proportion;
establishing a partial binary cross-entropy loss function that normalizes a loss by a proportion of the known labels relative to a total of a number of the known labels and the unknown labels, based at least on the relation:

$$\ell(x, y) = \frac{g(p_y)}{C}\sum_{c=1}^{C}\mathbb{1}_{[y_c=1]}\log\left(\frac{1}{1+\exp(-x_c)}\right) + \mathbb{1}_{[y_c=-1]}\log\left(\frac{\exp(-x_c)}{1+\exp(-x_c)}\right)] \quad (1)$$

wherein x is a matrix output of a deep convolutional neural network for an object;
wherein y is a matrix of labels of a training set;
wherein $p_y \in [0,1]$ is the proportion of known labels relative to the total number of the known labels and the unknown labels in y;
wherein g is a normalization function with respect to the label proportion;
wherein C is a number of categories for the labels in y;
wherein $y_c=1$ is defined as category c being present for the object;
wherein $y_c=-1$ is defined as category c being absent for the object; and
training the convolutional neural network using the partial binary cross-entropy loss function in conjunction with the plurality of training examples to iteratively tune one or more weightings between interconnected nodes of the convolutional neural network to minimize the loss function.

12. The method of claim 11, comprising: generating a new data set of multi-label training data having a combination of the known labels and a plurality of inferred labels, wherein the inferred labels are generated using the convolutional neural network.

13. The method of claim 12, wherein the new data set includes metadata associated with the inferred labels indicating that the inferred labels are inferred.

14. The method of claim 13, wherein the metadata includes a plurality of confidence scores generated by the convolutional neural network during training for each corresponding inferred label of the inferred labels, the plurality of confidence scores utilized during downstream training to indicate a level of reliability for the corresponding inferred label.

15. The method of claim 11, comprising: receiving a new data set;
providing the new data set to the trained neural network for processing, the trained neural network generating a set of logits, each logit corresponding to a set of output categories; and determining, from the set of logits, a predicted output category based at least on a selected output category of the set of output categories having a greatest logit relative to other logits of the set of logits.

16. The method of claim 11, comprising:
maintaining the convolutional neural network for machine learning with the multi-label training data and a graph neural network adapted for modelling interactions between categories of the convolutional neural network;
generating the graph neural network wherein the input data is a graph G={V, E}, where V is a set of nodes of the graph, and E is a set of edges of the graph, where for each node v∈V, an input feature vector $x_v$ and its hidden representation describing the node's state at time step t are denoted by $h_v^t$, and where $\Omega v$ denotes a set of neighboring nodes of v;
wherein each node uses information from the node's neighbors to update its hidden state; and
wherein the update is decomposed into two steps: a message update and a hidden state update.

17. The method of claim 11, comprising
iteratively labeling unlabelled labels of the multi-label training data with one or more inferred labels generated using the trained neural network and a self-paced model adapted for optimizing an objective function based at least on the relation:

$$\min_{w \in \mathbb{R}^d, v \in [0,1]^{N \times C}} J(w, v) = \beta \|w\|^2 + G(v; \theta) + \frac{1}{N} \sum_{i=1}^{N} \frac{1}{C} \sum_{c=1}^{C} v_{ic} \ell_c(f_w(\mathcal{I}^{(i)}), y_c^{(i)}) \quad (7)$$

wherein $l_c$ is the loss for category c and $v_i \in \{0, 1\}^C$ is a vector to represent the selected labels for the i-th sample;
wherein $v_{ic}=1$ is defined as the c-th label of the i-th example being selected (resp. unselected);
wherein $v_{ic}=0$ is defined as the c-th label of the i-th example being unselected; and
wherein the function G defines a curriculum, parameterized by θ, the curriculum defining a learning approach based on first improving the convolutional neural network using lower difficulty labels.

18. The method of claim 17, wherein the curriculum training includes determining a difficulty level for each unlabelled label.

19. The method of claim 18, wherein a Bayesian uncertainty strategy is used as the learning approach, where variance of classification scores of pairs of category examples from the multi-label training data is used to estimate the difficulty level corresponding to an unlabelled label.

20. A non-transitory computer readable medium storing machine interpretable instructions, which when executed by a processor, cause the processor to perform a method in accordance with a method for training the convolutional neural network for machine learning with multi-label training data having partial annotations including known labels and unknown labels, the method comprising:
maintaining the convolutional neural network for machine learning with the multi-label training data;
weighting each training example of a plurality of training examples in respect to its label proportion;
establishing a partial binary cross-entropy loss function that normalizes a loss by a proportion of the known labels relative to a total of a number of the known labels and the unknown labels, based at least on the relation:

$$\ell(x, y) = \frac{g(p_y)}{C} \sum_{c=1}^{C} \mathbb{1}_{[y_c=1]} \log\left(\frac{1}{1+\exp(-x_c)}\right) + \mathbb{1}_{[y_c=-1]} \log\left(\frac{\exp(-x_c)}{1+\exp(-x_c)}\right) \quad (1)$$

wherein x is a matrix output of a deep convolutional neural network for an object;
wherein y is a matrix of labels of a training set;
wherein $p_y \in [0,1]$ is the proportion of known labels relative to the total number of the known labels and the unknown labels in y;
wherein g is a normalization function with respect to the label proportion;
wherein C is a number of categories for the labels in y;
wherein $y_c=1$ is defined as category c being present for the object;
wherein $y_c=-1$ is defined as category c being absent for the object; and
training the convolutional neural network using the partial binary cross-entropy loss function in conjunction with the plurality of training examples to iteratively tune one or more weightings between interconnected nodes of the convolutional neural network to minimize the loss function.

21. A non-transitory computer readable medium storing machine interpretable instructions representative of a trained convolutional neural network trained in accordance with a method for training the convolutional neural network for machine learning with multi-label training data having partial annotations including known labels and unknown labels, the method comprising:
maintaining the convolutional neural network for machine learning with the multi-label training data;
weighting each training example of a plurality of training examples in respect to its label proportion;
establishing a partial binary cross-entropy loss function that normalizes a loss by a proportion of the known labels relative to a total of a number of the known labels and the unknown labels, based at least on the relation:

$$\ell(x, y) = \frac{g(p_y)}{C} \sum_{c=1}^{C} \mathbb{1}_{[y_c=1]} \log\left(\frac{1}{1+\exp(-x_c)}\right) + \mathbb{1}_{[y_c=-1]} \log\left(\frac{\exp(-x_c)}{1+\exp(-x_c)}\right) \quad (1)$$

wherein x is a matrix output of a deep convolutional neural network for an object;
wherein y is a matrix of labels of a training set;
wherein $p_y \in [0,1]$ is the proportion of known labels relative to the total number of the known labels and the unknown labels in y;
wherein g is a normalization function with respect to the label proportion;
wherein C is a number of categories for the labels in y;
wherein $y_c=1$ is defined as category c being present for the object;
wherein $y_c=-1$ is defined as category c being absent for the object; and
training the convolutional neural network using the partial binary cross-entropy loss function in conjunction with the plurality of training examples to iteratively tune one or more weightings between interconnected nodes of the convolutional neural network to minimize the loss function.

* * * * *

UNITED STATES PATENT AND TRADEMARK OFFICE
CERTIFICATE OF CORRECTION

PATENT NO. : 12,020,147 B2
APPLICATION NO. : 16/685478
DATED : June 25, 2024
INVENTOR(S) : Thibaut Durand et al.

Page 1 of 2

It is certified that error appears in the above-identified patent and that said Letters Patent is hereby corrected as shown below:

In the Claims

Column 32 Lines 37 - 41 (Claim 1):

" $$\ell(x, y) = \frac{g(p_y)}{C} \sum_{c=1}^{C} \mathbb{1}_{[y_c=1]} \log\left(\frac{1}{1 + \exp(-x_c)}\right) + \mathbb{1}_{[y_c=-1]} \log\left(\frac{\exp(-x_c)}{1 + \exp(-x_c)}\right) \quad (1)$$ "

Should read:

$$\ell(\mathbf{x}, \mathbf{y}) = \frac{g(p_y)}{C} \sum_{c=1}^{C} \left[ \mathbb{1}_{[y_c=1]} \log\left(\frac{1}{1 + \exp(-x_c)}\right) + \mathbb{1}_{[y_c=-1]} \log\left(\frac{\exp(-x_c)}{1 + \exp(-x_c)}\right) \right] \quad (1)$$

Column 34 Lines 22 - 26 (Claim 11):

" $$\ell(x, y) = \frac{g(p_y)}{C} \sum_{c=1}^{C} \mathbb{1}_{[y_c=1]} \log\left(\frac{1}{1 + \exp(-x_c)}\right) + \mathbb{1}_{[y_c=-1]} \log\left(\frac{\exp(-x_c)}{1 + \exp(-x_c)}\right) \quad (1)$$ "

Signed and Sealed this
Fourteenth Day of January, 2025

Derrick Brent
*Acting Director of the United States Patent and Trademark Office*

Should read:

$$\ell(\mathbf{x},\mathbf{y}) = \frac{g(p_\mathbf{y})}{C} \sum_{c=1}^{C} \left[ \mathbb{1}_{[y_c=1]} \log\left(\frac{1}{1+\exp(-x_c)}\right) \right. \quad (1)$$

$$\left. + \mathbb{1}_{[y_c=-1]} \log\left(\frac{\exp(-x_c)}{1+\exp(-x_c)}\right) \right]$$

--

Column 36 Lines 5 - 8 (Claim 20):

"
$$\ell(x, y) = \qquad (1)$$
$$\frac{g(p_y)}{C} \sum_{c=1}^{C} \mathbb{1}_{[y_c=1]} \log\left(\frac{1}{1+\exp(-x_c)}\right) + \mathbb{1}_{[y_c=-1]} \log\left(\frac{\exp(-x_c)}{1+\exp(-x_c)}\right)$$
"

Should read:

$$\ell(\mathbf{x},\mathbf{y}) = \frac{g(p_\mathbf{y})}{C} \sum_{c=1}^{C} \left[ \mathbb{1}_{[y_c=1]} \log\left(\frac{1}{1+\exp(-x_c)}\right) \right. \quad (1)$$

$$\left. + \mathbb{1}_{[y_c=-1]} \log\left(\frac{\exp(-x_c)}{1+\exp(-x_c)}\right) \right]$$

--

Column 36 Lines 47 - 51 (Claim 21):

"
$$\ell(x, y) = \qquad (1)$$
$$\frac{g(p_y)}{C} \sum_{c=1}^{C} \mathbb{1}_{[y_c=1]} \log\left(\frac{1}{1+\exp(-x_c)}\right) + \mathbb{1}_{[y_c=-1]} \log\left(\frac{\exp(-x_c)}{1+\exp(-x_c)}\right)$$
"

Should read:

$$\ell(\mathbf{x},\mathbf{y}) = \frac{g(p_\mathbf{y})}{C} \sum_{c=1}^{C} \left[ \mathbb{1}_{[y_c=1]} \log\left(\frac{1}{1+\exp(-x_c)}\right) \right. \quad (1)$$

$$\left. + \mathbb{1}_{[y_c=-1]} \log\left(\frac{\exp(-x_c)}{1+\exp(-x_c)}\right) \right]$$

--